United States Patent
Lim et al.

(10) Patent No.: US 11,658,394 B2
(45) Date of Patent: *May 23, 2023

(54) ANTENNA AND ELECTRONIC DEVICE COMPRISING SAME

(71) Applicant: Samsung Electronics Co., Ltd., Gyeonggi-do (KR)

(72) Inventors: Jae-Ho Lim, Gyeonggi-do (KR); Kyung-Jong Lee, Gyeonggi-do (KR); Hosaeng Kim, Gyeonggi-do (KR); Seunghwan Kim, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/113,577

(22) Filed: Dec. 7, 2020

(65) Prior Publication Data

US 2021/0091456 A1    Mar. 25, 2021

Related U.S. Application Data

(63) Continuation of application No. 16/095,618, filed as application No. PCT/KR2017/000984 on Jan. 26, 2017, now Pat. No. 10,879,589.

(30) Foreign Application Priority Data

Apr. 22, 2016 (KR) .......................... 10-2016-0049632

(51) Int. Cl.
*H01Q 1/24* (2006.01)
*H01Q 5/335* (2015.01)
(Continued)

(52) U.S. Cl.
CPC ............. *H01Q 1/243* (2013.01); *H01Q 5/335* (2015.01); *H01Q 5/342* (2015.01);
(Continued)

(58) Field of Classification Search
None
See application file for complete search history.

(56) References Cited

U.S. PATENT DOCUMENTS

| 7,391,375 B1 | 6/2008 | Lin et al. |
| 8,654,030 B1* | 2/2014 | Mercer ................. H04W 88/06 |
| | | 343/876 |

(Continued)

FOREIGN PATENT DOCUMENTS

| EP | 3 007 268 | 4/2016 |
| JP | 5613129 | 10/2014 |

(Continued)

OTHER PUBLICATIONS

Indian Examination Report dated Mar. 9, 2021 issued in counterpart application No. 201847041785, 5 pages.

(Continued)

*Primary Examiner* — Ab Salam Alkassim, Jr.
(74) *Attorney, Agent, or Firm* — The Farrell Law Firm, P.C.

(57) ABSTRACT

Provided is an electronic device that includes first and second housings, a display, a connecting member connecting the first and second housings, first and second conductive members, and a wireless communication circuit. The first housing includes a first side facing a first direction, a second side facing a second direction opposite to the first direction, and a first lateral side surrounding at least part of a space between the first side and the second side. The second housing includes a third side facing a third direction, a fourth side facing a fourth direction opposite to the third direction, and a second lateral side surrounding at least part of a space between the third side and the fourth side. The connecting member connects the first and second housings such that (Continued)

folding of the first and second housings results in the first and second lateral sides abutting against each other.

14 Claims, 107 Drawing Sheets

(51) Int. Cl.
    *H04M 1/02*                  (2006.01)
    *H01Q 5/342*                (2015.01)
    *H01Q 5/385*                (2015.01)

(52) U.S. Cl.
    CPC .......... *H04M 1/0216* (2013.01); *H01Q 5/385* (2015.01); *H04M 1/0268* (2013.01)

(56) References Cited

U.S. PATENT DOCUMENTS

| | | | |
|---|---|---|---|
| 9,105,986 B2 * | 8/2015 | Mahanfar | H01Q 13/10 |
| 9,831,928 B2 | 11/2017 | Kim | |
| 9,952,622 B2 * | 4/2018 | Kim | H05K 5/02 |
| 10,075,569 B2 * | 9/2018 | Kim | H01Q 5/385 |
| 10,200,521 B2 * | 2/2019 | Kim | H04M 1/0214 |
| 10,446,911 B2 * | 10/2019 | Karilainen | H01Q 3/24 |
| 10,456,052 B2 * | 10/2019 | Lee | H04M 1/0268 |
| 10,651,542 B2 * | 5/2020 | Choi | H01Q 21/28 |
| 10,879,589 B2 * | 12/2020 | Lim | H01Q 5/335 |
| 11,121,454 B2 * | 9/2021 | Zhang | H01Q 9/42 |
| 11,184,980 B2 * | 11/2021 | An | G06F 1/203 |
| 11,205,834 B2 * | 12/2021 | Ayala Vazquez | H01Q 9/42 |
| 11,462,818 B2 * | 10/2022 | Yoon | H01Q 5/328 |
| 2003/0117324 A1 * | 6/2003 | Iwai | H01Q 21/29 343/702 |
| 2004/0227673 A1 * | 11/2004 | Iwai | H01Q 1/27 343/702 |
| 2005/0146475 A1 * | 7/2005 | Bettner | H01Q 1/2266 343/767 |
| 2006/0146488 A1 * | 7/2006 | Kimmel | G06F 1/1616 361/679.04 |
| 2008/0106477 A1 * | 5/2008 | Mashima | H01Q 1/243 343/702 |
| 2009/0170570 A1 * | 7/2009 | Uejima | H01Q 1/243 455/575.3 |
| 2010/0248800 A1 * | 9/2010 | Hiraoka | H01Q 21/28 455/575.7 |
| 2011/0080703 A1 | 4/2011 | Schlesener et al. | |
| 2012/0068893 A1 | 3/2012 | Guterman et al. | |
| 2012/0112970 A1 * | 5/2012 | Caballero | H01Q 7/00 343/702 |
| 2012/0194394 A1 * | 8/2012 | Togashi | H01Q 13/10 343/702 |
| 2013/0009849 A1 * | 1/2013 | Ohguchi | H01Q 21/28 343/893 |
| 2013/0201067 A1 | 8/2013 | Hu et al. | |
| 2013/0321340 A1 * | 12/2013 | Seo | G06F 3/04883 345/174 |
| 2014/0240178 A1 * | 8/2014 | Chun | G06F 1/1698 343/702 |
| 2014/0266937 A1 * | 9/2014 | Mahanfar | H01Q 9/00 343/726 |
| 2015/0171916 A1 * | 6/2015 | Asrani | H04M 1/0202 455/575.7 |
| 2015/0317120 A1 * | 11/2015 | Kim | G06F 3/1446 345/1.3 |
| 2015/0326053 A1 * | 11/2015 | Amano | H02J 50/40 320/108 |
| 2017/0141820 A1 * | 5/2017 | Kim | H01Q 1/42 |
| 2017/0142241 A1 * | 5/2017 | Kim | H01Q 1/243 |
| 2017/0245377 A1 * | 8/2017 | Lee | A61B 5/6898 |
| 2017/0346164 A1 * | 11/2017 | Kim | H01Q 1/48 |
| 2017/0351297 A1 * | 12/2017 | Kim | H05K 5/02 |
| 2017/0365930 A1 * | 12/2017 | Nishioka | G06F 3/1454 |
| 2018/0261907 A1 * | 9/2018 | Ha | H01Q 1/24 |
| 2018/0261921 A1 * | 9/2018 | Ha | H04M 1/0277 |
| 2018/0366813 A1 * | 12/2018 | Kim | H01Q 21/00 |
| 2018/0375976 A1 * | 12/2018 | Kikuchi | H04M 1/0247 |
| 2019/0007533 A1 * | 1/2019 | Kim | H01Q 5/385 |
| 2019/0067797 A1 * | 2/2019 | Jung | H01Q 21/28 |
| 2019/0103656 A1 * | 4/2019 | Shi | G06F 1/1683 |
| 2019/0131722 A1 * | 5/2019 | Ryu | H01Q 25/005 |
| 2019/0393586 A1 * | 12/2019 | Ayala Vazquez | H01Q 13/103 |
| 2020/0051468 A1 * | 2/2020 | Jung | G06F 1/1681 |
| 2020/0076062 A1 * | 3/2020 | Lee | H04M 1/0268 |
| 2020/0119429 A1 * | 4/2020 | Park | H01Q 5/35 |
| 2020/0136231 A1 * | 4/2020 | Lee | H04M 1/0216 |
| 2020/0235459 A1 * | 7/2020 | Chun | H01Q 1/22 |
| 2020/0245481 A1 * | 7/2020 | Yoon | H01Q 1/2266 |
| 2020/0266524 A1 * | 8/2020 | Yoon | H01Q 21/28 |
| 2020/0267861 A1 * | 8/2020 | Kim | H05K 5/0247 |
| 2020/0287274 A1 * | 9/2020 | Zhang | H01Q 5/328 |
| 2021/0075459 A1 * | 3/2021 | Noh | H01Q 3/24 |
| 2021/0168227 A1 * | 6/2021 | Jung | H01Q 5/35 |
| 2021/0377372 A1 * | 12/2021 | Jung | H01Q 5/307 |
| 2021/0391642 A1 * | 12/2021 | Yoon | G06F 1/1698 |
| 2022/0061175 A1 * | 2/2022 | Oh | H01Q 21/28 |
| 2022/0103668 A1 * | 3/2022 | Kim | H01Q 5/335 |
| 2022/0115768 A1 * | 4/2022 | Oh | H01Q 5/385 |
| 2022/0132682 A1 * | 4/2022 | Son | H01Q 1/48 |
| 2022/0384934 A1 * | 12/2022 | Son | H01Q 5/371 |

FOREIGN PATENT DOCUMENTS

| | | |
|---|---|---|
| JP | 2015-159613 | 9/2015 |
| JP | 2015159613 | 9/2015 |
| KR | 1020070033450 | 3/2007 |
| KR | 1020140037687 | 3/2014 |
| KR | 1020140105886 | 9/2014 |
| KR | 101495161 | 2/2015 |
| KR | 1020150128985 | 11/2015 |
| WO | WO 2017/082659 | 5/2017 |

OTHER PUBLICATIONS

PCT/ISA/210 Search Report dated May 11, 2017 issued on PCT/KR2017/000984 (pp. 5).
PCT/ISA/237 Written Opinion dated May 11, 2017 issued on PCT/KR2017/000984 (pp. 6).
European Search Report dated Mar. 29, 2019 issued in counterpart application No. 17786071.5-1205, 9 pages.
European Search Report dated Oct. 29, 2020 issued in counterpart application No. 17786071.5-1205, 5 pages.
European Search Report dated Aug. 6, 2021 issued in counterpart application No. 21167587.1-1205, 8 pages.
Indian Examination Report dated Apr. 1, 2022 issued in counterpart application No. 202148044672, 5 pages.
European Search Report dated Sep. 28, 2022 issued in counterpart application No. 22177634.7-1205, 7 pages.
KR Notice of Patent Grant dated Jan. 2, 2023 issued in counterpart application No. 10-2016-0049632, 5 pages.

* cited by examiner

ANTENNA AND ELECTRONIC DEVICE COMPRISING SAME

PRIORITY

This application is a Continuation of U.S. patent application Ser. No. 16/095,618, filed on Oct. 22, 2018, which is a National Phase Entry of PCT International Application No. PCT/KR2017/000984, which was filed on Jan. 26, 2017, and claims priority to Korean Patent Application No. 10-2016-0049632, which was filed on Apr. 22, 2016, the contents of each of which are incorporated herein by reference.

BACKGROUND

1. Field

Various embodiments of the present disclosure relate to an electronic device, and for example, an electronic device including an antenna.

2. Description of Related Art

With the development of electronic telecommunication techniques, electronic devices having various functions have recently been introduced. In general, the electronic devices have a convergence function which performs one or more functions in combination.

Recently, with a significant decrease in a technological gap of each manufacturer, electronic devices have become slimmer to satisfy purchasing needs of consumers while emphasizing a design aspect.

In recent years, a rotatable-type (e.g., foldable-type, slide-type, swivel-type, etc.) electronic device has been introduced in which at least two housings operate in a rotatable manner by means of a connecting portion. According to an embodiment, the rotatable-type electronic device may be disposed in such a manner that at least two housings overlap with each other, and thus an antenna disposed to any one housing may experience deterioration in radiation performance due to a metallic member disposed at a corresponding location of another housing overlapping therewith.

SUMMARY

According to various embodiments of the present disclosure, there may be provided an antenna capable of avoiding antenna performance deterioration which occurs due to overlapping of a housing, and an electronic device including the antenna.

In addition, according to various embodiments of the present disclosure, a space for deploying at least one antenna which must be provided for communication can be effectively ensured among components of an electronic device, while preventing radiation performance deterioration.

According to an embodiment of the present disclosure, an electronic device may include a first housing including a first side facing a first direction, a second side facing a second direction opposite to the first direction, and a first lateral side surrounding at least part of a space between the first side and the second side, a second housing including a third side facing a third direction, a fourth side facing a fourth direction opposite to the third direction, and a second lateral side surrounding at least part of a space between the third side and the fourth side, a first display located in the first housing and exposed through the first housing, a connecting member which connects the first housing and the second housing such that the first housing and the second housing are folded to face each other, wherein when the first housing and the second housing are folded, the first lateral side and the second lateral side abut against each other, a first conductive member disposed to at least part of the first lateral side, wherein the first conductive member includes a first non-conductive slit and second non-conductive slit extended in the first direction or the second direction such that the first conductive member is divided into a plurality of conductive segments, a second conductive member disposed to at least part of the second lateral side, wherein the second conductive member includes a third non-conductive slit and fourth non-conductive slit extended in the third direction or the fourth direction such that the second conductive member is divided into a plurality of conductive segments, and when the first housing and the second housing are folded, the first slit and the fourth slit abut against each other and the second slit and the third slit abut against each other, and at least one wireless communication circuit electrically connected with one of the plurality of conductive segments of the first conductive member at a first point abutting against the first slit, and electrically connected with another of the plurality of conductive segments of the first conductive member at a second point abutting against the second slit.

According to an embodiment of the present disclosure, an electronic device may include a first housing including a first side facing a first direction, a second side facing a second direction opposite to the first direction, and a first lateral side surrounding at least part of a space between the first side and the second side, a second housing including a third side facing a third direction, a fourth side facing a fourth direction opposite to the third direction, and a second lateral side surrounding at least part of a space between the third side and the fourth side, a connecting member which connects the first housing and the second housing such that the first housing and the second housing are folded to face each other, a first conductive member including a first non-conductive slit and second non-conductive slit disposed to at least part of the first lateral side and a plurality of conductive segments divided by the slits, a second conductive member including a third non-conductive slit and fourth non-conductive slit disposed to at least part of the first lateral side and a plurality of conductive segments divided by the slits, at least one wireless communication circuit electrically connected with at least one of the plurality of conductive segments of the first conductive member, and a switching circuit configured to selectively connect at least one of the conductive segments of the second conductive member with the ground member.

According to an embodiment of the present disclosure, an electronic device may include a first housing including a first side facing a first direction, a second side facing a second direction opposite to the first direction, and a first lateral side surrounding at least part of a space between the first side and the second side, a second housing including a third side facing a third direction, a fourth side facing a fourth direction opposite to the third direction, and a second lateral side surrounding at least part of a space between the third side and the fourth side, a connecting member which connects the first housing and the second housing such that, the first housing and the second housing are folded to face each other, a first conductive member including a first non-conductive slit and second non-conductive slit disposed to at least part of the first lateral side and a plurality of conductive segments divided by the slits, a second conductive member including a third non-conductive slit and fourth non-conductive slit disposed to at least part of the first lateral side and a plurality of conductive segments divided by the slits, at least one wireless communication circuit electrically connected with at least one of the plurality of conductive segments of the first conductive member, and a stub pattern connected with at least one of the conductive segments of the second conductive member.

According to an electronic device including an antenna based on the present disclosure, since a slit is disposed to a conductive member of a second housing so as to correspond to a slit of a conductive member of a first housing, there may be a decrease in antenna radiation performance which may occur when the first housing and the second housing are folded or when at least one of the first housing and the second housing rotates.

On the other hand, effects obtained or predicted by various embodiments of the present disclosure will be directly or suggestively disclosed in the detailed description of embodiments of the present disclosure. For example, various effects predicted according to various embodiments of the present disclosure will be disclosed in the detailed description as follows.

BRIEF DESCRIPTION OF DRAWINGS

The above and other aspects, features and advantages of certain embodiments of the disclosure will be more apparent from the following detailed description taken in conjunction with the accompanying drawings, in which:

FIG. 15A and FIG. 155B illustrate an electronic device including an antenna having a single feeding portion including a stub pattern according to an embodiment of the present disclosure;

DETAILED DESCRIPTION

Figure 1:
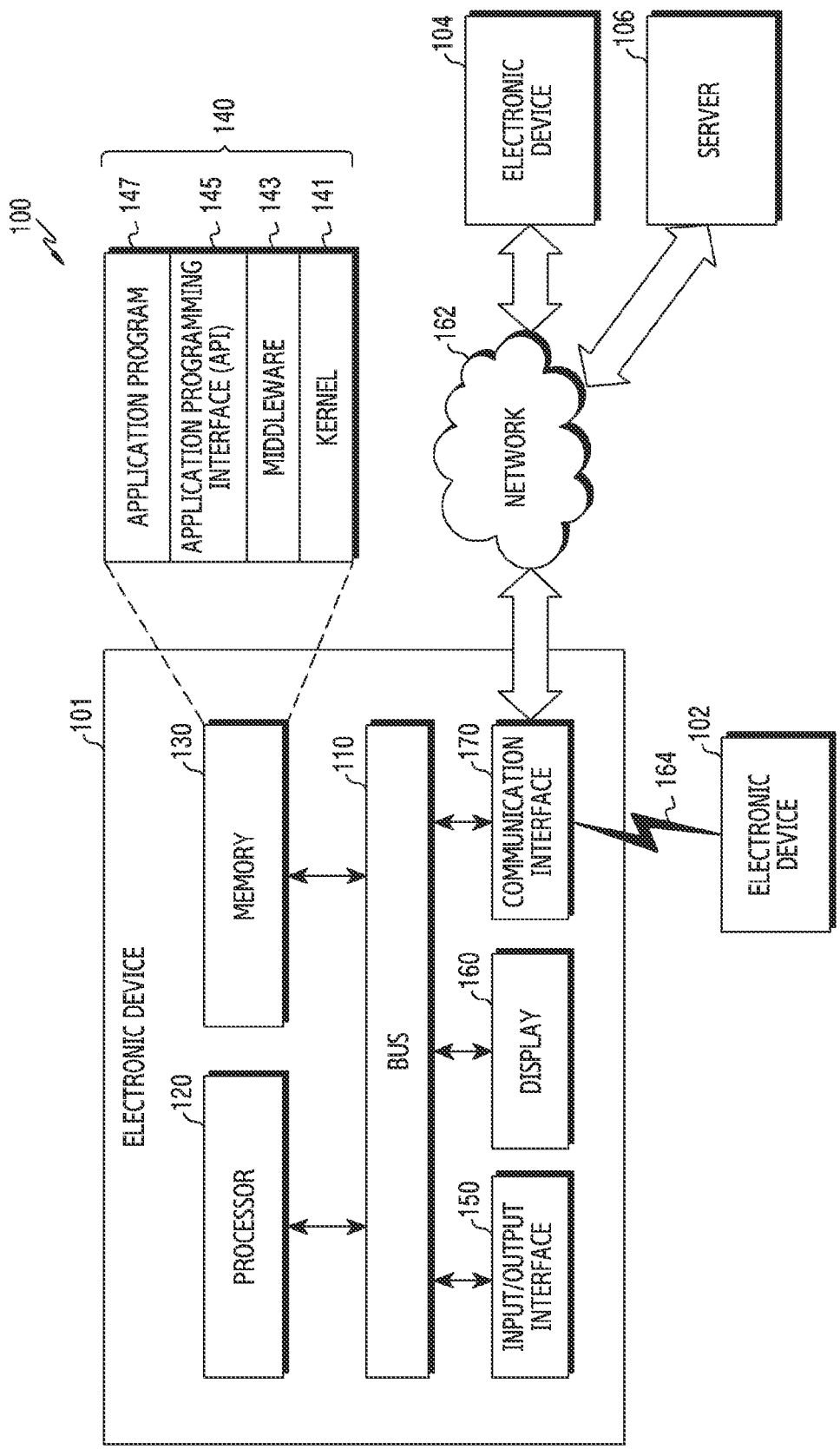
FIG. 1 illustrates a network environment including an electronic device according to various embodiments of the present disclosure.

Hereinafter, various exemplary embodiments of the present document are described with reference to the accompanying drawings. It should be understood, however, that it is not intended to limit the exemplary embodiments of the present document to the particular form disclosed, but, on the contrary, it is intended to cover all modifications, equivalents, and alternatives falling within the spirit and scope of the exemplary embodiments of the present document. Like reference numerals denote like constitutional elements throughout the drawings.

An expression "have", "may have", "include" or "may include" or the like used in the present document is intended to indicate a presence of a corresponding characteristic (e.g., a number, a function, an operation, or a constitutional element such as a component), and should be understood that there are additional possibilities of one or more other characteristics.

In the present document, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$" "$2^{nd}$", "first", and "second" may be used in the present document to express various constitutional elements, it is not intended to limit the corresponding constitutional elements. The above expressions may be used to distinguish one constitutional element from another constitutional element. For example, a $1^{st}$ user device and a $2^{nd}$ user device are both user devices, and indicate different user devices. For example, a $1^{st}$ constitutional element may be termed a $2^{nd}$ constitutional element, and similarly, the $2^{nd}$ constitutional element may be termed the $1^{st}$ constitutional element without departing from the scope of the present document.

When a certain constitutional element (e.g., the $1^{st}$ constitutional element) is mentioned as being "operatively or communicatively coupled with/to" or "connected to" a different constitutional element (e.g., the $2^{nd}$ constitutional element), it is to be understood that the certain constitutional element is directly coupled with/to another constitutional element or can be coupled with/to the different constitutional element via another constitutional element (e.g., a $3^{rd}$ constitutional element). On the other hand, when the certain constitutional element (e.g., the $1^{st}$ constitutional element) is mentioned as being "directly coupled with/to" or "directly connected to" the different constitutional element (e.g., the $2^{nd}$ constitutional element), it may be understood that another constitutional element (e.g., the $3^{rd}$ constitutional element) is not present between the certain constitutional element and the different constitutional element.

An expression "configured to" used in the present document may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

Terms used in the present document are for the purpose of describing particular embodiments only and are not intended to limit other exemplary embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present document. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the exemplary embodiments of the present document.

An electronic device according to various exemplary embodiments of the present document may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device. According to various exemplary embodiments, the wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit).

According to certain exemplary embodiments, the electronic device may be a home appliance. The home appliance may include, for example, at least one of a TeleVision (TV), a Digital Video Disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic picture frame.

According to other exemplary embodiments, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to certain exemplary embodiments, the electronic device may include at least one of furniture or a part of buildings/constructions, an electronic board, an electronic signature input device, a projector, and various measurement machines (e.g., water supply, electricity, gas, propagation measurement machine, etc.). In various exemplary embodiments, the electronic device may be one or more combinations of the aforementioned various devices. According to certain exemplary embodiments, the electronic device may be a flexible device. Further, the electronic device according to one exemplary embodiment of the present document is not limited to the aforementioned devices, and may include a new electronic device depending on technical progress.

Hereinafter, an electronic device according to various exemplary embodiments will be described with reference to the accompanying drawings. The term "user" used in the present document may refer to a person who uses the electronic device or a device which uses the electronic device (e.g., an Artificial Intelligence (AI) electronic device)

FIG. 1 illustrates a network environment including an electronic device according to various embodiments.

Referring to FIG. 1, an electronic device 101 in a network environment 100 is disclosed according to various exemplary embodiments. The electronic device 101 may include a bus 110, a processor 120, a memory 130, an input/output interface 150, a display 160, and a communication interface 170. In a certain exemplary embodiment, the electronic device 101 may omit at least one of the aforementioned constitutional elements or may additionally include other constitutional elements.

The bus 110 may include a circuit for connecting the aforementioned constitutional elements 120 to 170 to each other and for delivering communication (e.g., a control message and/or data) between the aforementioned constitutional elements.

The processor 120 may include one or more of a Central Processing Unit (CPU), an Application Processor (AP), and a Communication Processor (CP). The processor 120 may control, for example, at least one of other constitutional elements of the electronic device 101 and/or may execute an arithmetic operation or data processing for communication.

The memory 130 may include a volatile and/or nonvolatile memory. The memory 130 may store, for example, an instruction or data related to at least one different constitutional element of the electronic device 101. According to one exemplary embodiment, the memory 130 may store a software and/or a program 140. The program 140 may include, for example, a kernel 141, a middleware 143, an Application Programming Interface (API) 145, and/or an application program (or an "application") 147, or the like. At least one part of the kernel 141, middleware 143, or API 145 may be referred to as an Operating System (OS).

The kernel 141 may control or manage, for example, system resources (e.g., the bus 110, the processor 120, the memory 130, etc.) used to execute an operation or function implemented in other programs (e.g., the middleware 143, the API 145, or the application program 147). Further, the kernel 141 may provide an interface capable of controlling or managing the system resources by accessing individual constitutional elements of the electronic device 101 in the middleware 143, the API 145, or the application program 147.

The middleware 143 may perform, for example, a mediation role so that the API 145 or the application program 147 can communicate with the kernel 141 to exchange data.

Further, the middleware 143 may handle one or more task requests received from the application program 147 according to a priority. For example, the middleware 143 may assign a priority of using the system resources (e.g., the bus 110, the processor 120, or the memory 130) of the electronic device 101 to at least one of the application programs 147. For instance, the middleware 143 may process the one or more task requests according to the priority assigned to the at least one of the application programs, and thus may perform scheduling or load balancing on the one or more task requests.

The API 145 may include at least one interface or function (e.g., instruction), for example, for file control, window control, video processing, or character control, as an interface capable of controlling a function provided by the application 147 in the kernel 141 or the middleware 143.

For example, the input/output interface 150 may play a role of an interface for delivering an instruction or data input from a user or a different external device(s) to the different constitutional elements of the electronic device 101. Further, the input/output interface 150 may output an instruction or data received from the different constitutional element(s) of the electronic device 101 to the different external device.

The display 160 may include various types of displays, for example, a Liquid Crystal Display (LCD) display, a Light Emitting Diode (LED) display, an Organic Light-Emitting Diode (OLED) display, a MicroElearoMechanical Systems (MEMS) display, or an electronic paper display. The display 160 may display, for example, a variety of contents (e.g., text, image, video, icon, symbol, etc.) to the user. The display 160 may include a touch screen. For example, the display 160 may receive a touch, gesture, proximity, or hovering input by using a stylus pen or a part of a user's body.

The communication interface 170 may establish, for example, communication between the electronic device 101 and the external device (e.g., a $1^{st}$ external electronic device 102, a $2^{nd}$ external electronic device 104, or a server 106). For example, the communication interface 170 may communicate with the external device (e.g., the $2^{nd}$ external electronic device 104 or the server 106) by being connected with a network 162 through wireless communication or wired communication.

For example, as a cellular communication protocol, the wireless communication may use at least one of Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like. Further, the wireless communication may include, for example, a near-distance communication 164. The near-distance communication 164 may include, for example, at least one of Wireless Fidelity (WiFi), Bluetooth, Near Field Communication (NFC), Global Navigation Satellite System (GNSS), and the like. According to a usage region or a bandwidth or the like, the GNSS may include, for example, at least one of Global Positioning System (GPS), Global Navigation Satellite System (Glonass), Beidou Navigation Satellite System (hereinafter, "Beidou"), Galileo, the European global satellite-based navigation system, and the like. Hereinafter, the "GPS" and the "GNSS" may be used interchangeably in the present document. The wired communication may include, for example, at least one of Universal Serial Bus (USB), High Definition Multimedia Interface (HDMI), Recommended Standard-232 (RS-232), power-line communication, Plain Old Telephone Service (POTS), and the like. The network 162 may include, for example, at least one of a telecommunications network, a computer network (e.g., LAN or WAN), the Internet, and a telephone network.

Each of the $1^{st}$ and $2^{nd}$ external electronic devices 102 and 104 may be the same type or different type of the electronic device 101. According to one exemplary embodiment, the server 106 may include a group of one or more servers. According to various exemplary embodiments, all or some of operations executed by the electronic device 101 may be executed in a different one or a plurality of electronic devices (e.g., the electronic device 102 or 104 or the server 106). According to one exemplary embodiment, if the electronic device 101 needs to perform a certain function or service either automatically or at a request, the electronic device 101 may request at least a part of functions related thereto alternatively or additionally to a different electronic device (e.g., the electronic device 102 or 104 or the server 106) instead of executing the function or the service autonomously. The different electronic device (e.g., the electronic device 102 or 104 or the server 106) may execute the requested function or additional function, and may deliver a result thereof to the electronic device 101. The electronic device 101 may provide the requested function or service either directly or by additionally processing the received result. For this, for example, a cloud computing, distributed computing, or client-server computing technique may be used.

In the present invention, a conductive member used for an antenna radiator may include a conductive member disposed around edge of the electronic device as examples, but the conductive member used for an antenna radiator is not limited thereto. For example, various structures comprising metal material may be used for an antenna radiator. According to an embodiment, the electronic device may be a bar-type electronic device, but the electronic device in not limited thereto. For example, the electronic device may be an electronic device with various open and close types, or may be a wearable electronic device.

Figure 2:
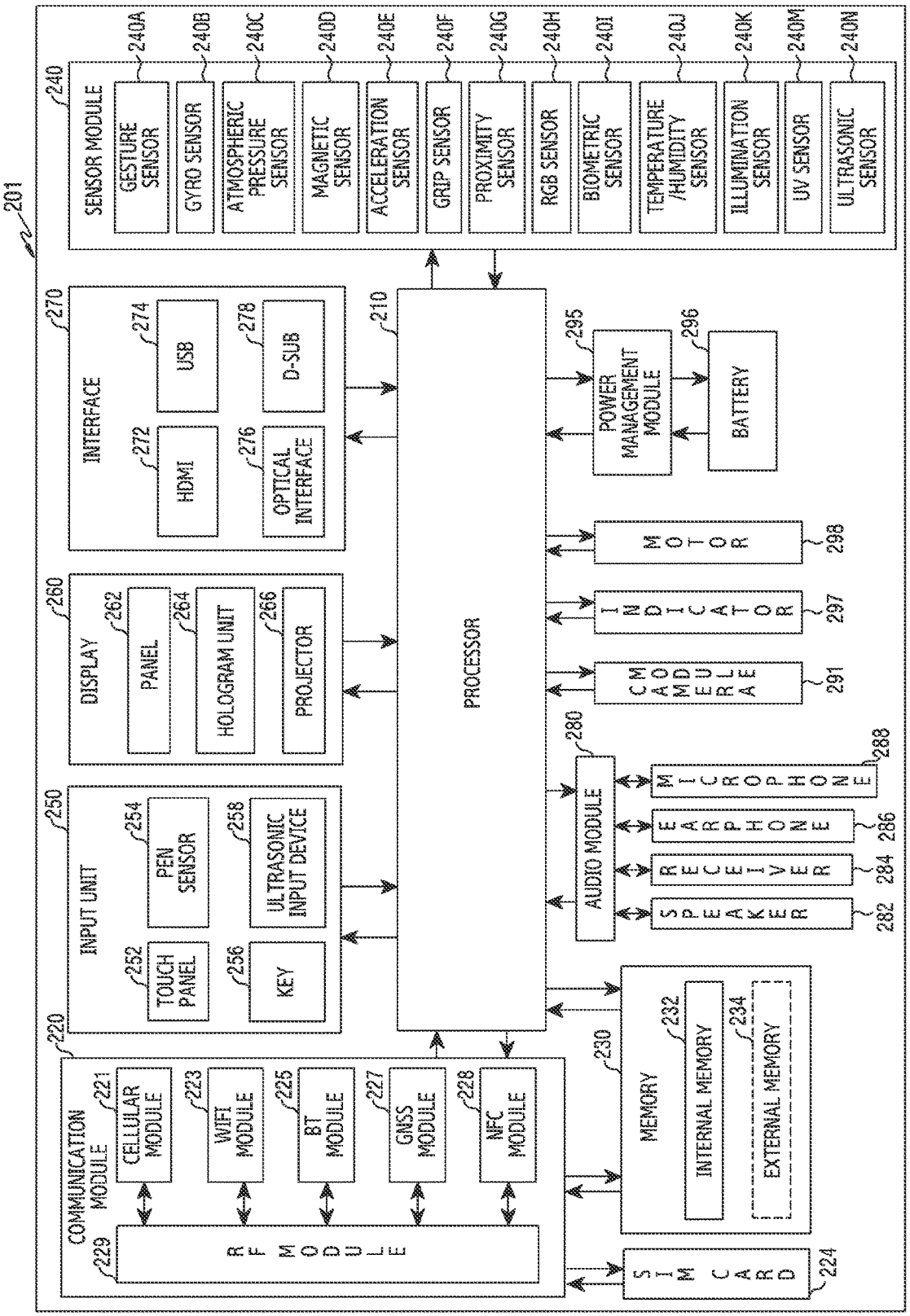
FIG. 2 is a block diagram of an electronic device according to various embodiments of the present disclosure.

FIG. 2 is a block diagram of an electronic device according to various exemplary embodiments.

The electronic device 201 may include, for example, all or some parts of the electronic device 101 of FIG. 1. The electronic device 201 may include one or more processors (e.g., Application Processors (APs)) 210, a communication module 220, a subscriber identity module 224, a memory 230, a sensor module 240, an input unit 250, a display 260, an interface 270, an audio module 280, a camera module 291, a power management module 295, a battery 296, an indicator 297, and a motor 298.

The processor 210 may control a plurality of hardware or software constitutional elements connected to the processor 210 by driving, for example, an operating system or an application program, and may process a variety of data including multimedia data and may perform an arithmetic operation. The processor 210 may be implemented, for example, with a System on Chip (SoC). According to one exemplary embodiment, the processor 210 may further include a Graphic Processing Unit (GPU) and/or an image signal processor. The processor 210 may include at least one part (e.g., a cellular module 221) of the aforementioned constitutional elements of FIG. 2. The processor 210 may process an instruction or data, which is received from at least one of different constitutional elements (e.g., a non-volatile memory), by loading it to a volatile memory and may store a variety of data in the non-volatile memory.

The communication module 220 may have the same or similar configuration of the communication interface 170 of FIG. 1. The communication module 220 may include, for example, the cellular module 221, a Wi-Fi module 223, a BlueTooth (BT) module 225, a GNSS module 227 (e.g., a GPS module, a Glonass module, a Beidou module, or a Galileo module), a Near Field Communication (NFC) module 228, and a Radio Frequency (RF) module 229.

The cellular module 221 may provide a voice call, a video call, a text service, an Internet service, or the like, for example, through a communication network. According to one exemplary embodiment, the cellular module 221 may identify and authenticate the electronic device 201 in the communication network by using the subscriber identity module (e.g., a Subscriber Identity. Module (SIM) card) 224. According to one exemplary embodiment, the cellular module 221 may perform at least some functions that can be provided by the processor 210. According to one exemplary embodiment, the cellular module 221 may include a Communication Processor (CP).

Each of the WiFi module 223, the Bluetooth module 225, the GNSS module 227, and the NFC module 228 may include, for example, a processor for processing data transmitted/received through a corresponding module. According to a certain exemplary embodiment, at least some (e.g., two or more) of the cellular module 221, the WiFi module 223, the BT module 225, the GPS module 227, and the NEC module 228 may be included in one Integrated Chip (IC) or IC package.

The RE module 229 may transmit/receive, for example, a communication signal (e.g., a Radio Frequency (RF) signal). The RF module 229 may include, for example, a transceiver, a Power Amp Module (PAM), a frequency filter, a Low Noise Amplifier (LNA), an antenna, or the like. According to another exemplary embodiment, at least one of the cellular module 221, the WiFi module 223, the BT module 225, the GPS module 227, and the NFC module 228 may transmit/receive an RE signal via a separate RF module.

The subscriber identity module 224 may include, for example, a card including the subscriber identity module and/or an embedded SIM, and may include unique identification information (e.g., an Integrated Circuit Card IDentifier (ICCID)) or subscriber information (e.g., an International Mobile Subscriber Identity (MIST)).

The memory 230 (e.g., the memory 130) may include, for example, an internal memory 232 or an external memory 234. The internal memory 232 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)).

The external memory 234 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 234 may be operatively and/or electrically connected to the electronic device 201 via various interfaces.

The sensor module 240 may measure, for example, physical quantity or detect an operational status of the electronic device 201, and may convert the measured or detected information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M, an ultrasonic sensor 240N. Additionally or alternatively, the sensor module 240 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 240 may further include a control circuit for controlling at least one or more sensors included therein. In a certain exemplary embodiment, the electronic device 201 may further include a processor configured to control the sensor module 204 either separately or as one part of the processor 210, and may control the sensor module 240 while the processor 210 is in a sleep state.

The input unit 250 may include, for example, a touch panel 252, a (digital) pen sensor 254, a key 256, or an ultrasonic input device 258. The touch panel 252 may recognize a touch input, for example, by using at least one of an electrostatic type, a pressure-sensitive type, and an ultrasonic type. In addition, the touch panel 252 may further include a control circuit. The touch penal 252 may further include a tactile layer and thus may provide the user with a tactile reaction.

The (digital) pen sensor 254 may be, for example, one part of a touch panel, or may include an additional sheet for recognition. The key 256 may be, for example, a physical button, an optical key, a keypad, or a touch key. The ultrasonic input device 258 may detect an ultrasonic wave generated from an input means through a microphone (e.g., a microphone 288) to confirm data corresponding to the detected ultrasonic wave.

The display 260 (e.g., the display 160) may include a panel 262, a hologram unit 264, or a projector 266. The panel 262 may include the same or similar structure of the display 160 of FIG. 1. The panel 262 may be implemented, for example, in a flexible, transparent, or wearable manner. The panel 262 may be constructed as one module with the touch panel 252. The hologram unit 264 may use an interference of light and show a stereoscopic image in the air. The projector 266 may display an image by projecting a light beam onto a screen. The screen may be located, for example, inside or outside the electronic device 201. According to one exemplary embodiment, the display 260 may further include a control circuit for controlling the panel 262, the hologram unit 264, or the projector 266.

The interface 270 may include, for example, a High-Definition Multimedia Interface (HDMI) 272, a Universal Serial Bus (USB) 274, an optical communication interface 276, or a D-subminiature (D-sub) 278. The interface 270 may be included, for example, in the communication interface 170 of FIG. 1. Additionally or alternatively, the interface 270 may include, for example, a Mobile High-definition Link (MHL) interface, a Secure Digital (SD)/Multi-Media Card (MMC) interface, or an Infrared Data Association (IrDA) standard interface.

The audio module 280 may bilaterally convert, for example, a sound and electric signal. At least some constitutional elements of the audio module 280 may be included in, for example, the input/output interface 150 of FIG. 1. The audio module 280 may convert sound information which is input or output, for example, through a speaker 282, a receiver 284, an earphone 286, the microphone 288, or the like.

The camera module 291 is, for example, a device for image and video capturing, and according to one exemplary embodiment, may include one or more image sensors (e.g., a front sensor or a rear sensor), a lens, an Image Signal Processor (ISP), or a flash (e.g., LED or xenon lamp).

The power management module 295 may manage, for example, power of the electronic device 201. According to one exemplary embodiment, the power management module 295 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 296 and voltage, current, and temperature during charging. The battery 296 may include, for example, a rechargeable battery and/or a solar battery.

The indicator 297 may display a specific state, for example, a booting state, a message state, a charging state, or the like, of the electronic device 201 or one part thereof (e.g., the processor 210). The motor 298 may convert an electric signal into a mechanical vibration, and may generate a vibration or haptic effect. Although not shown, the electronic device 201 may include a processing unit a GPU) for supporting a mobile TV. The processing unit for supporting the mobile TV may process media data according to a protocol of, for example, Digital Multimedia Broadcasting (DMB), Digital Video Broadcasting (DVB), MediaFlo™, or the like.

Each of constitutional elements described in the present document may consist of one or more components, and names thereof may vary depending on a type of an electronic device. The electronic device according to various exemplary embodiments may include at least one of the constitutional elements described in the present document. Some of the constitutional elements may be omitted, or additional other constitutional elements may be further included. Further, some of the constitutional elements of the electronic device according to various exemplary embodiments may be combined and constructed as one entity, so as to equally perform functions of corresponding constitutional elements before combination.

According to various embodiments, an electronic device including an antenna according to various embodiments of the present disclosure may be an electronic device having various rotation mechanisms including a first housing and a second housing rotatably disposed to the first housing, but the electronic device is not limited thereto. For example, the present disclosure may also apply to an electronic device having a single housing to which an antenna is disposed and a conductive member (e.g., a metal member, a metal ornament, etc.) is also disposed in a region overlapping with the antenna.

Figure 3A:
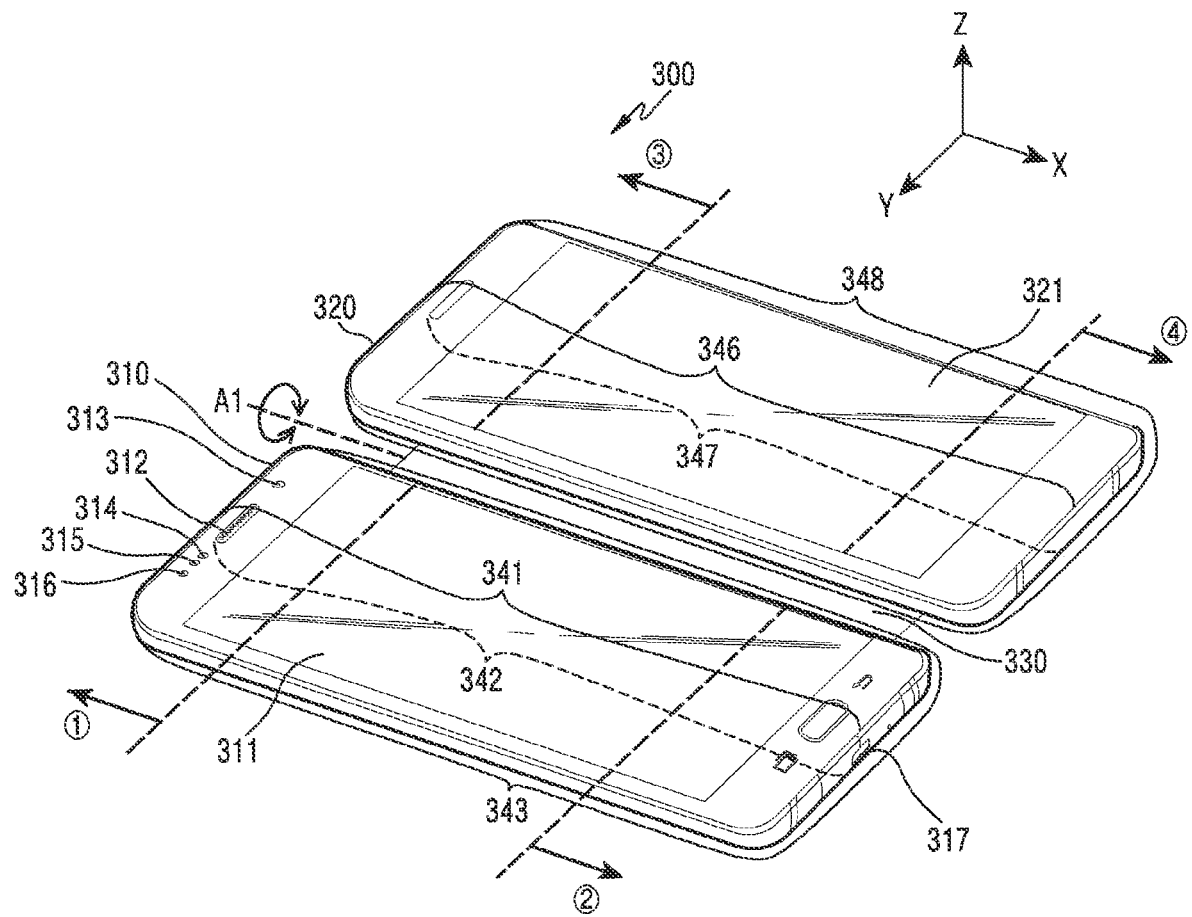
FIG. 3A to FIG. 3C are a perspective view and lateral view of an electronic device according to various embodiments of the present disclosure.
Figure 3A:
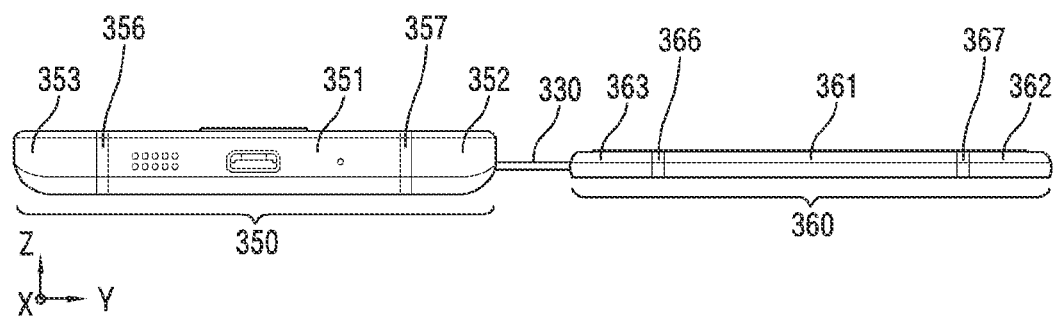
Figure 3B:
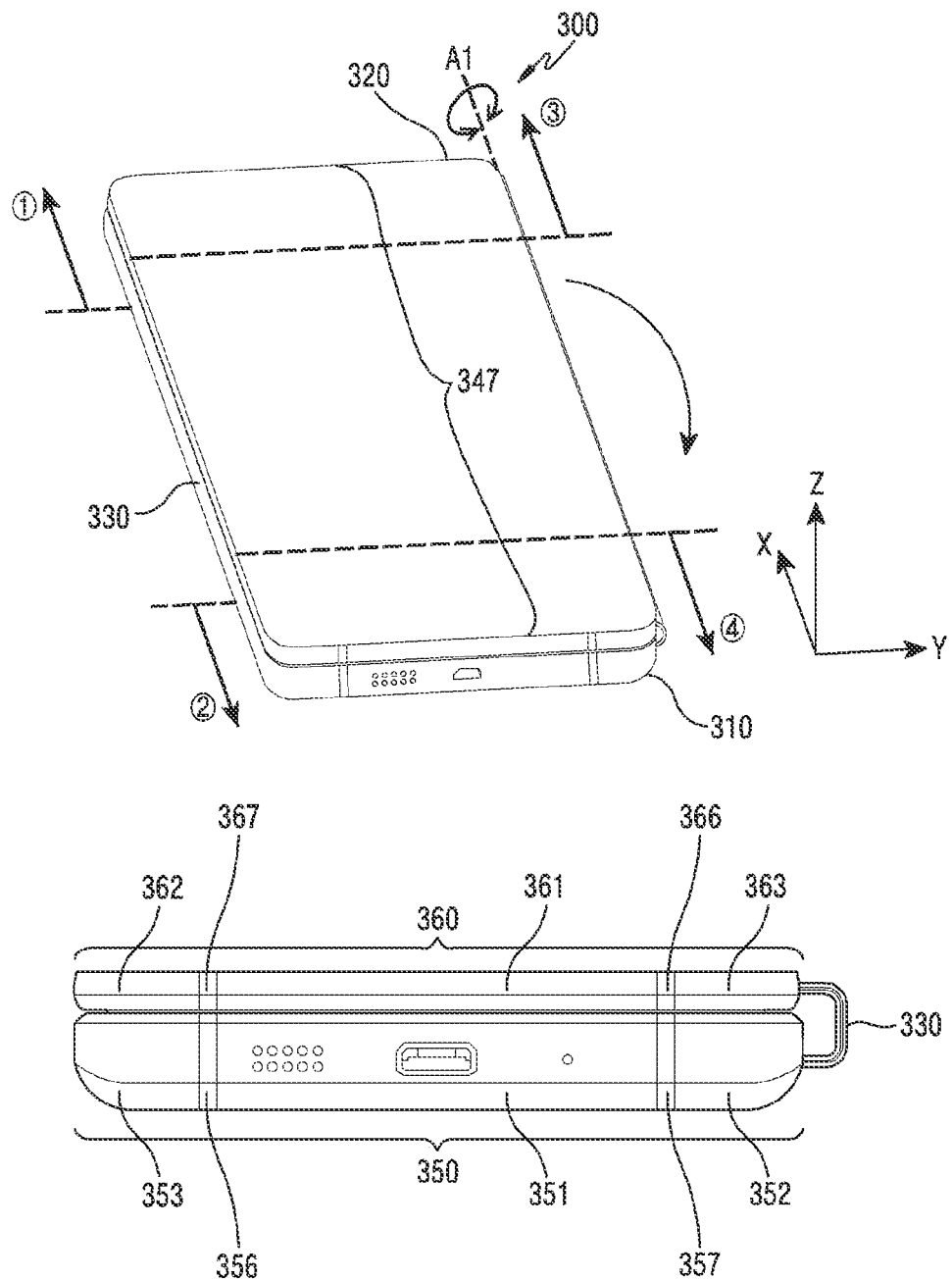
Figure 3C:
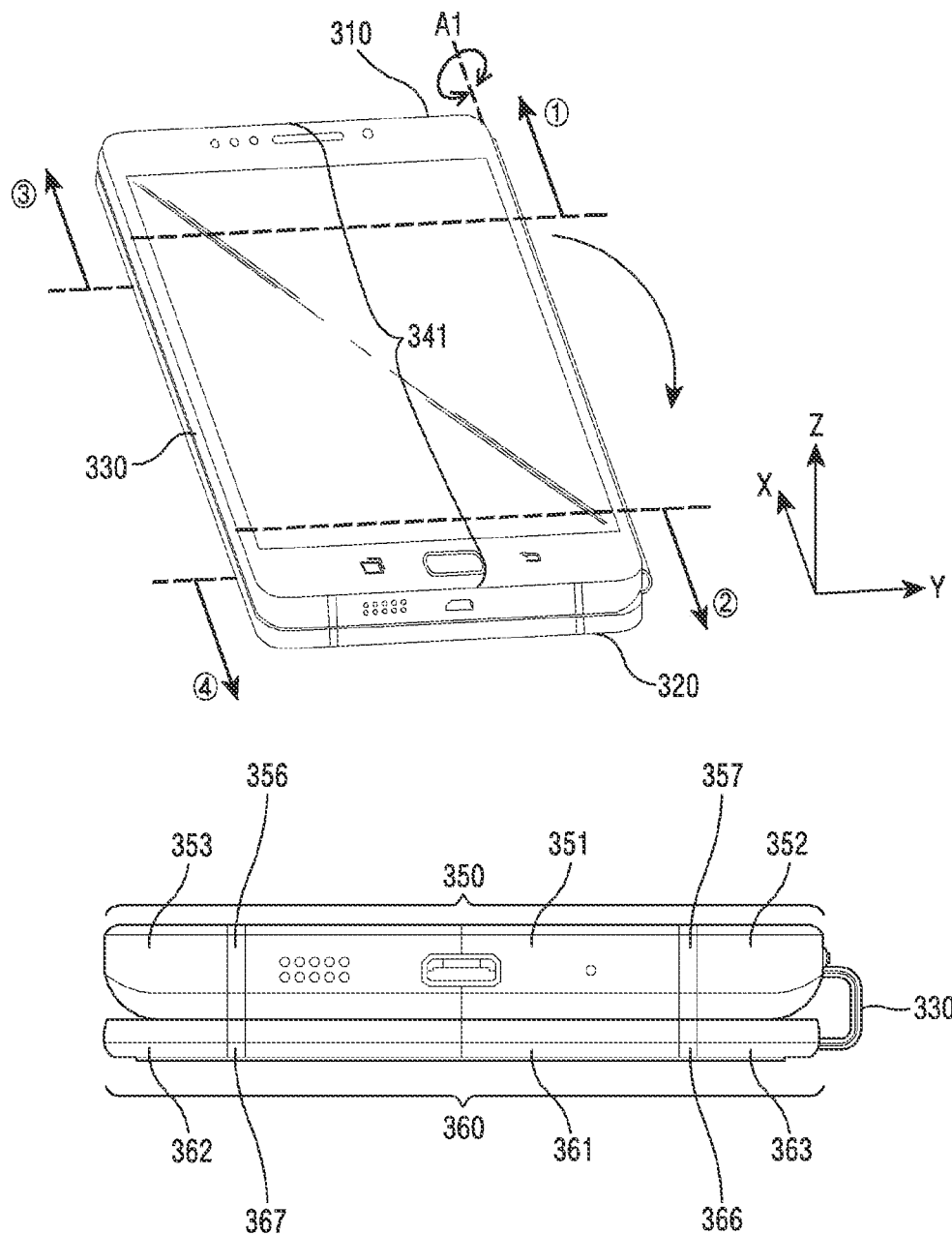
Figure 3D:
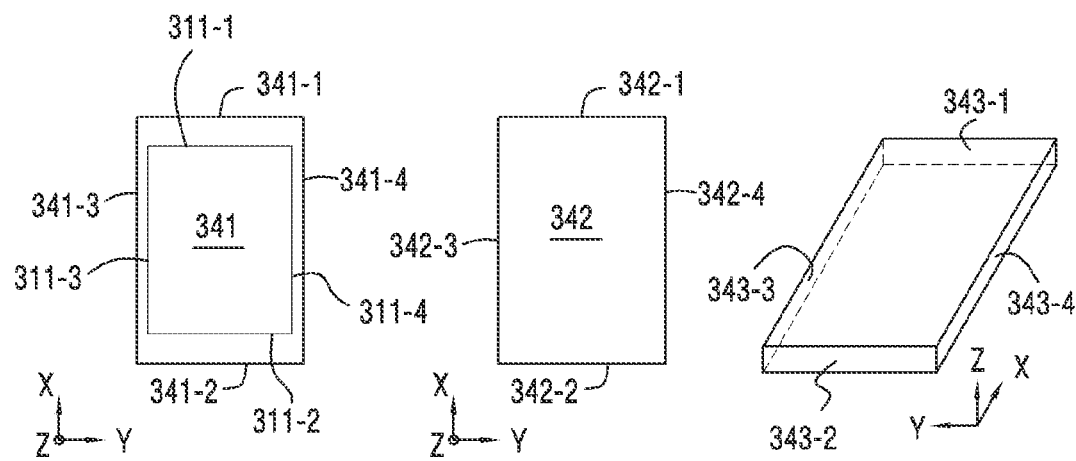
FIG. 3D is a drawing for briefly explaining an outer side of an electronic device according to various embodiments of the present disclosure.
Figure 3D:
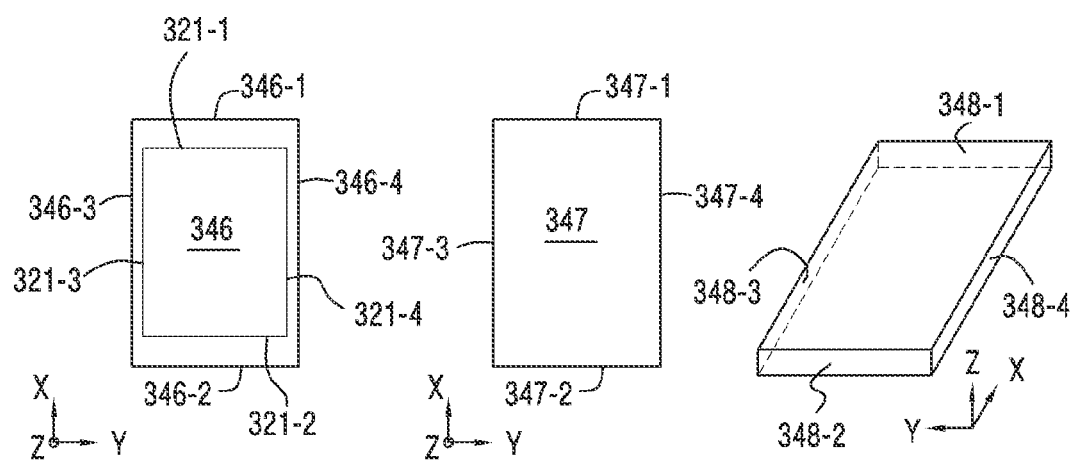

FIG. 3A to FIG. 3C are a perspective view and lateral view of an electronic device according to various embodiments of the present disclosure. FIG. 3D is a drawing for briefly explaining an outer side of an electronic device according to various embodiments of the present disclosure.

In FIG. 3A to FIG. 3D, a rectangular coordinate system is used. An X-axis may represent a lengthwise direction (e.g., a long-side direction) of an electronic device 300, a Y-axis may represent a widthwise direction (e.g., a short-side direction) of the electronic device 300, and a Z-axis may represent an up-and-down direction of the electronic device 300.

Referring to FIG. 3A to FIG. 3C, the electronic device 300 may include a first housing 310, a second housing 320, and a connecting member 330 for connecting the first housing 310 and the second housing 320.

According to an embodiment of the present disclosure, the first housing 310 and the second housing 320 may constitute the entirety or part of an exterior of the electronic device 300. The first housing 310 and/or the second housing 320 may be constructed of various materials. For example, the first housing 310 and/or the second housing 320 may be constructed of materials such as plastics, metals, carbon fibers and other fiber composites, ceramics, glass, wood, or combinations of these materials.

Referring to FIGS. 3A and 3D, according to an embodiment, the first housing 310 may include a first side 341 facing a first direction z, a second side 342 facing a second direction -z opposite to the first direction 341, and a first lateral side 343 at least partially surrounding a space between the first side 341 and the second side 342.

According to an embodiment, the first housing 310 may have a substantially rectangular plate shape.

For example, the first side 341 may have a substantially rectangular shape including a first edge #1 341-1, a first edge #2 341-2, a first edge #3 341-3, and a first edge #4 341-4. The first edge #1 341-1 and the first edge #2 341-2 may be disposed at opposite sides, and the first edge #3 341-3 and the first edge #4 341-4 may be disposed at opposite sides. The first edge #1 341-1 may connect one end of the first edge #3 341-3 and one end of the first edge #4 341-4. The first edge #2 341-2 may connect the other end of the first edge #3 341-3 and the other end of the first edge #4 341-4.

For example, the second side 342 may have a substantially rectangular shape including a second edge #1 342-1, a second edge #2 342-2, a second edge #3 342-3, and a second edge #4 342-4. The second edge #1 342-i and the second edge #2 342-2 may be disposed at opposite sides, and the second edge #3 342-3 and the second edge #4 342-4 may be disposed at opposite sides. The second edge #1 342-1 may connect one end of the second edge #3 342-3 and one end of the second edge #4 342-4. The second edge #2 342-2 may connect the other end of the second edge #3 342-3 and the other end of the second edge #4 342-4.

According to an embodiment, the first lateral side 343 may have a substantially rectangular annular shape including the first lateral side #1 343-1, the first lateral side #2 343-2, the first lateral side #3 343-3, and the first lateral side #4 343-4. The first lateral side #1 343-1 and the first lateral side #2 343-2 may be disposed at opposite sides. The first lateral side #3 343-3 and the first lateral side #4 343-4 may be disposed at opposite sides. For example, the first lateral side #1 343-1 may connect the first edge #1 341-1 of the first side 341 and the second edge #1 342-1 of the second side 342. The first lateral side #2 343-2 may connect the first edge #2 341-2 of the first side 341 and the second edge #2 342-2 of the second side 342. The first lateral side #3 343-3 may connect the first edge #3 341-3 of the first side 341 and the second edge #3 342-3 of the second side 342. The first lateral side #4 343-4 may connect the first edge #4 341-4 of the first side 341 and the second edge #4 342-4 of the second side 342.

According to various embodiments, the electronic device 300 may include various shapes of electronic components disposed to abut against the first side 341 of the first housing 310. For example, the electronic component may include a first display 311 disposed along at least part of the first side 341 of the first housing 310. The first display 311 may be exposed through the first side 341 of the first housing 310.

According to various embodiments, the first display 311 may further include a panel capable of receiving a touch input or a hovering input. Alternatively, the first display 311 may further include a panel (e.g., a digitizer) capable of receiving the touch input or the hovering input by using a stylus. Alternatively, the first display 311 may include various shapes of touch screens.

According to various embodiments, the first display 311 may have a shape in which sensors for the touch input or the hovering input are combined with an on-cell region or in-cell region of the display panel.

According to various embodiments, the first display 311 may have a substantially rectangular shape including four edges. For example, the first display 311 may include a screen first edge #1 311-1 abutting against the first edge #1 341-1 of the first side 341, a screen first edge #2 311-2 abutting against the first edge #2 341-1 of the first side 341, a screen first edge #3 311-3 abutting against the first edge #3 341-3 of the first side 341, and a screen first edge #4 311-4 abutting against the first edge #4 341-4 of the first side 341.

According to various embodiments, the electronic device 300 may output a main home screen by using the first display 311. The main home screen may be a first screen displayed on the display 311 when power of the electronic device 300 is on. When the electronic device 300 has several pages of different home screens, the main home screen may be a first home screen among the several pages of the home screens. Short-cut icons, a main menu switching key, time, weather, or the like may be displayed on the home screen to execute frequently used applications. The main menu switching key may display a menu screen on the display 311. For another example, a status bar indicating a status of the electronic device 300, such as a battery charging status, received signal strength, and current time, may be displayed on an upper region included in the display 311.

According to another embodiment, the electronic device 300 may include various shapes of electronic components disposed between the first edge #1 341-1 of the first side 341 and the screen first edge #1 311-1 of the first display 311. For example, the electronic component may include a receiver 312 to output a voice transmitted from a peer terminal during a call is made. Alternatively, the electronic component may include at least one of sensors 313, 314, and 135. The sensors 313, 314, and 315 may include at least one of, for example, an illumination sensor (e.g., an optical sensor), a proximity sensor (e.g., an optical sensor), an infrared sensor, and an ultrasonic sensor. Alternatively, the electronic component may include a camera 316 (or a front camera).

According to another embodiment, the electronic device 300 may include various shapes of electronic components disposed between the first edge #2 341-2 of the first side 341 and the first edge #2 311-2 of the first display 311. For example, the electronic component may be a touch key, a key button, or the like. For or example, the key button may perform a home key button function. Alternatively, a fingerprint sensor device may be disposed to the home key button. A signal may be generated by a gesture which physically presses the home key button, and the electronic device 300 may perform a first function (a home screen return function, a wake-up/sleep function, etc.) based on this signal. Alternatively, a signal may be generated by a gesture which swipes or touches an upper side of the home key button, and the electronic device 300 may perform a second function (e.g., a fingerprint recognition function, etc.) based on this signal.

According to various embodiments, although not shown, the electronic device 300 may include various shapes of electronic components disposed to abut against the second side 342 of the first housing 310. For example, the electronic component may include a camera (or a rear camera), a camera flash, a speaker, an output device (e.g., a button), or the like. For another example, the electronic component may include a display (not shown).

According to various embodiments, the electronic device 300 may include various shapes of electronic components disposed to abut against the first lateral side 343 of the first housing 341. For example, the electronic component may include a socket device (not shown) capable of connecting a card-type external device. Alternatively, the electronic component may include a socket device (not shown) capable of connecting a memory card (e.g., Compact Flash (CF), Multi Media Card (MMC), Smart Media Card (SMC), a Secure Disk (SD), a Memory Stick (MS), etc.). Alternatively, the electronic component may include a socket device (not shown) capable of connecting a Subscriber Identification Module (SIM) card or a Universal Subscriber Identification Module (ISIM) card. Alternatively, the electronic component may include an interface connector port 317. The interface connector port 317 may be used to charge the electronic device 300 by using a data transmission/reception function and/or external power provided by an external device. Alternatively, the electronic component may include a socket device (e.g., an ear jack) (not shown) capable of inserting an ear plug. The first lateral side 343 may include a through-hole for various shapes of the socket device.

According to various embodiments, the interface connector port 317 may be disposed to the first lateral side #2 343-2 of the first housing 341, and the ear jack may be disposed to the first lateral side #1 343-1 of the first housing 341.

For another example, the electronic device 300 may include various shapes of key buttons (or side key buttons) disposed to the first lateral side 343 of the first housing 310. For example, at least one key button may be disposed to the first lateral side #3 343-3, and may be used for a volume up/down function, a scroll function, or the like. Another key button of the at least one key button may be disposed to the first lateral side #4 343-4, and may be used for a power on/off function, a wake-up/sleep function of the electronic device, or the like.

Referring to FIGS. 3A and 3D, the second housing 320 may include a third side 346 facing a third direction z, a fourth side 347 facing a fourth direction -z opposite to the third direction z, and a second lateral side 348 at least partially surrounding a space between the third side 346 and the fourth side 347.

According to an embodiment, the second housing 320 may have a substantially rectangular plate shape. For example, the third side 346 may have a substantially rectangular shape including a third edge #1 346-1, a third edge #2 346-2, a third edge #3 346-3, and a third edge #4 346-4. The third edge #1 346-1 and the third edge #2 346-2 may be disposed at opposite sides, and the third edge #3 346-3 and the third edge #4 346-4 may be disposed at opposite sides. The third edge #1 346-1 may connect one end of the third edge #3 346-3 and one end of the third edge #4 346-4. The third edge #2 346-2 may connect the other end of the third edge #3 346-3 and the other end of the third edge #4 346-4.

For example, the fourth side 347 may have a substantially rectangular shape including a fourth edge #1 347-1, a fourth edge #2 347-2, a fourth edge #3 347-3, and a fourth edge #4 347-4. The fourth edge #1 347-1 and the fourth edge #2 347-2 may be disposed at opposite sides, and the fourth edge #3 347-3 and the fourth edge #4 347-4 may be disposed at opposite sides. The fourth edge #1 347-1 may connect one end of the fourth edge #3 347-3 and one end of the fourth edge #4 347-4. The fourth edge #2 347-2 may connect the other end of the fourth edge #3 347-3 and the other end of the fourth edge #4 347-4.

According to an embodiment, the second lateral side 348 may have a substantially rectangular annular shape including a second lateral side #1 348-1, a second lateral side #2 348-2, a second lateral side #3 348-3, and a second lateral side #4 348-4. The second lateral side #1 348-1 and the second lateral side #2 348-2 may be disposed at opposite sides. The second lateral side #3 348-3 and the second lateral side #4 348-4 may be disposed at opposite sides. For example, the second lateral side #1 348-1 may connect the second edge #1 341-1 of the third side 346 and the second edge #1 342-1 of the fourth side 347. The second lateral side #2 348-2 may connect the second edge #2 341-2 of the third side 346 and the second edge #2 342-2 of the fourth side 347. The second lateral side #3 348-3 may connect the third edge #3 346-3 of the third side 346 and the fourth edge #3 347-3 of the fourth side 347. The second lateral side #4 348-4 may connect the third edge #4 346-4 of the third side 346 and the fourth edge #4 347-4 of the fourth side 347.

According to various embodiments, the electronic device 300 may include various shapes of electronic components disposed to abut against the third side 346 of the second housing 320. For example, the electronic component may include a second display 321 disposed along at least part of the third side 346 of the second housing 320. The second display 321 may be exposed through the third side 346 of the second housing 320.

According to various embodiments, the second display 321 may further include a panel capable of receiving a touch input or a hovering input. Alternatively, the second display 321 may further include a panel (e.g., a digitizer) capable of receiving the touch input or the hovering input by using a stylus. Alternatively, the second display 321 may include various shapes of touch screens.

According to various embodiments, the first display 311 may have a shape in which sensors for the touch input or the hovering input are combined with an on-cell region or in-cell region of the display panel.

According to various embodiments, the electronic device 300 may include various shapes of electronic components (e.g., a display sensor, a speaker, a socket, etc.) (not shown) disposed to abut against the fourth lateral side 347 of the second housing 320. Alternatively, the electronic device 300 may include various shapes of electronic components (e.g., key buttons) (not shown) disposed to the second lateral side 348 of the second housing 320.

According to various embodiments, the first display 311 may include a substantially flat surface. Alternatively, at least part of the first display 311 may include a curved portion having a curvature. For example, the curved portion may be constructed to have an inclined or curved side.

According to various embodiments, the first display 311 may include a first edge region #3 (not shown) abutting against the screen first edge #3 311-3 and a first edge region #4 (not shown) abutting against the first edge #3 311-4. Alternatively, the first display 311 may include a central region (not shown) disposed between the first edge region #3 and the first edge region #4. At least one of the first edge region #3 and the first edge region #4 may include an inclined or curved side which is bent in a direction from the first side 341 to second side 342 of the first housing 310. Alternatively, the central region may include a substantially flat plane.

According to various embodiments, the second display 321 may include a substantially flat surface. Alternatively, at least part of the second display 321 may include an inclined or curved side.

According to an embodiment, the electronic device 300 may control a display module to selectively display at least part of information by using at least part of at least one of the first display 311 and the second display 321.

According to various embodiments, the connecting member 330 may connect the first housing 310 and the second housing 320. The second housing 320 may rotate about the first housing 310 by using the connecting member 330. Alternatively, the first housing 310 may rotate about the second housing 320 by using the connecting member 330. For example, the second housing 320 may rotate to cover the first side 341 of the first housing 310. Alternatively, the second housing 320 may rotate to cover the second side 342 of the first housing 310.

According to an embodiment, the connecting member 330 may establish a connection between the first lateral side #4 343-4 of the first housing 310 and the second lateral side #3 348-3 of the second housing 320. The connecting member 330 may be constructed in various shapes.

For example, the connecting member 330 may be constructed as a hinge unit. When it is constructed as the hinge unit, the connecting member 330 may include at least one hinge arm. A well-known hinge module (e.g., a hinge cam, a hinge shaft, a hinge spring, etc.) may be disposed in the hinge arm.

For another example, the connecting member 330 may be constructed as a polymer member. When it is constructed as the polymer member, the connecting member 330 may be constructed of leathers, artificial leathers, plastic materials, metallic materials, or fiber materials, or may be constructed of a plurality of polymer layers.

According to various embodiments, the connecting member 330 may include various shapes of flexible members.

According to various embodiments, the electronic device 300 may have at least three shapes as shown in FIG. 3A to FIG. 3C, depending on a rotation angle of the second housing 320.

FIG. 3A illustrates an unfolded state (or an open mode state) of the electronic device 300.

FIG. 3B illustrates a first folded state of the electronic device 300. For example, the first folded state may represent a state in which the second housing 320 rotates about an axis A1 as a rotation axis to cover the first side 341 of the first housing 310. In the first folded state, the first display 311 of the first housing 310 and the second display 321 of the second housing 320 may face each other, and may not be exposed.

FIG. 3C illustrates a second folded state of the electronic device 300. For example, the third folded state may represent a state in which the second housing 320 rotates about an axis A1 as a rotation axis to cover the third side 343 of the first housing 310. In the third folded state, the first display 311 of the first housing 310 and the second display 321 of the second housing 320 may be exposed in opposite directions.

According to various embodiments, as shown in FIG. 3B, when the electronic device 300 changes to the first folded state, the connecting member 330 may connect the first housing 310 and the second housing 320 such that the first side 341 of the first housing 310 and the third side 346 of the second housing 320 are folded towards each other (or to face each other).

According to various embodiments, as shown in FIG. 3C, when the electronic device 300 changes to the second folded state, the connecting member 330 may connect the first housing 310 and the second housing 320 such that the second side 342 of the first housing 310 and the fourth side 347 of the second housing 320 are folded towards each other (or to face each other).

According to various embodiments, when the electronic device 300 is in the first folded state or the second folded state, the first lateral side 343 of the first housing 310 and the second lateral side 348 of the second housing 320 may abut against each other. When it is said that the first lateral side 343 of the first housing 310 and the second lateral side 348 of the second housing 320 abut against each other, it may mean that the first lateral side 343 and the second lateral side 348 are in contact or are almost in contact with a slight gap (e.g., within 10 mm).

In FIG. 3A to FIG. 3C, a first conductive member 350 may be disposed to at least part of the first lateral side 343 of the first housing 310. For example, the first conductive member 350 may constitute at least part of at least one of the first lateral side #1 343-2, the first lateral side #2 343-1, the first lateral side #3 343-3, and the first lateral side #4 343-4.

According to various embodiments, the first conductive member 350 may include a first non-conductive slit 356 and second non-conductive slit 357 extended in a first direction z or second direction -z of the first housing 310 so as to be divided into a plurality of conductive segments 351, 352, and 353.

According to various embodiments, the non-conductive slits 356 and 357 may be extended from a non-conductive member (e.g., a bracket, etc.) disposed outside or inside the first housing 310.

According to an embodiment, a second conductive member 360 may be disposed to at least part of the second lateral side 348 of the second housing 320. The second conductive member 360 may be disposed to a lower or upper end of the second housing 320, and may include at least part of both sides of the second housing 320. The second conductive member 360 may include a third non-conductive slit 366 and fourth non-conductive slit 367 extended in a third direction z or fourth direction -z of the second housing 320 so as to be divided in the plurality of conductive segments 361, 362, and 363.

According to an embodiment, when the first housing 3210 and the second housing 320 are folded, the first slit 356 and the fourth slit 367 may abut against each other, and the second list 357 and the third slit 366 may abut against each other.

According to various embodiments, the non-conductive slits 356, 357, 366, and 367 may be referred to as a gap, and the non-conductive slits 356, 357, 366, and 367 may be filled with a non-conductive member (e.g., an insulator).

According to various embodiments, the plurality of conductive segments 351, 352, 353, 361, 362, and 363 may include a metallic material. The metallic material may include, for example, any one of aluminum, stainless, and an amorphous metal alloy. Unlike conventional alloys, the amorphous metal alloy may have a microstructure similar to a liquid state which does not have a crystal structure since atoms are irregularly arranged. The amorphous metal alloy may have uniform isotropic properties, may have excellent mechanical strength due to absence of crystallographic anisotropy, and may have excellent corrosion resistance due to uniform structure and composition.

Hereinafter, various electronic devices including an antenna using a conductive member (e.g., a metal frame) provided in the electronic device according to various embodiments of the present disclosure are described with reference to the accompanying drawings.

Hereinafter, for convenience of explanation, (1) an electronic device including an antenna having a plurality of feeding portions, (2) an electronic device including an antenna having a switching circuit, (3) an electronic device including an antenna having a stub pattern, and (4) various examples of an electronic device are described distinctively. However, without being limited to embodiments based on such a distinction, the respective embodiments can be applied in a combined or united manner.

In various embodiments, an upper portion ① or lower portion ② of the first housing 310 of the device 300 or an upper portion ③ or lower portion ④ of the second housing 320 may include at least part of at least one of electronic devices including antennas proposed in FIG. 4, FIG. 5, FIGS. 6A to 6C, FIGS. 7A to 7C, FIGS. 8A to 8C, FIGS. 9A to 9C, FIGS. 10A to 10C, FIGS. 11A to 11C, FIGS. 13A to 13D, FIGS. 14A to 14D, FIGS. 15A and 15B, FIGS. 16A to 16G, FIGS. 17A to 17G, FIGS. 18A and 18B, FIGS. 19A to 19G, FIGS. 20A to 20G, FIGS. 21A and 21B, FIGS. 23A to 23D, FIGS. 24A to 24D, FIGS. 25A to 25H, or FIGS. 26A to 26H to be described below.

Figure 4:
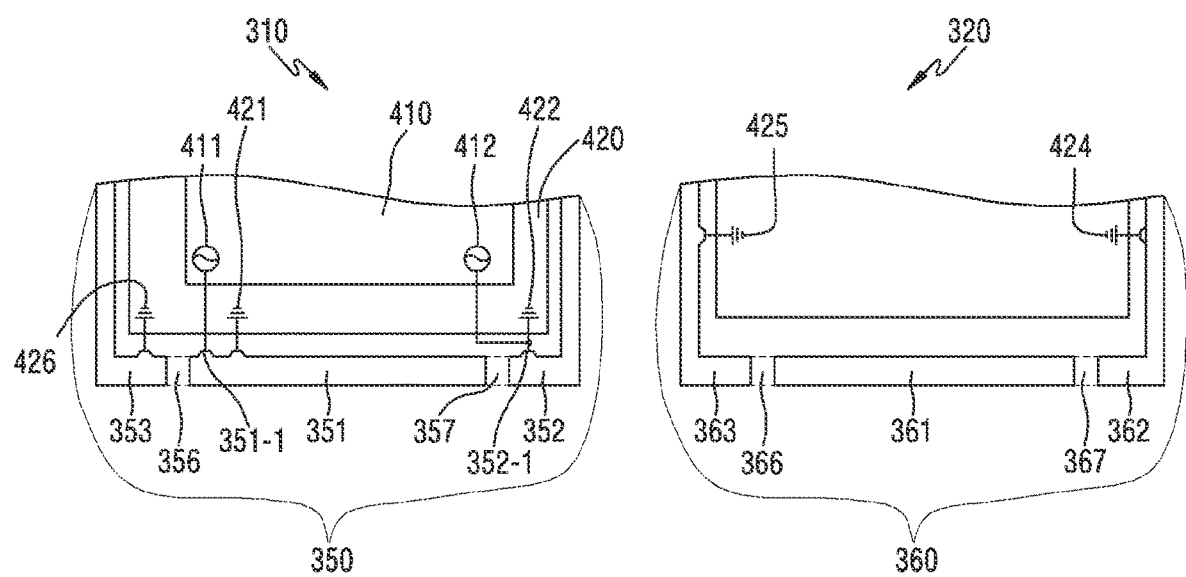
FIG. 4 and FIG. 5 illustrate an electronic device including an antenna having a plurality of feeding portions according to an embodiment of the present disclosure.
Figure 5:
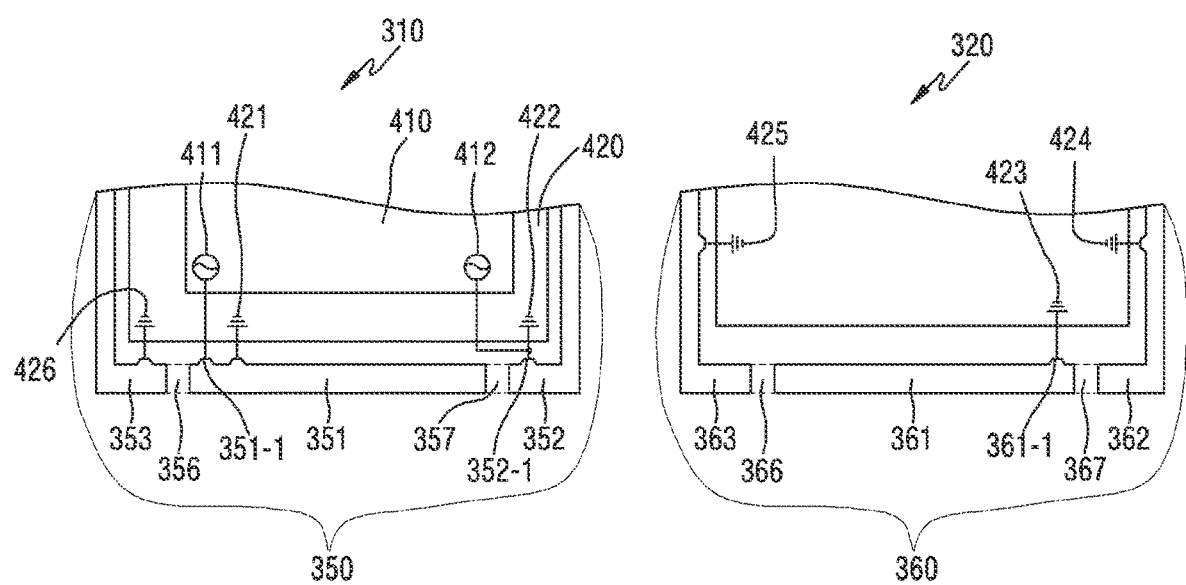

(1) electronic device including an antenna having a plurality of feeding portions FIG. 4 and FIG. 5 illustrate an electronic device including an antenna having a plurality of feeding portions according to an embodiment of the present disclosure, In FIG. 4 and FIG. 5, an electronic device including an antenna of the first housing 310 of the electronic device 300 is illustrated in the left side, and an electronic device including an antenna of the second housing 320 of the electronic device 300 is illustrated in the right side.

According to an embodiment, the first conductive member 350 disposed to a lower end of the first lateral side 343 of the first housing 310 may be divided into the plurality of conductive segments 351, 352, and 353 by the first non-conductive slit 356 and the second non-conductive slit 357. According to various embodiments, in a plan view, among the plurality of conductive segments 351, 352, and 353, the second conductive segment 352 and/or the third conductive segment 353 may include a substantially 'L' shape. Alternatively, among the plurality of conductive segments 351, 352, and 353, the first conductive segment 351 may have a substantially linear shape extended to the vicinity of one end portion of the third conductive segment 353 from the vicinity of one end portion of the second conductive segment 352. Alternatively, the second conductive segment 352 and the third conductive segment 353 may have a substantially symmetrical shape.

According to an embodiment, the second conductive member 360 disposed to a lower end of the second lateral side 348 of the second housing 320 may be divided into a plurality of conductive segments 361, 362, and 363 by the third non-conductive slit 366 and the fourth non-conductive slit 367. According to various embodiments, in a plan view, among the plurality of conductive segments 361, 362, and 363, the fifth conductive segment 362 and/or the sixth conductive segment 363 may include a substantially 'L' shape. Alternatively, among the plurality of conductive segments 361, 362, and 363, the fourth conductive segment 361 may have a substantially linear shape extended to the vicinity of one end portion of the sixth conductive segment 363 from the vicinity of one end portion of the fifth conductive segment 362. Alternatively, the fifth conductive segment 362 and the sixth conductive segment 363 may have a substantially symmetrical shape.

According to an embodiment, the second non-conductive slit 357 may be located to be closer to the connecting member 330 than the first non-conductive slit 356, and the third non-conductive slit 366 may be located to be closer to the connecting member 330 than the fourth non-conductive slit 367.

According to an embodiment, a wireless communication circuit 410 may be electrically connected to a first point 351-1 abutting against the first slit 356 included in the first conductive segment 351 of the first conductive member 350, and may be electrically connected to a second point 352-1 abutting against the second slit 357 included in the second conductive segment 352 of the first conductive member 350. Therefore, among the plurality of conductive segments 351, 352, and 353, the first conductive segment 351 may operate as a first main antenna radiator which is supplied with power by a first feeding portion 411 of the wireless communication circuit 410 to constitute a resonance, and the second conductive segment 352 may operate as a second main antenna radiator which is supplied with power by a second feeding portion 412 to constitute a resonance.

According to various embodiments, when the first conductive segment 351 operates as a main antenna radiator, the third conductive segment 353 may operate as a secondary antenna radiator. For example, the third conductive segment 353 may be electrically coupled to the first conductive segment 351 to operate as a coupling antenna or a coupling radiator.

According to various embodiments, the electronic device 300 may adjust an antenna length differently on the basis of a supported bandwidth. For example, an antenna bandwidth may be adjusted differently on the basis of a location of the first non-conductive slit 356 and a location of the second non-conductive slit 357.

According to various embodiments, an antenna may have a PIFA or monopole radiator as a default structure, and a volume and the number of antennas to be mounted may be determined on the basis of a service frequency, bandwidth, and type. Although there is a difference in frequency depending on regions around the world, a low band of 700 MHz to 900 MHz, a mid-band of 1700 MHz to 2100 MHz, and a high band of 2300 MHz to 2700 MHz are commonly used as a main communication band. In addition, various wireless communication services such as BT, GPS, and WIFI may be used. For another example, it is designed such that service bands having a similar frequency band are aggregated to be separated as several antennas.

For example, in case of a main antenna which is responsible for voice/data communication (GPRS, WCDMA, LTE, etc.), it is located at a lower end portion of an electronic device having few metallic components which impede antenna performance. From a perspective of a European standard, the following bands are to be implemented. 24 bands may be implemented in total such as 2G(GSM850, EGSM, DCS, PCS), WCDMA(B1, B2, B5, B8), LTE(B1, B2, B3, B4, B5, B7, B8, B12, B17, B18, B19, B20, B26, B38, B39, B40, B41) or the like.

The electronic device 300 according to various embodiments may implement an antenna by aggregating service bands having a similar frequency band across two regions. For example, the first conductive segment 351 may be designed to be an antenna for 2G(GSM850, EGSM, DCS, PCS), WCDMA(B1, B2, B5, B8), LTE(B1, B2, B3, B4, B5, B8, B12, B17, B18, B19, B20, B26, B39) as a first main antenna, and the second conductive segment 352 may be designed to be an antenna for LTE(B7, B38, B40, B41) as a second main antenna.

Returning to FIG. 4, at least one of the plurality of conductive segments 351, 352, and 353 of the first conductive member 350 may be electrically connected to a ground member of a circuit board 420. For example, the first conductive segment 351 may be electrically connected to a first ground member 421, and the second conductive segment 352 may be electrically connected to a second ground member 422. Alternatively, the third conductive segment 353 may be electrically connected to a ground member 426.

In various embodiments, as shown in FIG. 4, in a state where one of the plurality of conductive segments 351, 352, and 353 of the first conductive member 350 is electrically connected to the ground member, at least one of the plurality of conductive segments 361, 362, and 363 of the second conductive member 360 may be electrically connected to the ground member. For example, the fifth conductive segment 362 may be electrically connected to a ground member 424. Alternatively, the sixth conductive segment 363 may be electrically connected to a ground member 425.

For another example, at least one of the plurality of conductive segments 361, 362, and 363 may be electrically connected to the ground member at a point abutting against the third slit 366 or the fourth slit 367. For example, as shown in FIG. 5, among the plurality of conductive segments 361, 362, and 363, the fourth conductive segment 361 may be further electrically connected to a ground member 423 at a point 361-1 abutting against the fourth non-conductive slit 367.

The ground member according to various embodiments may be constructed as a ground plane in at least one region of the circuit board 420. The circuit board 420 may collectively imply all boards which can be mounted generally inside the electronic device 300 such as a Printed Circuit Board (PCB), a Flexible Printed Circuit Board (FPCB), a Printed Board Assembly (PBA), or the like. According to various embodiments, although not shown, at least one of regions corresponding to the non-conductive slits 356, 357, 366, and 367 of the first conductive member 350 or the second conductive member 360 at an outer circumference of the circuit board 420 may be recessed to improve radiation efficiency.

(2) An electronic device including an antenna having a switching circuit

Figure 6A:
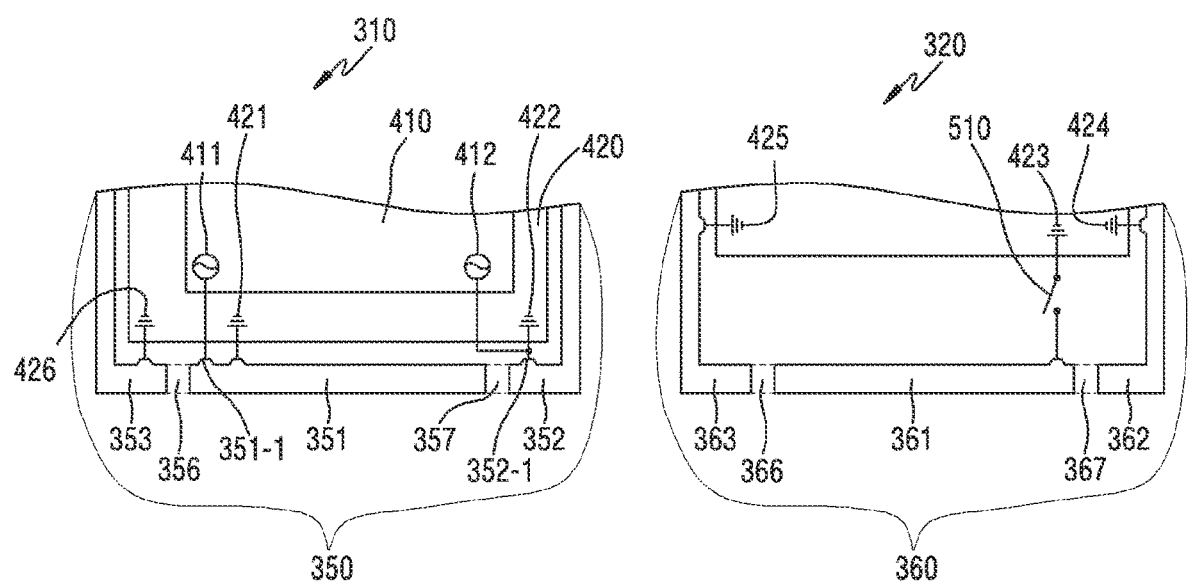
FIG. 6A to FIG. 6C illustrate an electronic device including an antenna having a plurality of feeding portions including a switching circuit according to an embodiment of the present disclosure.
Figure 6B:
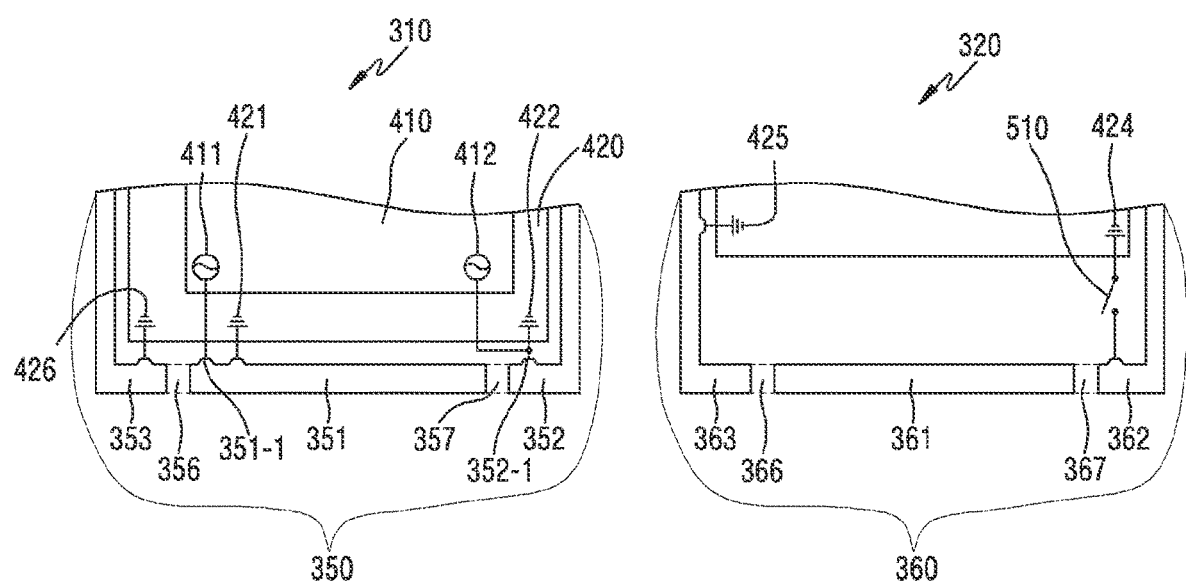
Figure 6C:
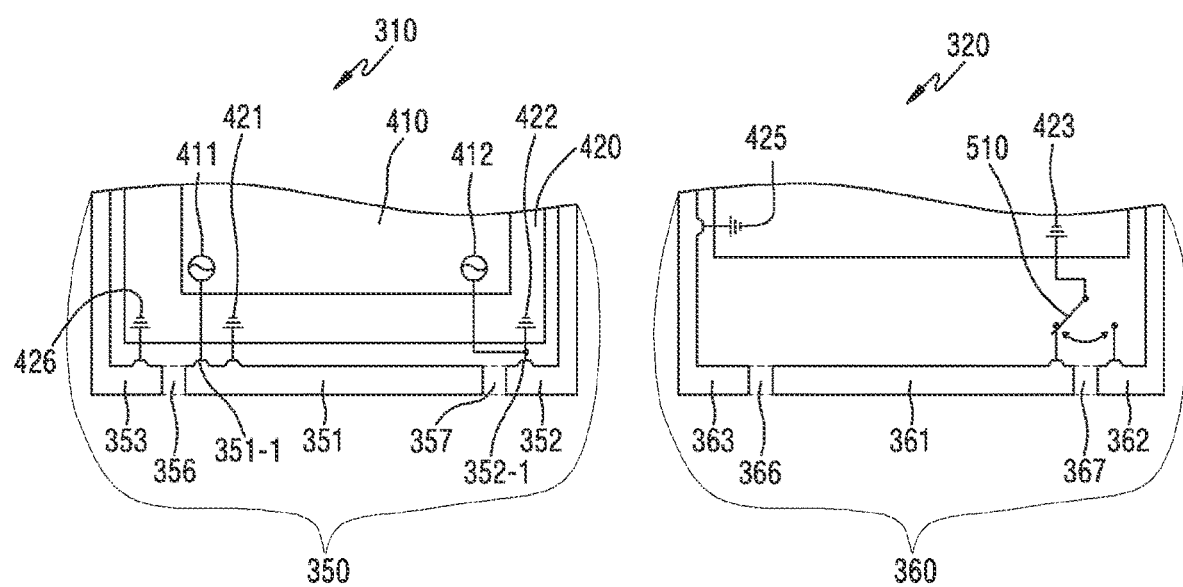

FIG. 6A to FIG. 6C illustrate an electronic device including an antenna having a plurality of feeding portions including a switching circuit according to an embodiment of the present disclosure.

A switching circuit 510 according to various embodiments may be configured such that at least one of the plurality of conductive segments 361, 362, and 363 of the second conductive member 360 is electrically connected to the ground member. For example, the switching circuit 510 may operate in an on-state when the first housing 310 and the second housing 320 are folded, and may operate in an off-state when the first housing 310 and the second housing 320 are unfolded. Accordingly, at least one of the plurality of conductive segments 361, 362, and 363 of the second conductive member 360 may be selectively connected to the ground member.

In FIG. 6A to FIG. 6C, at least one of the plurality of conductive segments 351, 352, and 353 of the first conductive member 350 of the first housing 310 may be supplied with power from each of the plurality of feeding portions.

For example, the first conductive segment 351 may be supplied with power from the first feeding portion 411 of the wireless communication circuit 410, and the second conductive segment 352 may be supplied with power from the second feeding portion 422 of the wireless communication circuit 410. In this case, the first feeding portion 411 may be electrically connected to the first point 351-1 of the first conductive segment 351 abutting against the first non-conductive slit 356, and the second feeding portion 412 may be electrically connected to the second point 352-1 of the second conductive segment 352 abutting against the second non-conductive slit 357. Accordingly, the first conductive segment 351 may operate as at least part of an antenna radiator which is supplied with power by the first feeding portion 411 to constitute a resonance, and the second conductive segment 352 may operate as at least part of an antenna radiator which is supplied with power by the second feeding portion 412 to constitute a resonance.

In FIG. 6A to FIG. 6C, at least one of the plurality of conductive segments 361, 362, and 363 of the second conductive member 360 of the second housing 320 may be connected to the switching circuit 510 to be electrically connected to the ground member. In this case, at least one of the plurality of conductive segments 361, 362, and 363 of the second conductive member 360 may be electrically connected to the ground member 423 at a point abutting against the third non-conductive slit 366 or fourth non-conductive slit 367 via the switching circuit 510.

In an embodiment, in FIG. 6A, the fourth conductive segment 361 of the second conductive member 360 may be selectively connected to the ground member 423 by the switching circuit. For example, when the switching circuit 510 operates in an on-state, the fourth conductive segment 361 located at a lower end of the second housing 320 may be electrically connected to the ground member 423. Alternatively, when the switching circuit 510 operates in an off-state, the electrical connection between the fourth conductive segment 361 and the ground member 423 may be cut off.

For another example, in FIG. 6B, the fifth conductive segment 362 of the second housing 320 may be selectively connected to the ground member 424 by the switching circuit 510.

For example, when the switching circuit 510 operates in the on-state, the fifth conductive segment 362 of the second housing 320 may be electrically connected to the ground member. For another example, when the switching circuit 510 operates in the off-state, the electrical connection between the fifth conductive segment 362 and the ground member 423 may be cut off.

According to various embodiments, in FIG. 6B, the fourth conductive segment 361 of the second housing 320 may not be electrically connected to the ground member. Alternatively, although not shown, the fourth conductive segment 361 of the second housing 320 may be electrically connected to the ground member (e.g., the ground member 423 of FIG. 6A).

For another example, in FIG. 6C, one of the fourth conductive segment 361 and fifth conductive segment 362 of the second housing 320 may be selectively connected to the ground member 423 by the switching circuit 510. For example, when the first housing 310 and the second housing 320 are folded, the switching circuit 510 may be shorted with one point of the fourth conductive segment 361, and thus the fourth conductive segment 361 may be electrically connected to the ground member 423. For example, when the first housing 310 and the second housing 320 are unfolded, the switching circuit 510 may be shorted with one point of the fifth conductive segment 362, and thus the fifth conductive segment 362 may be electrically connected to the ground member 423.

Figure 7A:
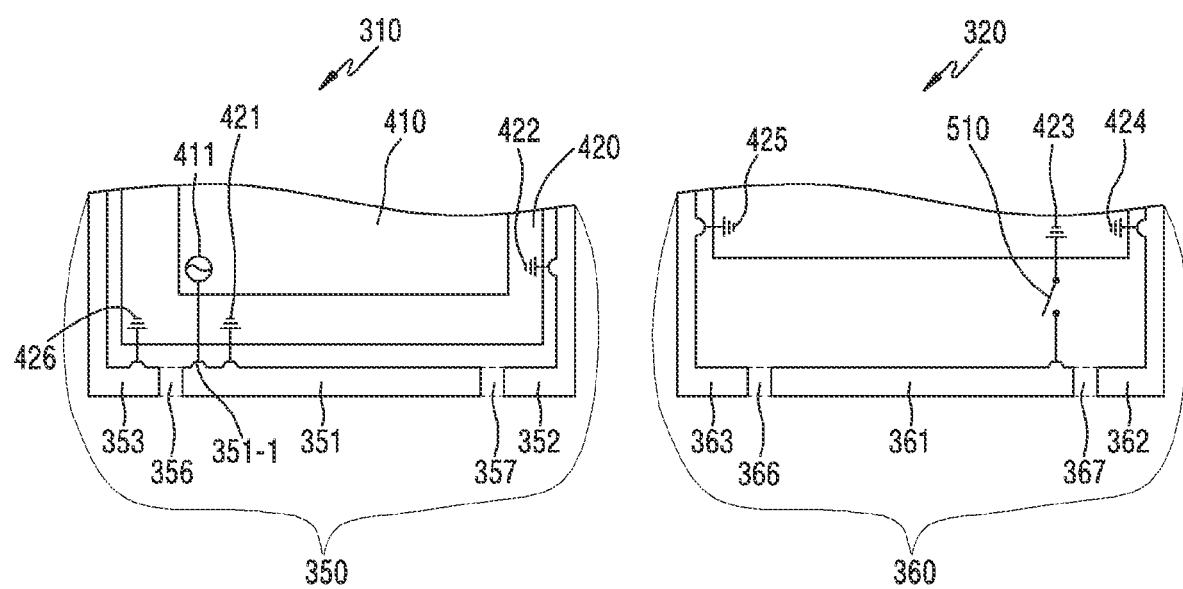
FIG. 7A to FIG. 7C illustrate an electronic device including an antenna having a single feeding portion including a switching circuit according to an embodiment of the present disclosure.
Figure 7B:
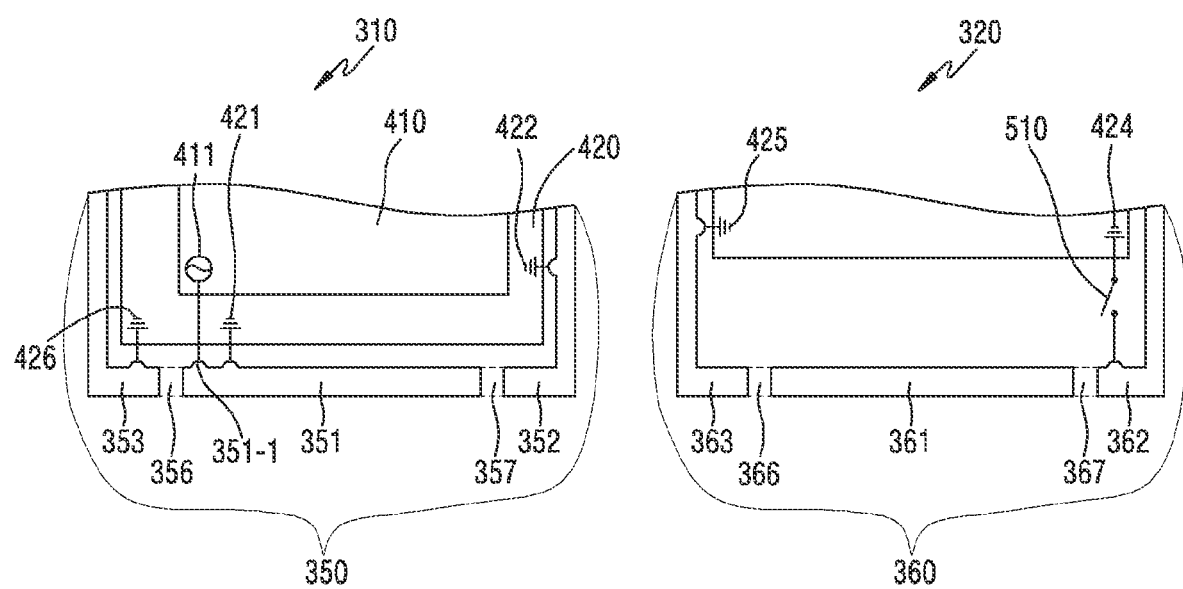
Figure 7C:
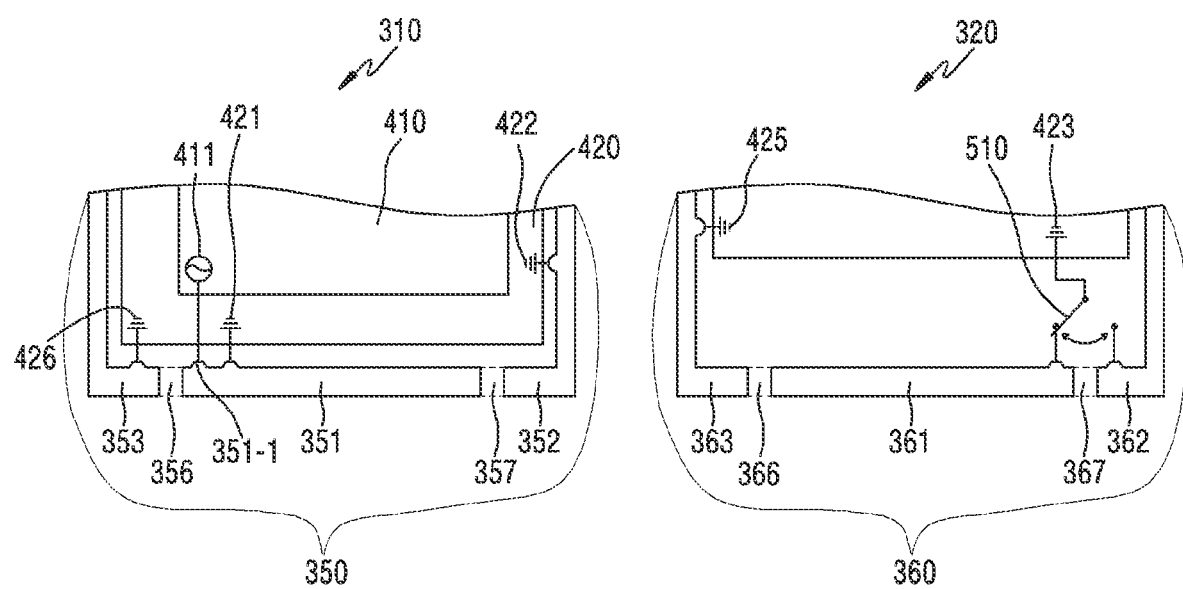

FIG. 7A to FIG. 7C illustrate an electronic device including an antenna having a single feeding portion including a switching circuit according to an embodiment of the present disclosure.

In FIG. 7A to FIG. 7C, the first feeding portion 411 may be supplied with power from at least one of the plurality of conductive segments 351, 352, and 353 of the first conductive member 350 of the first housing 310.

For example, among the plurality of conductive segments 351, 352, and 353, the first conductive segment 351 may be supplied with power from the first feeding portion 411. In this case, the first feeding portion 411 may be electrically connected to one point 351-1 of the first conductive segment 351 abutting against the first non-conductive slit 356.

According to an embodiment, in FIG. 7A to FIG. 7C, the second conductive segment 352 and/or third conductive segment 353 of the first conductive member 350 of the first housing 310 may not be electrically connected to the feeding portion.

In FIG. 7A to FIG. 7C, at least one of the plurality of conductive segments 351, 352, and 353 of the first conductive member 350 of the first housing 310 may be electrically connected to the ground member of the circuit board 420. For example, the first conductive segment 351 may be electrically connected to the ground member 421. Alternatively, the second conductive segment 352 may be electrically connected to the ground member 422. Alternatively, the third conductive segment 353 may be electrically connected to the ground member 426.

In FIG. 7A to FIG. 7C, at least one of the conductive segments 361, 362, and 363 of the second conductive member 360 of the second housing 320 may be connected to the switching circuit 510 so as to be electrically connected to the ground member 423.

In FIG. 7A to FIG. 7C, since an example of grounding the second conductive member 360 of the second housing 320 is at least similar or identical to an example of grounding the second conductive member 360 of the second housing 320 of FIG. 6A to FIG. 6C, redundant descriptions will be omitted.

Figure 8A:
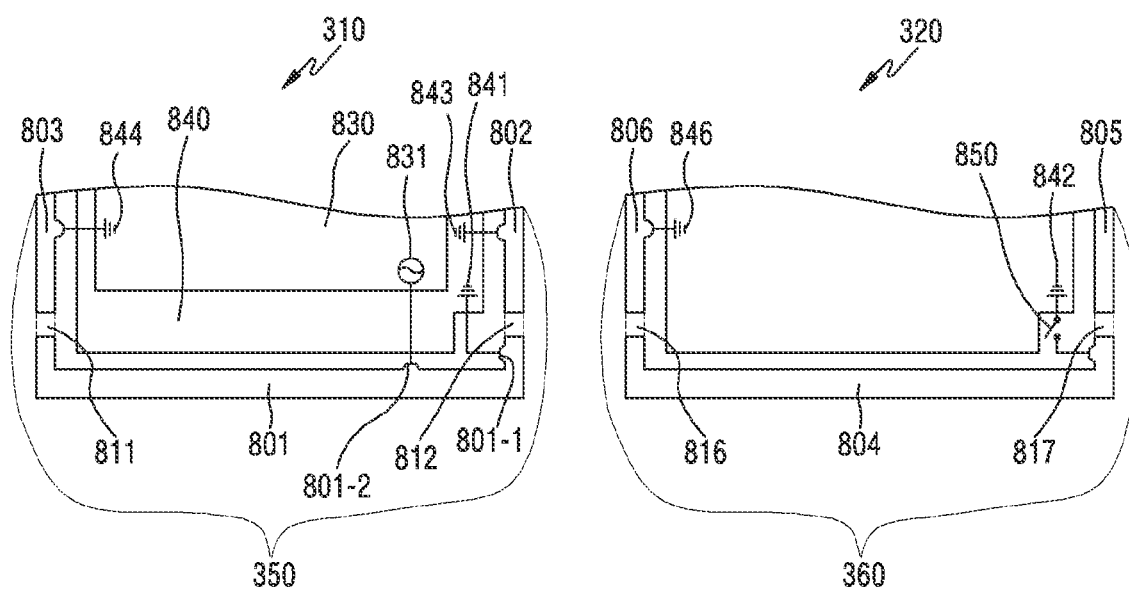
FIG. 8A to FIG. 8C illustrate an electronic device including an antenna having a single feeding portion including a switching circuit according to another embodiment of the present disclosure.
Figure 8B:
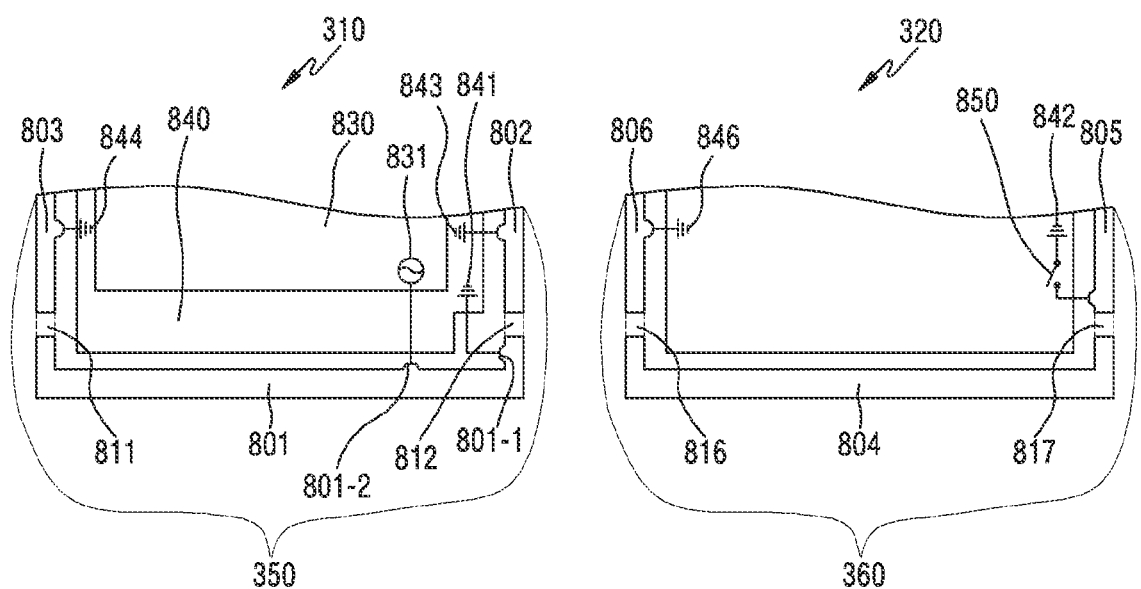
Figure 8C:
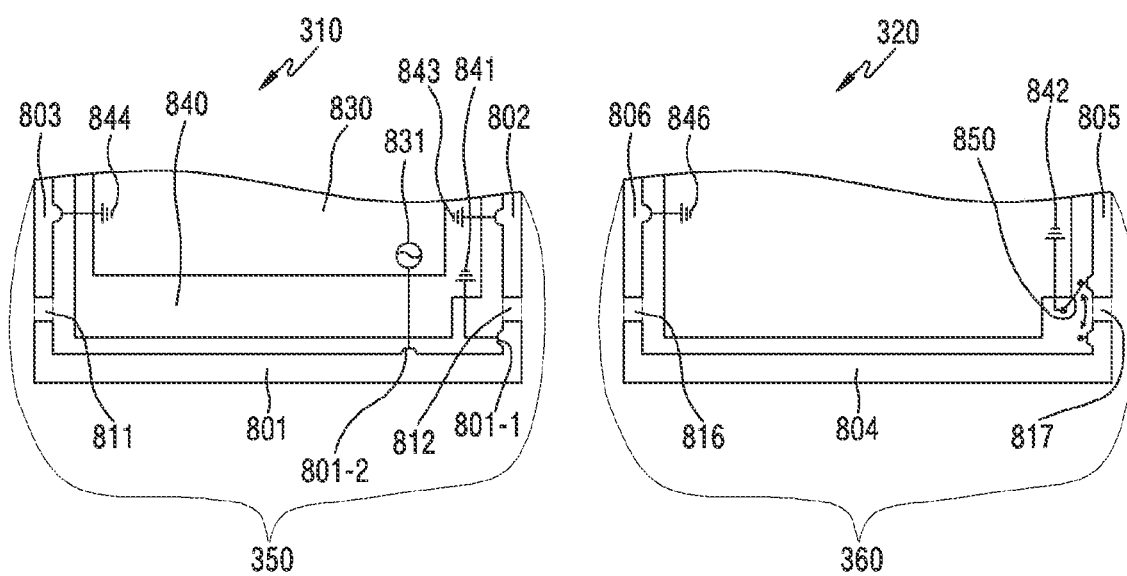

FIG. 8A to FIG. 8C illustrate an electronic device including an antenna having a single feeding portion including a switching circuit according to another embodiment of the present disclosure.

In FIG. 8A to FIG. 8C an example for the first conductive member 350 of the first housing 310 and/or the second conductive member 360 of the second housing 320 may be different from the aforementioned example of FIG. 4A to FIG. 7C.

According to an embodiment, in the first housing 310, a first non-conductive slit 811 may be located at one side of the first housing 310, and a second non-conductive slit 812 may be located at the other side of the first housing 310. For example, the first non-conductive slit 811 and the second non-conductive slit 812 may be disposed respectively at both long sides of the first housing 310. The first housing 310 may be divided into a plurality of conductive segments 801, 802, and 803 by the first non-conductive slit 811 and second non-conductive slit 812 located at the sides. According to various embodiments, in a plan view, among the plurality of conductive segments 801, 802, and 803, the first conductive segment 801 may include a substantially 'U' shape. According to various embodiments, although not shown, a region corresponding to the non-conductive slits 811 and 812 at an outer circumference of the circuit board 840 may be at least partially recessed to improve radiation efficiency.

In the example of FIG. 8A to FIG. 8C, the first conductive segment 801 of the first conductive member 350 may operate as at least part of a main antenna radiator, and the second conductive segment 802 and third conductive segment 803 prepared at both sides of the first housing 310 may operate as at least part of a secondary antenna radiator electrically coupled with the first conductive segment 801.

According to an embodiment, at least one of the conductive segments 801, 802, and 803 of the first conductive member 350 may be electrically connected to the ground member of the circuit board 840. For example, the first conductive segment 801 may be electrically connected with the first ground member 841 at one point 801-1 abutting against a second slit 8012. Alternatively, the second conductive segment 802 may be electrically connected to a ground member 843. Alternatively, the third conductive segment 803 may be electrically connected to a ground member 844.

In FIG. 8A to FIG. 8C, at least one of the conductive segments 801, 802, and 803 of the first conductive member 350 may be supplied with power from a feeding portion 831. For example, the first conductive segment 801 of the first conductive member 350 may be supplied with power from the first feeding portion 831 at one point 801-2.

According to an embodiment, in a state where at least one of the plurality of conductive segments 351, 352, and 353 of the first conductive member 350 is electrically connected to the ground member and/or is electrically connected to the feeding portion, at least one of a plurality of conductive segments 804, 805, and 806 of the second conductive member 360 of the second housing 320 may be connected to a switching circuit 850 so as to be electrically connected to a ground member 842. For example, the switching circuit 850 may be located to abut against a non-conductive slit 817 located at one side of the second housing 320.

In an embodiment, in FIG. 8A, the fourth conductive segment 804 of the second housing 320 may be selectively connected to the ground member 842 by the switching circuit 850. For example, when the switching circuit 810 operates in an on-state, the fourth conductive segment 804 may be electrically connected to the ground member 842. For another example, when the switching circuit 850 operates in an off-state, the electrical connection between the fourth conductive segment 804 and the ground member 842 may be cut off.

In various embodiments, in FIG. 8A, the fifth conductive segment 805 of the second housing 320 may not be electrically connected to the ground member. Alternatively, although not shown, the fifth conductive segment 805 of the second housing 320 may be electrically connected to the ground member.

For another example, in FIG. 8B, the fifth conductive segment 805 of the second housing 320 may be selectively connected to the ground member 842 by the switching circuit 850. For example, when the switching circuit 810 operates in an on-state, the fifth conductive segment 805 may be electrically connected to the ground member 842. For another example, when the switching circuit 850 operates in an off-state, the electrical connection between the fifth conductive segment 805 and the ground member 842 may be cut off.

For another example, in FIG. 8C, one of the fourth conductive segment 804 and fifth conductive segment 805 of the second housing 320 may be selectively connected to the ground member 842 by the switching circuit 850. For example, when the first housing 310 and the second housing 320 are folded, the switching circuit 850 may be shorted with one point of the fourth conductive segment 804, and thus the fourth conductive segment 804 may be electrically connected to the ground member 842. In addition, when the first housing 310 and the second housing 320 are unfolded, the switching circuit 850 may be shorted with one point of the fifth conductive segment 805, and thus the fifth conductive segment 805 may be electrically connected to the ground member 842.

In various embodiments, in FIG. 8A to FIG. 8C, the sixth conductive segment 806 of the second conductive member 360 of the second housing 320 may be electrically connected to a ground member 846.

Figure 9A:
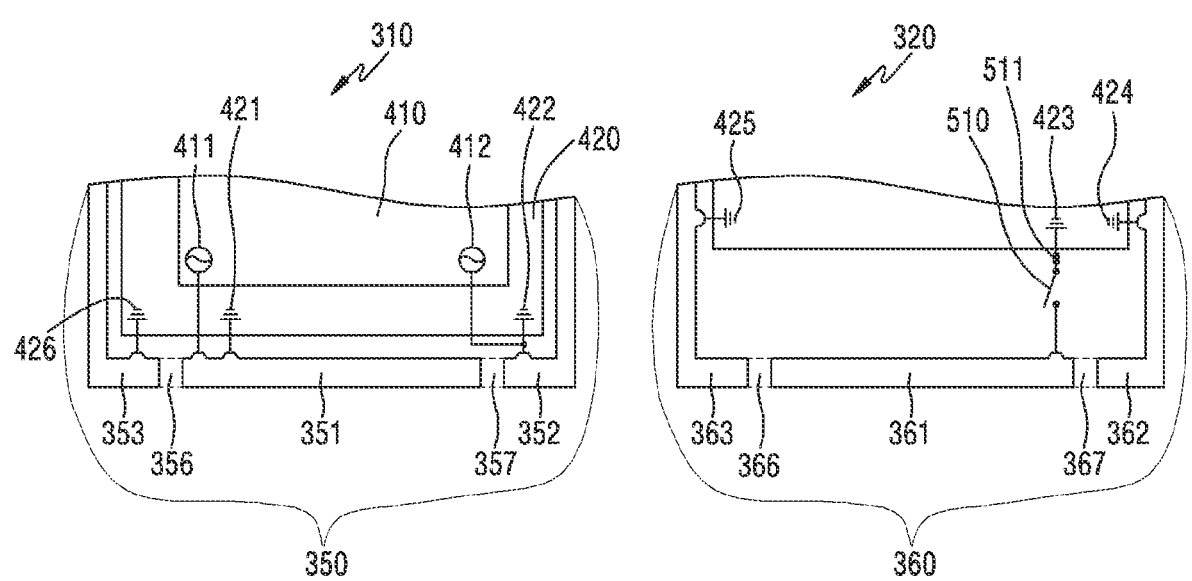
FIG. 9A to FIG. 9C illustrate an electronic device including an antenna having a plurality of feeding portions including a switching circuit connected to a lumped element according to an embodiment of the present disclosure.
Figure 9B:
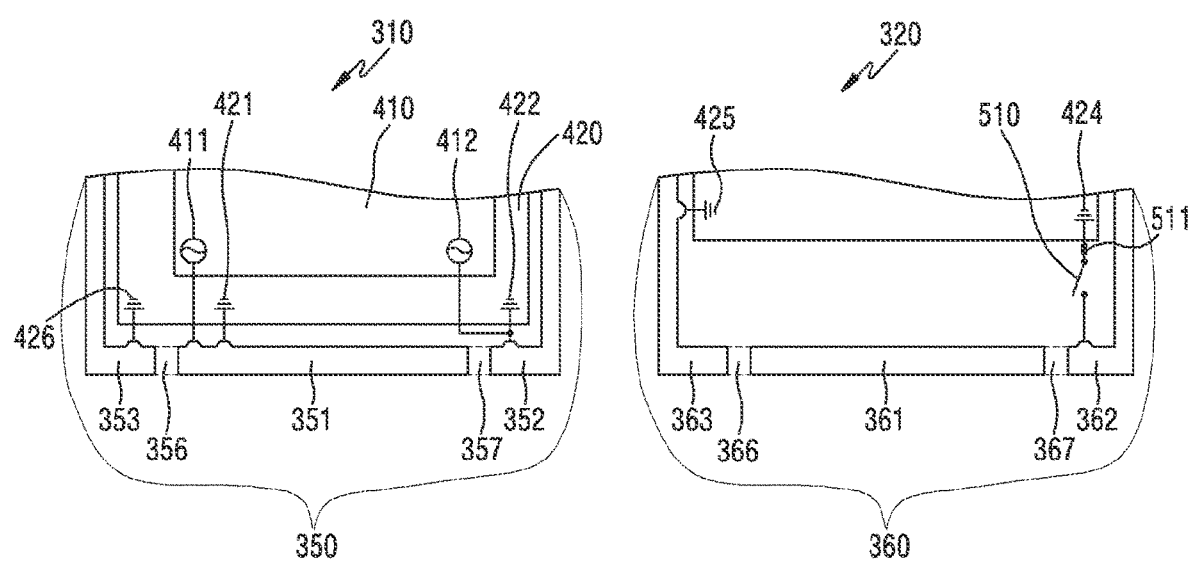
Figure 9C:
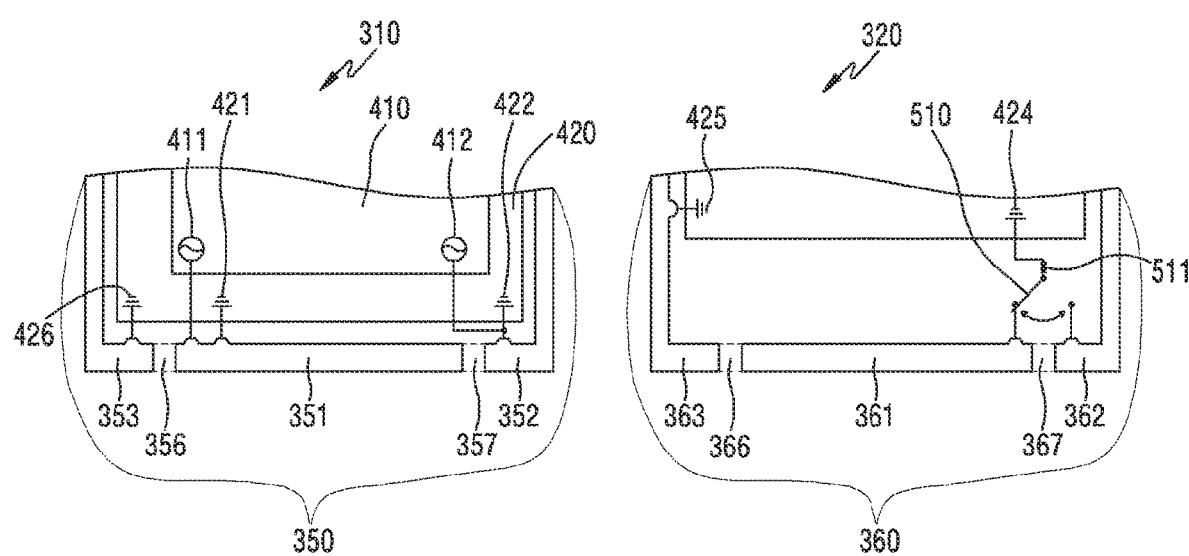

FIG. 9A to FIG. 9C illustrate an electronic device including an antenna having a plurality of feeding portions including a switching circuit connected to a lumped element according to an embodiment of the present disclosure.

In FIG. 9A to FIG. 9C, the switching circuit 510 may be configured such that at least part of the plurality of conductive segments 361, 362, and 363 of the second conductive member 360 is electrically connected to a ground member via a lumped element 511.

The switching circuit 510 according to an embodiment may operate in an on-state when the first housing 310 and the second housing 320 are folded, and may operate in an off-state when the first housing 310 and the second housing 320 are unfolded. For example, according to an operation of the switching circuit 510 in the on-state or off-state, at least part of the plurality of conductive segments 361, 362, and 363 of the second conductive member 360 of the second housing 320 may be selectively connected to the ground member via a lumped element. The lumped element may be an element including, for example, at least one of a resistor, a capacitor, and an inductor. For example, the lumped element may include the inductor or the like.

In FIG. 9A to FIG. 9C, at least one of the plurality of conductive segments 351, 352, and 353 of the first conductive member 350 of the first housing 310 may be supplied with power from at least one feeding portion. Alternatively, in FIG. 9A to FIG. 9C, at least one of the plurality of conductive segments 351, 352, and 353 of the first conductive member 350 of the first housing 310 may be electrically connected with at least one ground member. According to various embodiments, since an electronic device including an antenna using the first conductive member 350 of FIG. 9A to FIG. 9C is at least similar or identical to an electronic device including an antenna using the first conductive member 350 of the first housing 310 of FIG. 6A to FIG. 6C, detailed descriptions thereof will be omitted.

In a situation where the electronic device including the antenna using the first conductive member 350 is constructed according to an embodiment, at least one of the plurality of conductive segments 361, 362, and 363 of the second conductive member 360 of the second housing 320 may be electrically connected to the ground member via the switching circuit 510 connected to the lumped element 511.

For example, in FIG. 9A, the fourth conductive segment 361 of the second housing 320 may be selectively connected to the ground member 423 by the switching circuit 510. For example, when the switching circuit 510 operates in an on-state, the fourth conductive segment 361 located at a lower end of the second housing 320 may be electrically connected to the ground member 423 via the lumped element 511. Alternatively, when the switching circuit 510 operates in an off-state, the electrical connection between the fourth conductive segment 361 and the ground member 423 may be cut off.

For another example, in FIG. 9B, the fifth conductive segment 362 of the second housing 320 may be selectively connected to the ground member 424 by the switching circuit 510 connected to the lumped element 511.

For example, when the switching circuit 510 operates in the on-state, the fifth conductive segment 362 of the second housing 320 may be electrically connected to the ground member 424 via the lumped element 511. For another example, when the switching circuit 510 operates in the off-state, the electrical connection between the fifth conductive segment 362 and the ground member 424 may be cut off.

For another example, in FIG. 9C, one of the fourth conductive segment 361 and fifth conductive segment 362 of the second housing 320 may be selectively connected to the ground member 424 by the switching circuit 510 connected to the lumped element 511. For example, when the first housing 310 and the second housing 320 are folded, the switching circuit 510 may be shorted with one point of the fourth conductive segment 361, and thus the fourth conductive segment 361 may be electrically connected to the ground member 423 via the lumped element 511. In addition, when the first housing 310 and the second housing 320 are unfolded, the switching circuit 510 may be shorted with one point of the fifth conductive segment 362, and thus the fifth conductive segment 362 may be electrically connected to the ground member 423 via the lumped element 511.

In various embodiments, in FIGS. 9A to 9C, the sixth conductive segment 363 of the second conductive member 360 of the second housing 320 may be electrically connected to the ground member 425.

Figure 10A:
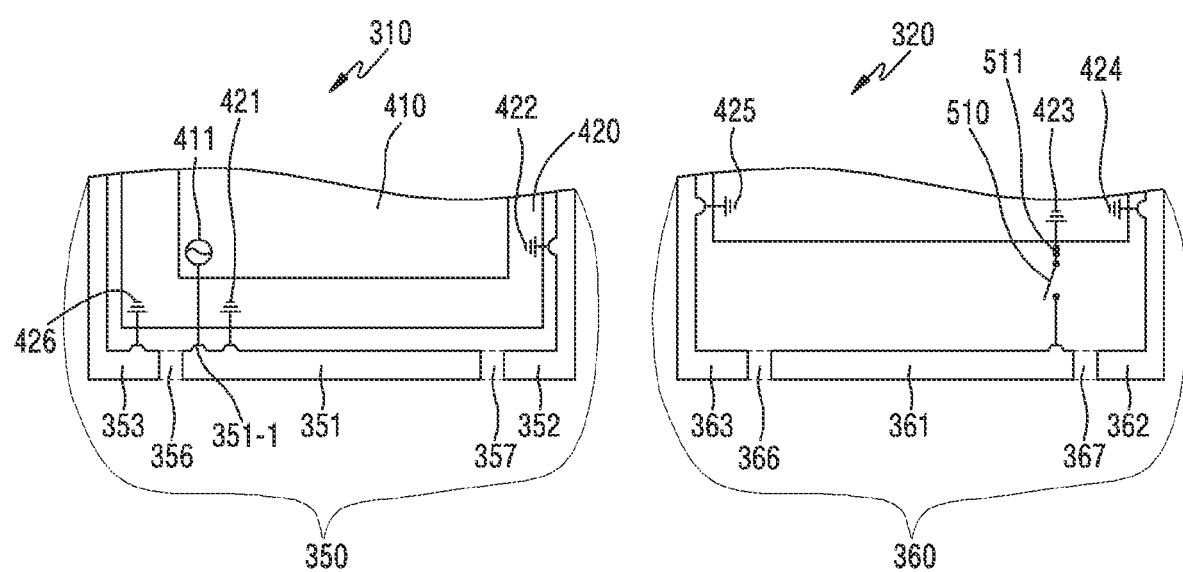
FIG. 10A to FIG. 10C illustrate an electronic device including an antenna having a single feeding portion including a switching circuit connected to a lumped element according to an embodiment of the present disclosure.
Figure 10B:
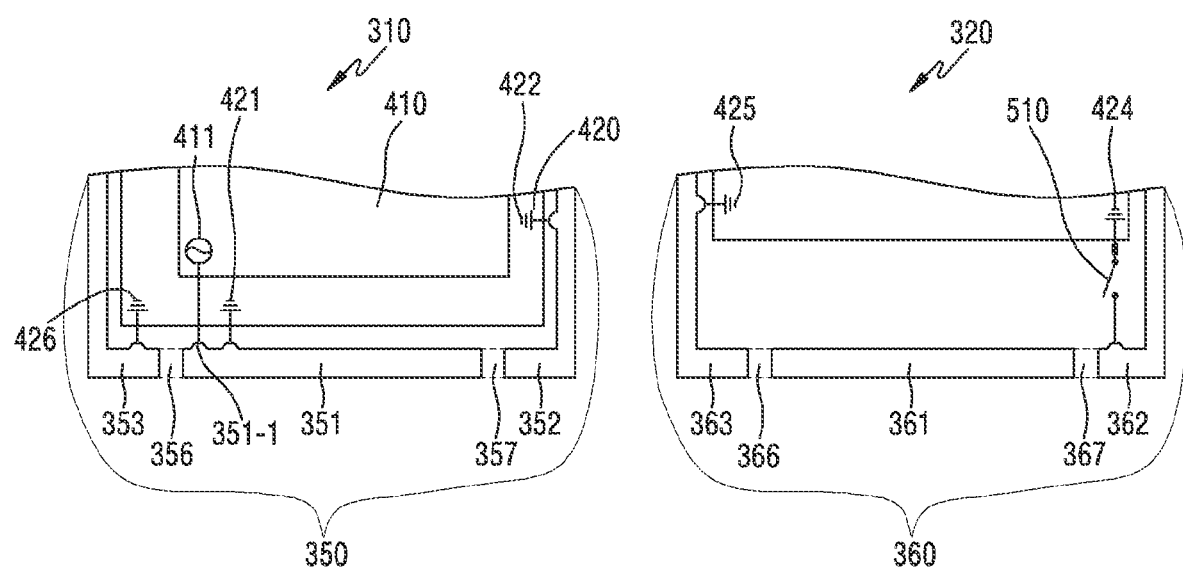
Figure 10C:
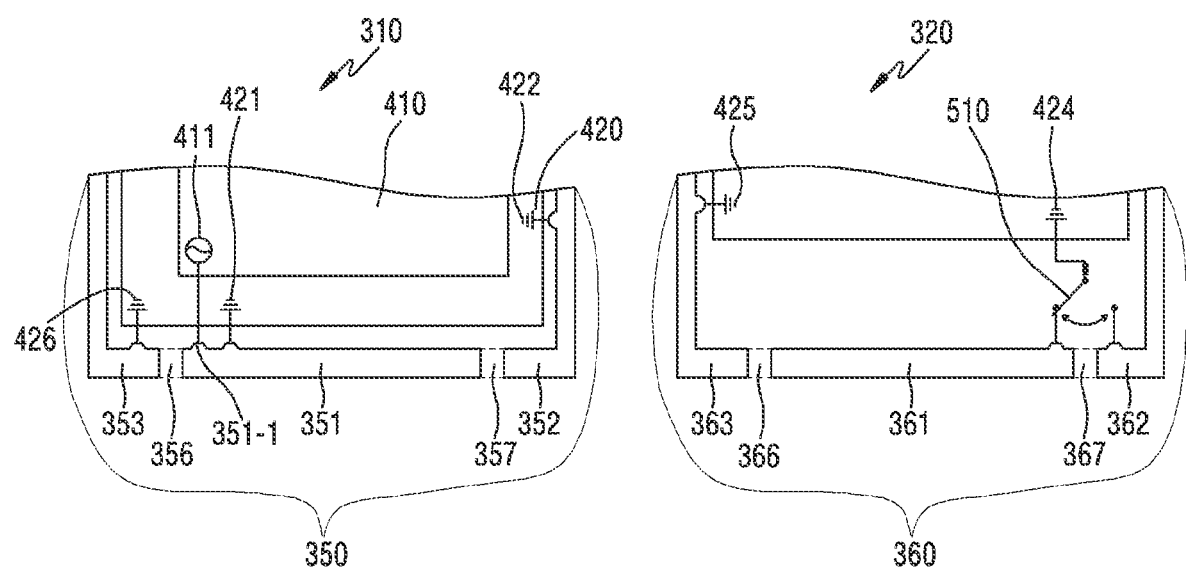

FIG. 10A to FIG. 10C illustrate an electronic device including an antenna having a single feeding portion including a switching circuit connected to a lumped element according to an embodiment of the present disclosure.

In FIG. 10A to FIG. 10C, at least one of the plurality of conductive segments 351, 352, and 353 of the first conductive member 350 of the first housing 310 may be supplied with power from at least one feeding portion. Alternatively, in FIG. 10A to FIG. 10C, at least one of the plurality of conductive segments 351, 352, and 353 of the first conductive member 350 of the first housing 310 may be electrically connected with at least one ground member. According to various embodiments, since an electronic device including an antenna using the first conductive member 350 of FIG. 10A to FIG. 10C is at least similar or identical to an electronic device including an antenna using the first conductive member 350 of the first housing 310 of FIG. 7A to FIG. 7C, detailed descriptions thereof will be omitted.

For example, among the plurality of conductive segments 351, 352, and 353, the first conductive segment 351 may be supplied with power from the first feeding portion 411. According to an embodiment, the first feeding portion 411 may be electrically connected to one point 351-1 of the first conductive segment 351 abutting against the first non-conductive slit 356.

In FIG. 10A to FIG. 10C, at least one of the plurality of conductive segments 361, 362, and 363 of the second conductive member 360 of the second housing 320 may be electrically connected to the ground member via the switching circuit 510 connected to the lumped element 511.

According to an embodiment, since the electronic device including the antenna using the second conductive member 360 of the second housing 320 of FIG. 10A to FIG. 10C is at least similar or identical to the electronic device including the antenna using the second conductive member 360 of the second housing 320 of FIG. 9A to FIG. 9C, redundant descriptions will be omitted.

Figure 11A:
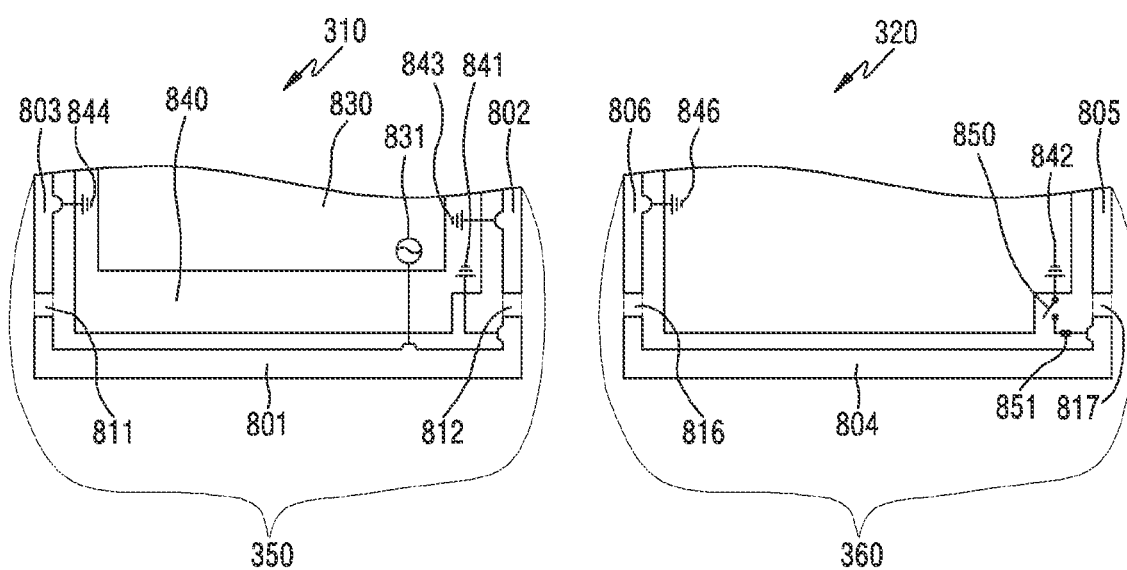
FIG. 11A to FIG. 11C illustrate an electronic device including an antenna having a single feeding portion including a switching circuit connected to a lumped element according to another embodiment of the present disclosure.
Figure 11B:
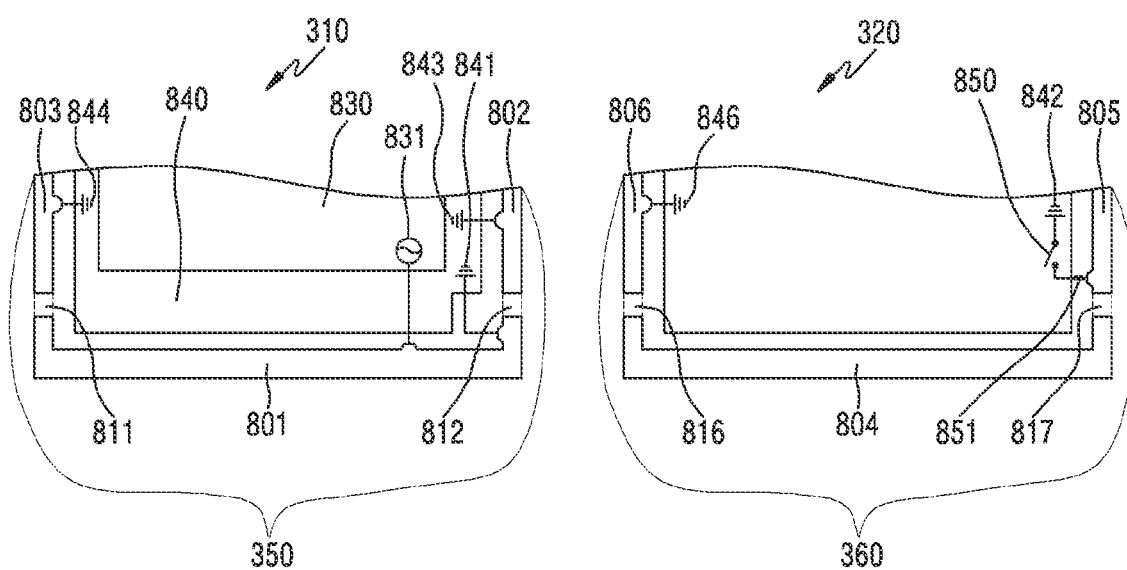
Figure 11C:
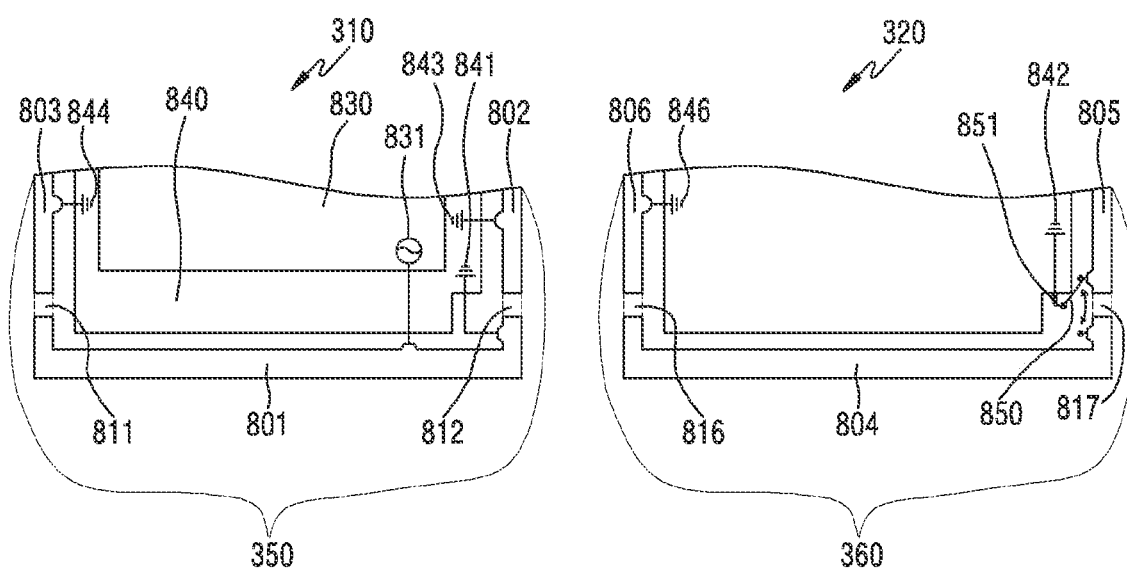

FIG. 11A to FIG. 11C illustrate an electronic device including an antenna having a single feeding portion including a switching circuit connected to a lumped element according to another embodiment of the present disclosure.

Since the electronic device including the antenna of the first housing 310 of FIG. 11A to FIG. 11C is at least similar or identical to the aforementioned electronic device including the antenna of FIG. 8A to FIG. 8C, redundant descriptions will be omitted.

In FIG. 11A to FIG. 11C, the switching circuit 850 may be configured such that at least part of the plurality of conductive segments 804, 805, and 806 of the second conductive member 360 is electrically connected to the ground member 842 via a lumped element 851.

The switching circuit 850 according to an embodiment may operate in an on-state when the first housing 310 and the second housing 320 are folded, and may operate in an off-state when the first housing 310 and the second housing 320 are unfolded. For example, according to an operation of the switching circuit 850 in the on-state or off-state, at least part of the plurality of conductive segments 804, 805, and 806 of the second conductive member 360 of the second housing 320 may be selectively connected to the ground member via a lumped element.

For example, in FIG. 11A, the fourth conductive segment 804 of the second housing 320 may be selectively connected to the ground member 842 by the switching circuit 850 connected to the lumped element 851. For example, when the switching circuit 850 operates in an on-state, the fourth conductive segment 804 may be electrically connected to the ground member 842 via the lumped element 851. Alternatively, when the switching circuit 850 operates in an off-state, the electrical connection between the fourth conductive segment 804 and the ground member 842 may be cut off.

In various embodiments, in FIG. 11A, the fifth conductive segment 805 of the second housing 320 may not be electrically connected to the ground member. Alternatively, although not shown, the fifth conductive segment 805 of the second housing 320 may be electrically connected to the ground member.

For another example, in FIG. 11B, the fifth conductive segment 805 located at one side of the second housing 320 may be selectively connected to the ground member 842 by the switching circuit 850 connected to the lumped element 851.

For example, when the switching circuit 850 operates in the on-state, the fifth conductive segment 805 of the second housing 320 may be electrically connected to the ground member 842 via the lumped element 851. For another example, when the switching circuit 850 operates in an off-state, the electrical connection between the fifth conductive segment 805 and the ground member 842 may be cut off.

In various embodiments, in FIG. 11B, the fourth conductive segment 804 of the second housing 320 may not be electrically connected to the ground member.

For another example, in FIG. 11C, one of the fourth conductive segment 804 and fifth conductive segment 805 of the second housing 320 may be selectively connected to the ground member 842 by the switching circuit 850 connected to the lumped element 851. For example, when the first housing 310 and the second housing 320 are folded, the switching circuit 850 may be shorted with one point of the fourth conductive segment 804, and thus the fourth conductive segment 804 may be electrically connected to the ground member 842 via the lumped element 851. For another example, when the first housing 310 and the second housing 320 are unfolded, the switching circuit 850 may be shorted with one point of the fifth conductive segment 805, and thus the fifth conductive segment 805 may be electrically connected to the ground member 842 via the lumped element 851.

In various embodiments, in FIG. 11A to FIG. 11C, the sixth conductive segment 806 of the second conductive member 360 of the second housing 320 may be electrically connected to the ground member 846.

Figure 12A:
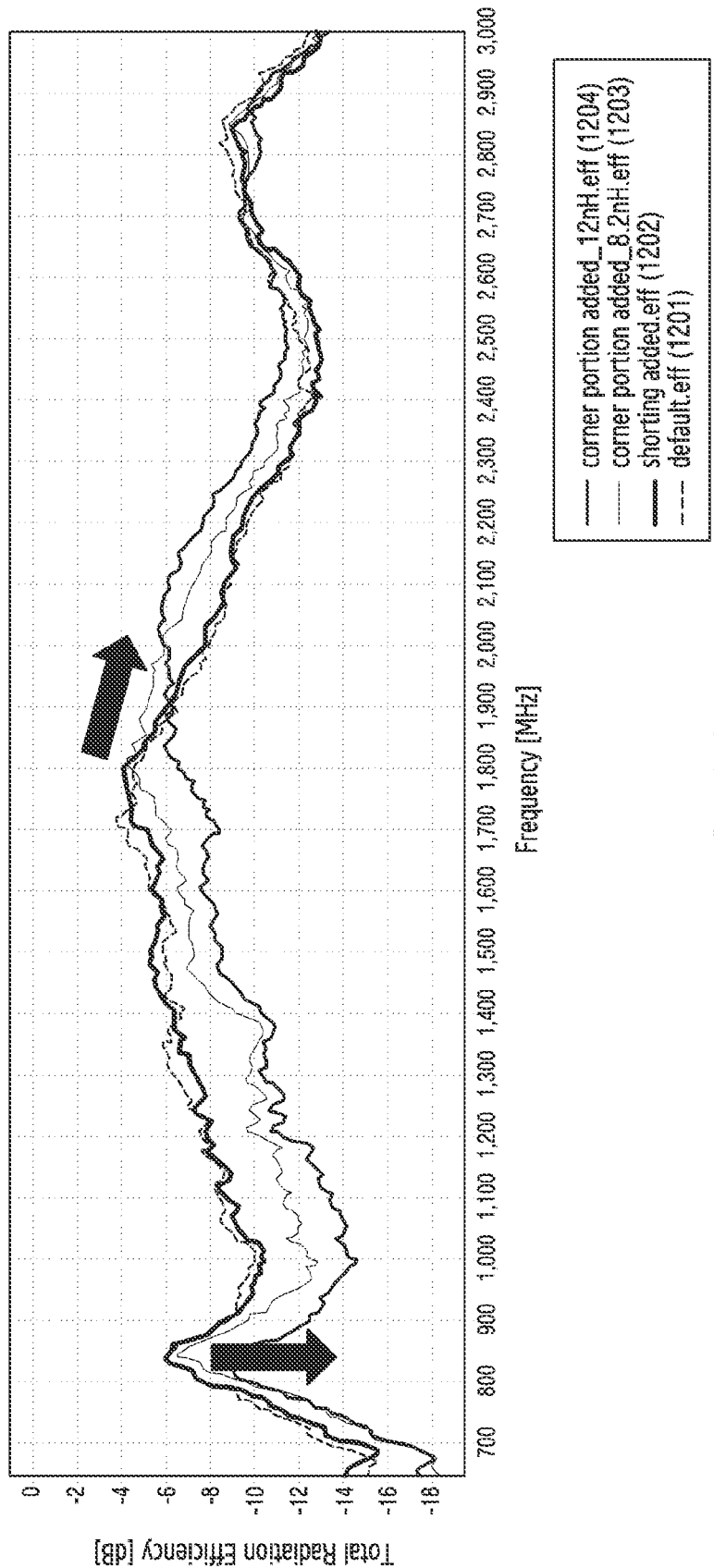
FIG. 12A and FIG. 12B are graphs illustrating a reflection coefficient and radiation efficiency of an electronic device including an antenna according to the aforementioned FIG. 4 to FIG. 11C.
Figure 12B:
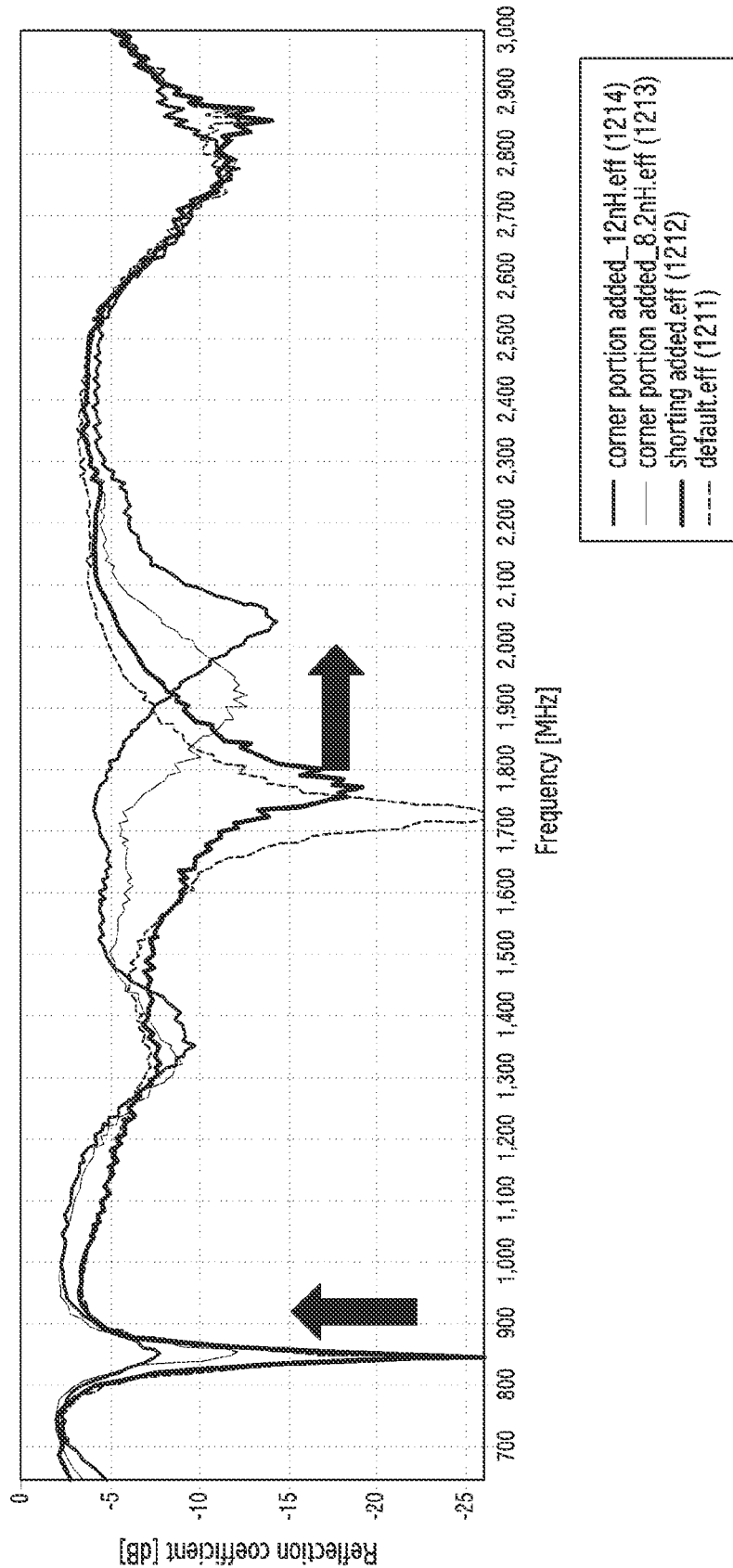

FIG. 12A and FIG. 12B are graphs illustrating a reflection coefficient and radiation efficiency of an electronic device including an antenna according to the aforementioned FIG. 4 to FIG. 11C.

The graphs of FIG. 12A and FIG. 12B respectively illustrate a total radiation efficiency per frequency band and a reflection coefficient per frequency when the first housing 310 and the second housing 320 are folded.

In FIG. 12A and FIG. 12B, an x-axis may represent a frequency band. A low band may be approximately in the range of 800 MHz to 1000 MHz. A middle band may be approximately in the range of 1700 MHz to 2200 MHz. A high band may be approximately in the range of 2300 MHz and 2700 MHz.

A graph 1201 of FIG. 12A and a graph 1211 of FIG. 12B respectively represent a radiation efficiency and a reflection coefficient which are measured in the first conductive segment 351 included in the first conductive member 350 operating as a radiator of a main antenna as shown in the embodiment of FIG. 4.

According to an embodiment, a graph 1202 of FIG. 12A and a graph 1212 of FIG. 12B respectively illustrate a radiation efficiency and a reflection coefficient which are measured in the first conductive segment 351 of the first conductive member 350 when at least one of the conductive segments 361, 362, and 363 of the second conductive member 360 is electrically connected to the ground member due to shorting of the switching circuit 510 as shown in the embodiment of FIGS. 6A and 6B.

According to an embodiment, graphs 1203 and 1204 of FIG. 12A and graphs 1213 and 1214 of FIG. 12B respectively represent a radiation efficiency and a reflection coefficient which are measured in the first conductive segment 351 included in the first conductive member 350 when at least one of the conductive segment 361, 362, and 363 of the second conductive member 360 is electrically connected to the ground member via an inductor having a value of 8.2 nH or 12 nH as the lumped element 511 due to shorting of the switching circuit 510 as shown in the embodiment of FIG. 9A to FIG. 9C.

Referring to FIG. 12A and FIG. 12B, when at least one of the conductive segment 361, 362, and 363 of the second conductive member 360 is connected to the ground member via the inductor or connected directly to the ground member, it can be seen that a resonance of a low band (about 800 MHz~900 MHz) is decreased, and a resonance of a middle band (about 1600 MHz~1800 MHz) is shifted to a high band. That is, it can be seen that the smaller the inductance value of the inductor connected between at least one of the conductive segments 361, 362, and 363 of the second conductive member 360 and the ground member, the smaller the parasitic resonance, thereby further improving the radiation efficiency of the electronic device including the antenna.

For example, when the first housing (e.g., the first housing 310 of FIG. 3A to FIG. 3C) and the second housing (e.g., the second housing 320 of FIG. 3A to FIG. 3C) are folded, the conductive segments 361, 362, and 363 of the second conductive member 360 may be shorted with the ground member. In this case, there is a leakage in current excited under the influence of coupling between at least one of the conductive segments 351, 352, and 353 of the first conductive member 350 of the first housing 310 and at least one of the conductive segments 361, 362, and 363 of the second conductive member 360 of the second housing. As a result, a magnitude of the parasitic resonance is decreased, thereby improving the radiation efficiency of the antenna of the electronic device.

According to an embodiment, when the first housing 310 and the second housing 320 are folded, at least one of the conductive segments 361, 362, and 363 of the second conductive member 360 may be shorted with the ground member via the inductor. In this case, there may be a decrease is a capacitance loading value increased depending on the abutting of at least one slit of the first conductive member 350 of the first housing 310 and at least one slit of the second conductive member 360 of the second housing 320. In addition, accordingly, the parasitic resonance which is excited under the influence of the coupling between at least one of the conductive segments 351, 352, and 353 of the first conductive member 350 and at least one of the conductive segments 361, 362, and 363 of the second conductive member 360 is shifted to a high band, thereby improving the radiation efficiency of the electronic device including the antenna.

(3) An electronic device including an antenna having a stub pattern

FIG. 13A to FIG. 13D illustrate an electronic device including an antenna having a plurality of feeding portions including a stub pattern according to an embodiment of the present disclosure.

In FIG. 13A to FIG. 13D, at least one of the plurality of conductive segments 351, 352, and 353 of the first conductive member 350 of the first housing 310 may be supplied with power from at least one feeding portion. Alternatively, at least one of the plurality of conductive segments 351, 352, and 353 of the first conductive member 350 of the first housing 310 may be electrically connected with at least one ground member.

According to various embodiments, since an electronic device including an antenna using the first conductive member 350 of FIG. 13A to FIG. 13D is at least similar or identical to an electronic device including an antenna using the first conductive member 350 of the first housing 310 of FIG. 6A to FIG. 6C, detailed descriptions thereof will be omitted.

In FIG. 13A to FIG. 13D, at least one of the plurality of conductive segments 361, 362, and 363 of the second conductive member 360 may be electrically connected to the ground member. For example, the fifth conductive segment 362 of the second conductive member 360 may be electrically connected to the ground member 424. Alternatively, the sixth conductive segment 363 of the second conductive member 360 may be electrically connected to the ground member 425. Alternatively, the fourth conductive segment 361 of the second conductive member 360 may not be electrically connected to the ground member.

In FIG. 13A to FIG. 13D, at least one of the plurality of conductive segments 361, 362, and 363 of the second conductive member 360 of the second housing 320 may be electrically connected to a stub pattern.

According to various embodiments, the stub pattern may be extended from at least part of at least one of the plurality of conductive segments 361, 362, and 363. Alternatively, the stub pattern may include a branch line connected in a parallel manner to at least one of the conductive segments 361, 362, and 363.

According to another embodiment, the stub pattern may be physically separated from the plurality of conductive segments 361, 362, and 363.

According to various embodiments, at least one point of the stub pattern may be selectively connected to the conductive segment. Alternatively, at least one point of the stub pattern may be selectively connected to the ground member.

According to various embodiments, the stub pattern may have various shapes suitable for antenna matching (e.g., impedance matching) of the electronic device including the antenna, and is not limited to the shape proposed in the drawing of the present specification. Alternatively, a point from which the stub pattern is extended in the conductive segment may be various for antenna matching. Alternatively, the stub pattern may be disposed to a location suitable for the antenna matching of the electronic device including the antenna, and is not limited to a location proposed in the drawing of the present specification. Such a perspective may also be applied to various examples described below.

Figure 13A:
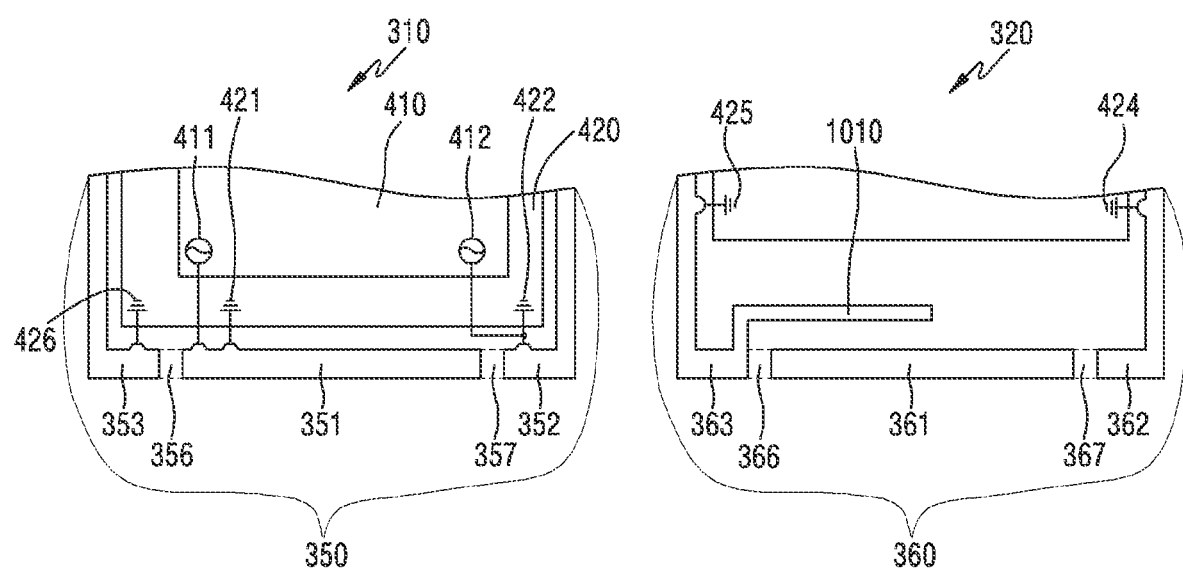
FIG. 13A to FIG. 13D illustrate an electronic device including an antenna having a plurality of feeding portions including a stub pattern according to an embodiment of the present disclosure.

For example, in FIG. 13A, a stub pattern 1010 may be connected at one point of the sixth conductive segment 363 abutting against the third non-conductive slit 366, and thus may be extended towards one side of the second housing 320 (e.g., in a direction of the fifth conductive segment 362) along a lower end of the second conductive member 360.

Figure 13B:
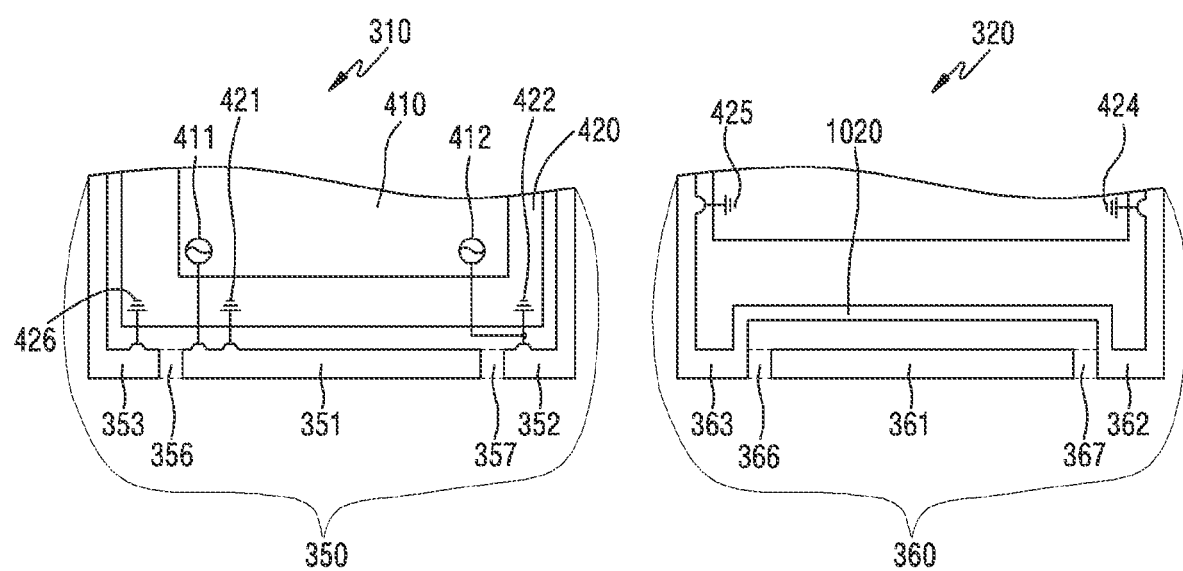

For another example, in FIG. 13B, a stub pattern 1020 may be connected at one point of the sixth conductive segment 363 abutting against the third non-conductive slit 366, thus may be extended towards one side of the second housing 320 (e.g., a direction of the fifth conductive segment 362) along a lower end of the second conductive member 360, and may be connected again at one point of the fifth conductive segment 362 abutting against the fourth non-conductive slit 367.

Figure 13C:
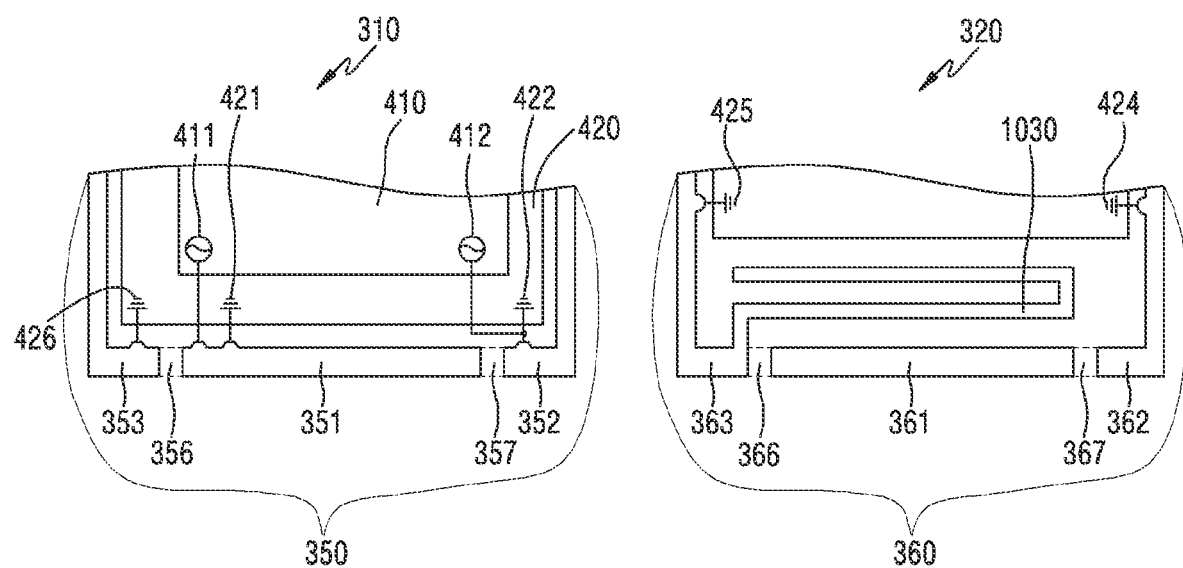

For another example, in FIG. 13C, a stub pattern 1030 may be connected at one point of the sixth conductive segment 363 abutting against the third non-conductive slit 366, thus may be extended towards one side of the second housing 320 (e.g., a direction of the fifth conductive segment 362) along a lower end of the second conductive member 360, and may turn around to be extended again towards the other side of the second housing 320 (e.g., a direction of the sixth conductive segment 363).

Figure 13D:
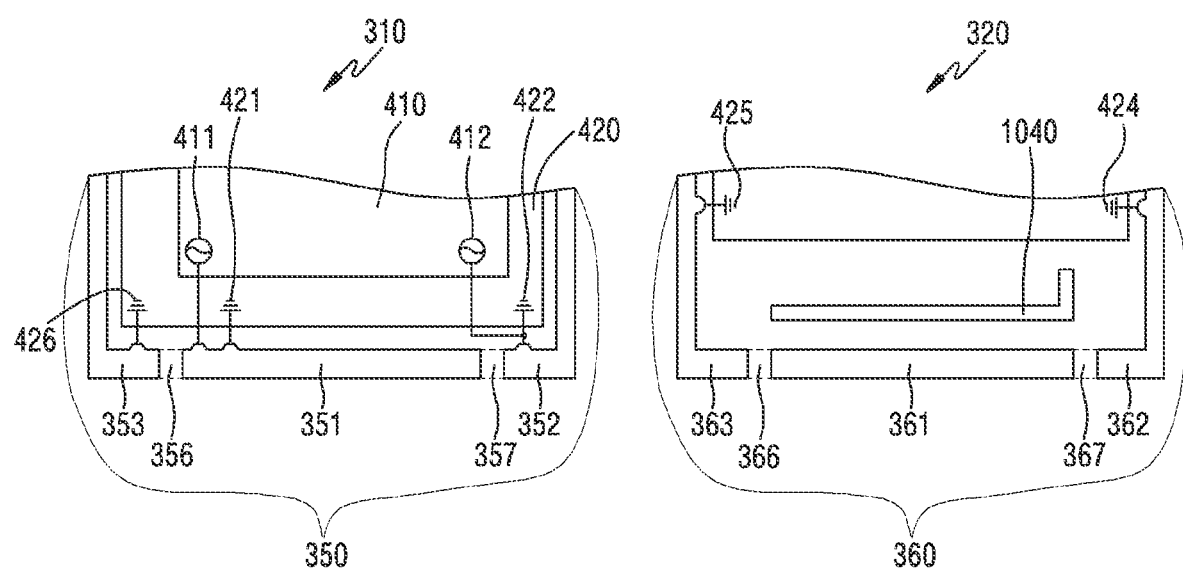

For another example, in FIG. 13D, a stub pattern 1040 may be extended to be substantially parallel along a lower end of the second conductive member 360 by being separated from the second conductive member 360, and may be extended again towards an upper end of the second housing 320.

FIG. 14A to FIG. 14D illustrate an electronic device including an antenna having a single feeding portion including a stub pattern according to an embodiment of the present disclosure.

Figure 14A:
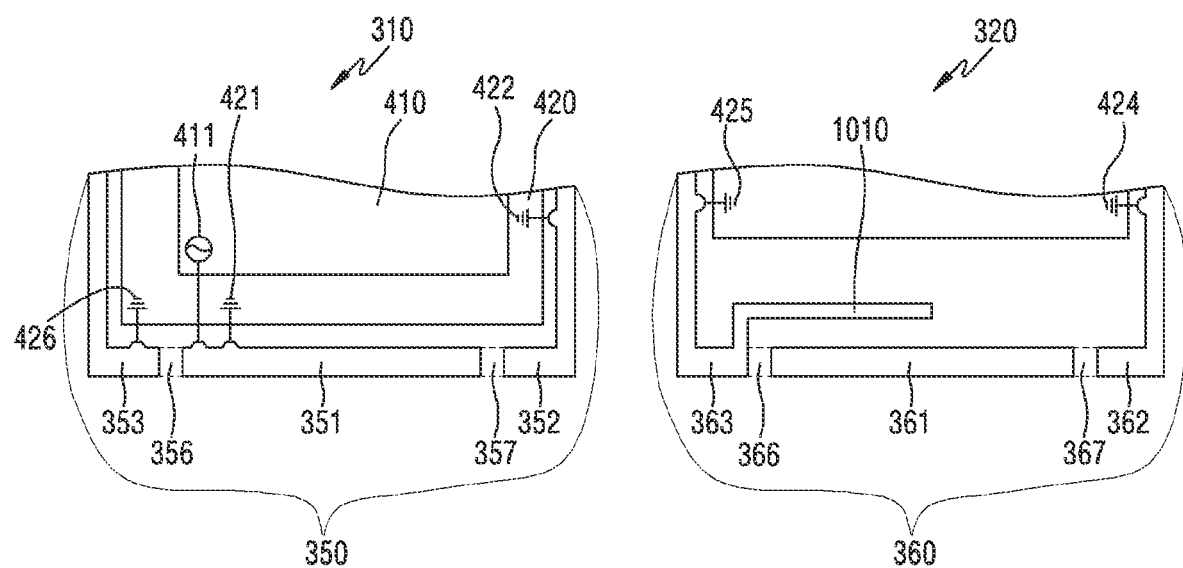
FIG. 14A to FIG. 14D illustrate an electronic device including an antenna having a single feeding portion including a stub pattern according to an embodiment of the present disclosure.
Figure 14B:
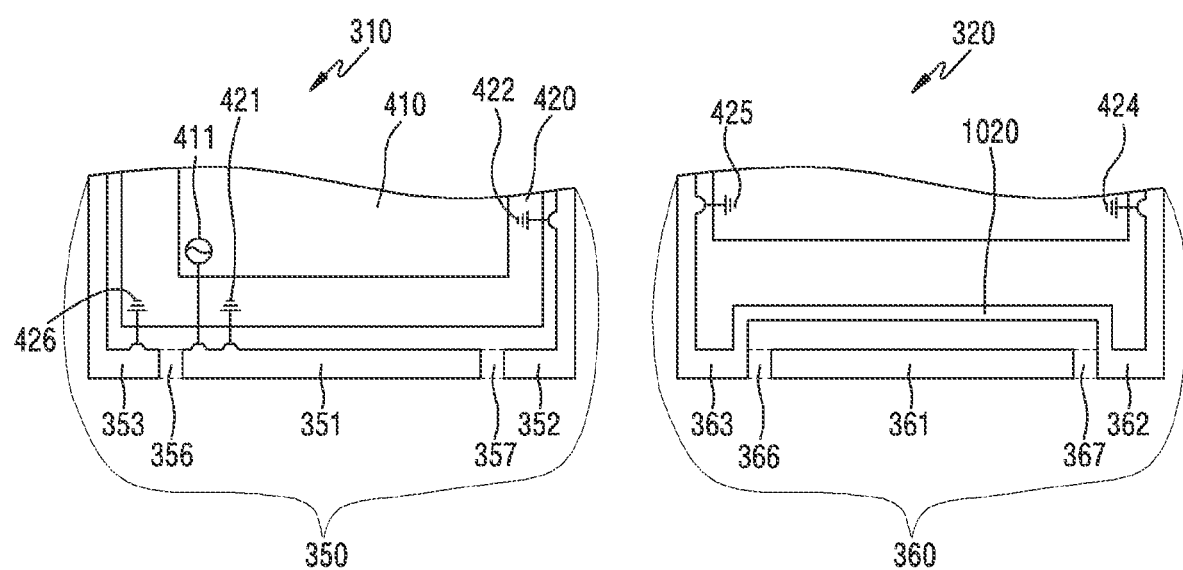
Figure 14C:
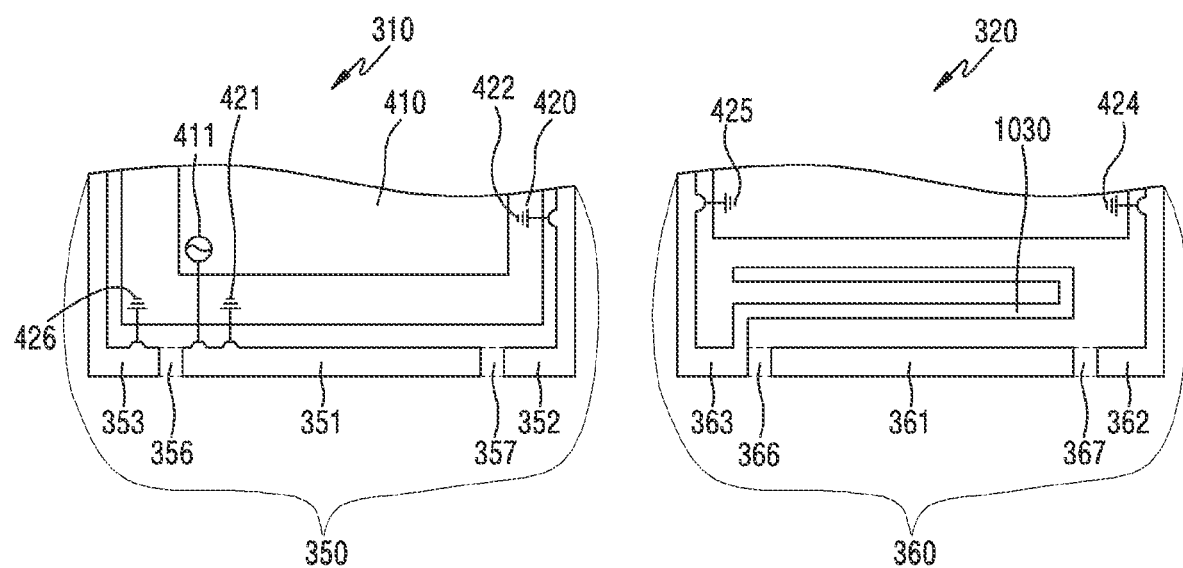

In FIG. 14A to FIG. 14C, at least one of the plurality of conductive segments 351, 352, and 353 of the first conductive member 350 of the first housing 310 may be supplied with power from at least one feeding portion. For example, among the plurality of conductive segments 351, 352, and 353, the first conductive segment 351 may be supplied with power from the first feeding portion 411. According to an embodiment, the first feeding portion 411 may be electrically connected with one point of the first conductive segment 351 abutting against the first slit 356. Alternatively, at least one of the plurality of conductive segments 351, 352, and 353 of the first conductive member 350 of the first housing 310 may be electrically connected with at least one ground member.

According to various embodiments, since an electronic device including an antenna using the first conductive member 350 of FIG. 14A to FIG. 14D is at least similar or identical to an electronic device including an antenna using the first conductive member 350 of the first housing 310 of FIG. 7A to FIG. 7C, detailed descriptions thereof will be omitted.

Figure 14D:
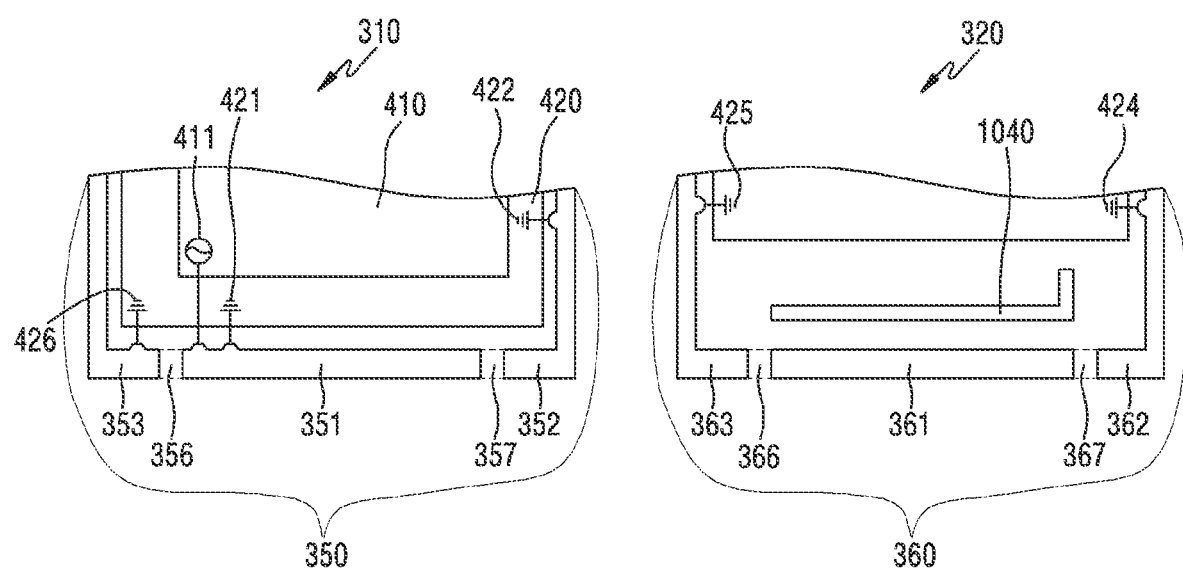

In FIG. 14A and FIG. 14D, at least one of the plurality of conductive segments 361, 362, and 363 of the second conductive member 360 may be electrically connected to the ground member. According to various embodiments, the electronic device including the antenna using the second conductive member 360 of FIG. 14A to FIG. 14D may be at least similar or identical to the electronic device including the antenna using the second conductive member 360 of FIG. 13A to FIG. 13D.

In FIG. 14A to FIG. 14D, at least one of the conductive segments 361, 362, and 363 of the second conductive member 360 of the second housing 320 may be electrically connected to a stub pattern.

According to various embodiments, since an example of preparing the stub pattern in the second housing 320 of FIG. 14A to FIG. 14D is at least similar or identical to an example of preparing the stub pattern in the second housing 320 of FIG. 13A to FIG. 3D, redundant descriptions will be omitted.

Figure 15A:
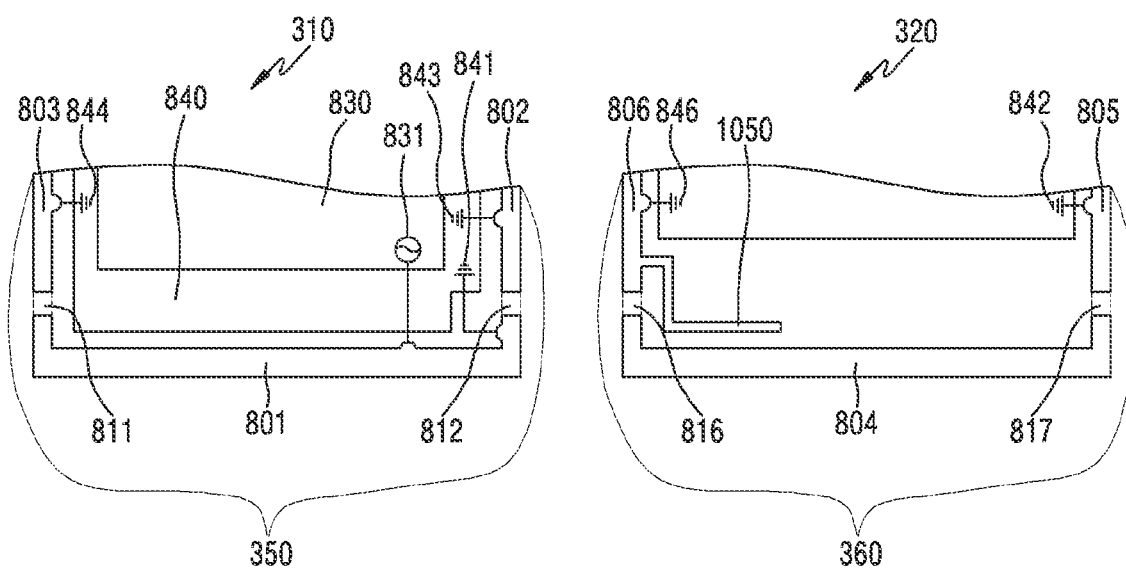
Figure 15B:
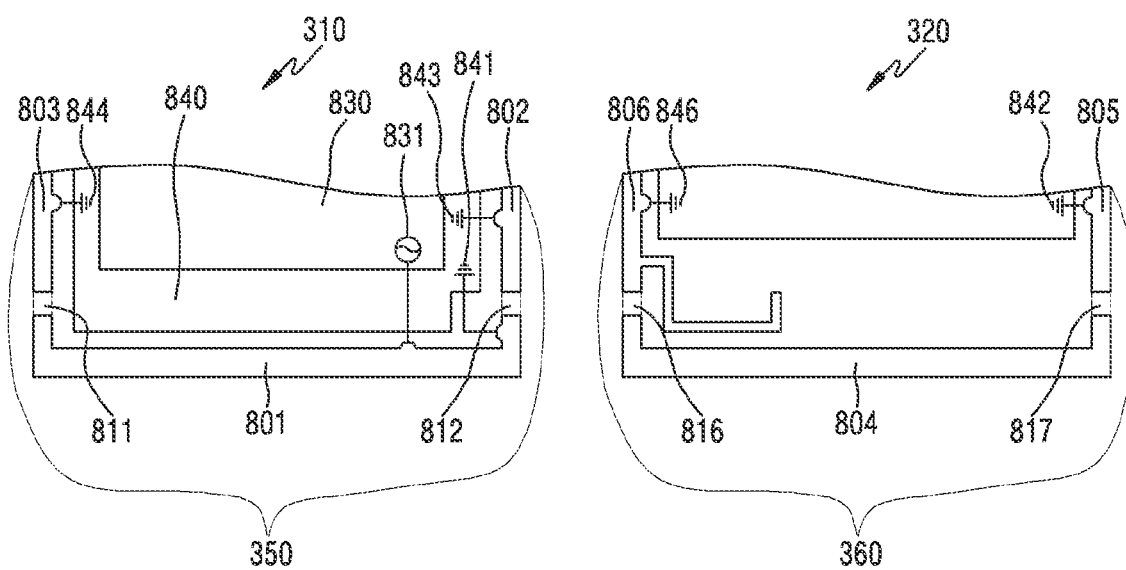

FIG. 15A and FIG. 15B illustrate an electronic device including an antenna having a single feeding portion including a stub pattern according to an embodiment of the present disclosure.

In FIG. 15A and FIG. 15B, since the electronic device including the antenna of the first housing 310 is at least similar or identical to the aforementioned antenna or device of FIG. 8A to FIG. 8C, redundant descriptions will be omitted.

In FIG. 15A and FIG. 15B, at least part of the plurality of conductive segments 804, 805, and 806 of the second conductive member 360 of the second housing 320 may be electrically connected to the ground member. For example, the fifth conductive segment 805 of the second conductive member 360 may be electrically connected to the ground member 842. Alternatively, the sixth conductive segment 806 of the second conductive member 360 may be electrically connected to the ground member 846. Alternatively, the fourth conductive segment 804 of the second conductive member 360 may not be electrically connected to the ground member.

In FIG. 15A and FIG. 15B, at least one of the conductive segments 361 362, and 363 of the second conductive member 360 of the second housing 320 may be electrically connected to a stub pattern.

For example, in FIG. 15A, a stub pattern 1050 may be connected at one point of the sixth conductive segment 806 abutting against a third non-conductive slit 816 located at one side of the second housing 320, and thus may be extended towards a lower end of the second housing 320, and may be extended again to be substantially parallel in a direction of the fifth conductive segment 362 along a lower end of the second conductive member 360.

In various embodiments, in FIG. 15B, a stub pattern 1060 may be connected at one point of the sixth conductive segment 806 abutting against the third slit 816 located at one side of the second housing 320, and thus may be extended again to be substantially parallel in a direction of the fifth conductive segment 362 along a lower end of the second conductive member 360, and may be extended again towards an upper end of the second housing 320.

FIG. 16A to FIG. 16G illustrate an electronic device including an antenna having a plurality of feeding portions including a stub pattern connected with a switching circuit according to an embodiment of the present disclosure.

In FIG. 16A to FIG. 16G, at least one of the plurality of conductive segments 351, 352, and 353 of the first conductive member 350 of the first housing 310 may be supplied with power from at least one feeding portion. Alternatively, at least one of the plurality of conductive segments 351, 352, and 353 of the first conductive member 350 of the first housing 310 may be electrically connected with at least one ground member.

According to various embodiments, since the electronic device including the antenna using the first conductive member 350 of FIG. 16A to FIG. 16G is at least similar or identical to the electronic device including the antenna using the first conductive member 350 of the first housing 310 of FIG. 6A to FIG. 6C, redundant descriptions will be omitted.

In FIG. 16A to FIG. 16G, at least one of the plurality of conductive segments 361, 362, and 363 of the second conductive member 360 may be electrically connected to the ground member. For example, the fifth conductive segment 362 of the second conductive member 360 may be electrically connected to a ground member 1624. Alternatively, the sixth conductive segment 363 of the second conductive member 360 may be electrically connected to a ground member 1625.

In FIG. 16A to FIG. 16G, at least one of the plurality of conductive segments 361, 362, and 363 of the second conductive member 360 of the second housing 320 may be selectively connected with a stub pattern by a switching circuit. According to an embodiment, the switching circuit may operate in an on-state when the first housing 310 and the second housing 320 are folded, and may operate in an off-state when the first housing 310 and the second housing 320 are unfolded. Accordingly, at least one of the plurality of conductive segments 361, 362, and 363 of the second conductive member 360 may be selectively connected with the stub pattern.

Figure 16A:
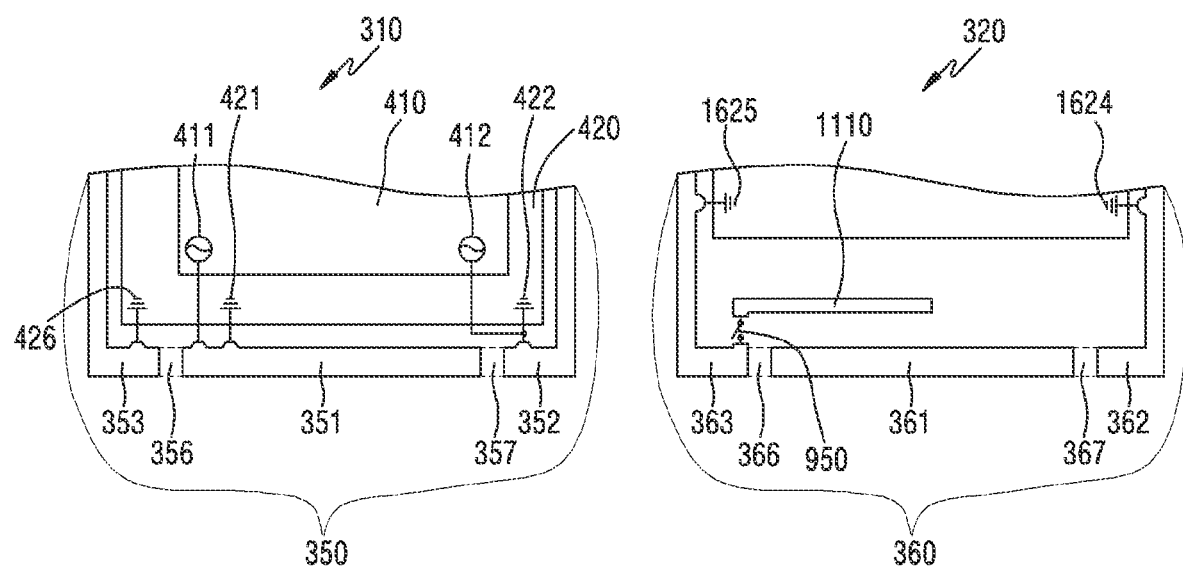
FIG. 16A to FIG. 16G illustrate an electronic device including an antenna having a plurality of feeding portions including a stub pattern connected with a switching circuit according to an embodiment of the present disclosure.

For example, in FIG. 16A, the sixth conductive segment 363 of the second conductive member 360 may be selectively connected with a stub pattern 1110 by a switching circuit 950. In this case, the stub pattern 1110 may be connected to the switching circuit 950 and thus may be extended towards one side of the second housing 320 (e.g., a direction of the fifth conductive segment 362) along a lower end of the second conductive member 360.

Figure 16B:
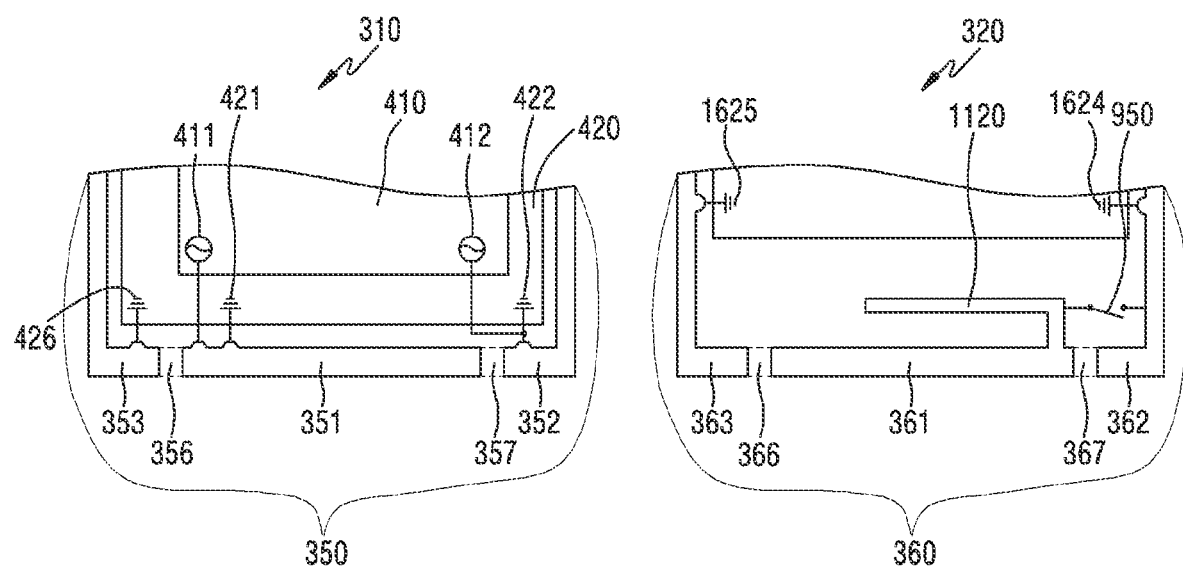

For another example, in FIG. 16B, the fifth conductive segment 362 of the second conductive member 360 may be selectively connected with a stub pattern 1120 by the switching circuit 950. In this case, the stub pattern 1120 may be connected at one point of the fourth conductive segment 361 abutting against the fourth non-conductive slit 367 and thus may be extended towards one side of the second housing 320 e.g., a direction of the sixth conductive segment 363) along a lower end of the second conductive member 360.

Figure 16C:
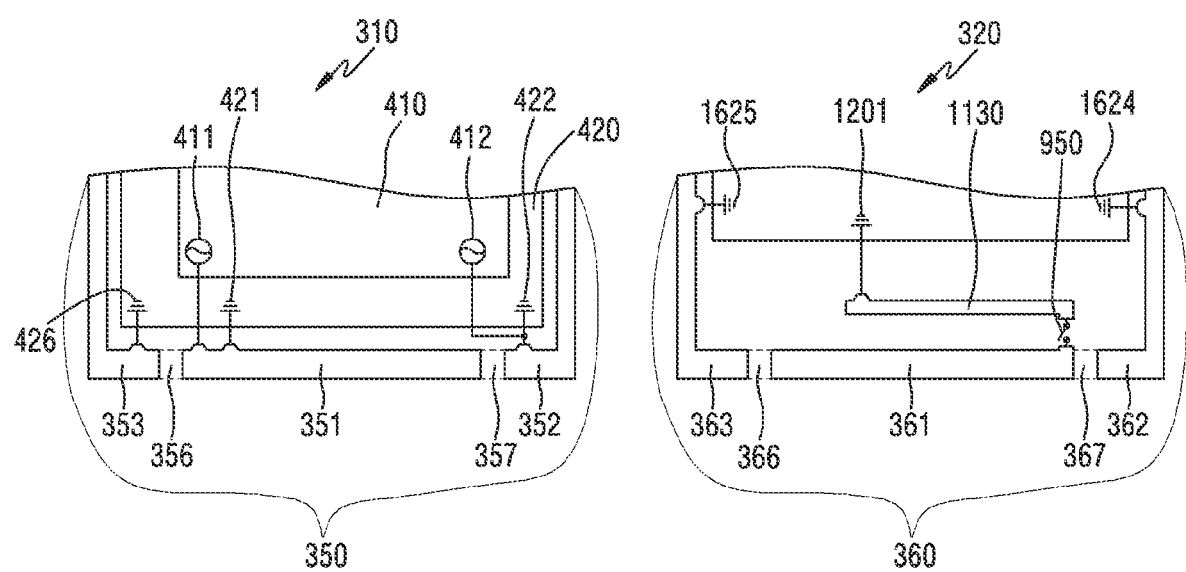

For another example, in FIG. 16C, the fourth conductive segment 361 of the second conductive member 360 may be selectively connected with a stub pattern 1130 by the switching circuit 950. In this case, the stub pattern 1130 may be connected to the switching circuit 950 and thus may be extended towards one side of the second housing 320 (e.g., a direction of the sixth conductive segment 363) along a lower end of the second conductive member 360, and may be electrically connected again with a ground member 1201.

Figure 16D:
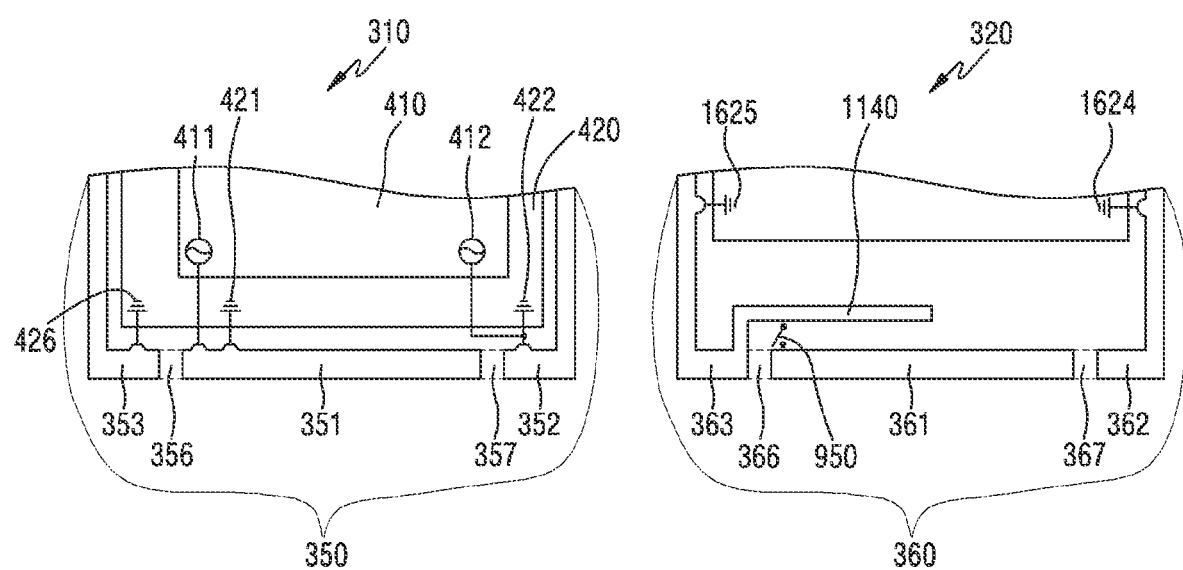

For another example, in FIG. 16D, the fourth conductive segment 361 of the second conductive member 360 may be selectively connected with a stub pattern 1140 by the switching circuit 950. In this case, the stub pattern 1140 may be connected at one point of the sixth conductive segment 363 abutting against the third non-conductive slit 366 and thus may be extended towards one side of the second housing 320 (e.g., a direction of the fifth conductive segment 362) along a lower end of the second conductive member 360.

Figure 16E:
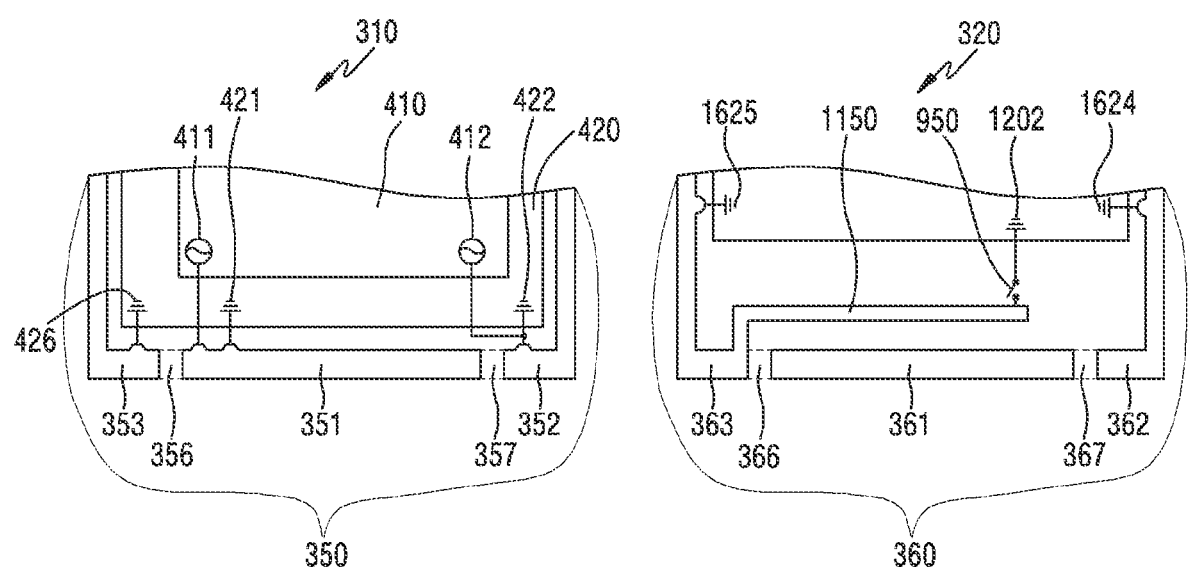

For example, in FIG. 16E, a stub pattern 1150 may be connected at one point of the sixth conductive segment 363 abutting against the third slit 366, and thus may be extended towards one side of the second housing 320 (e.g., in a direction of the fifth conductive segment 362) along a lower end of the second conductive member 360. In addition, the extended end of the stub pattern 1150 may be selectively connected with a ground member 1202 by the switching circuit 950.

Figure 16F:
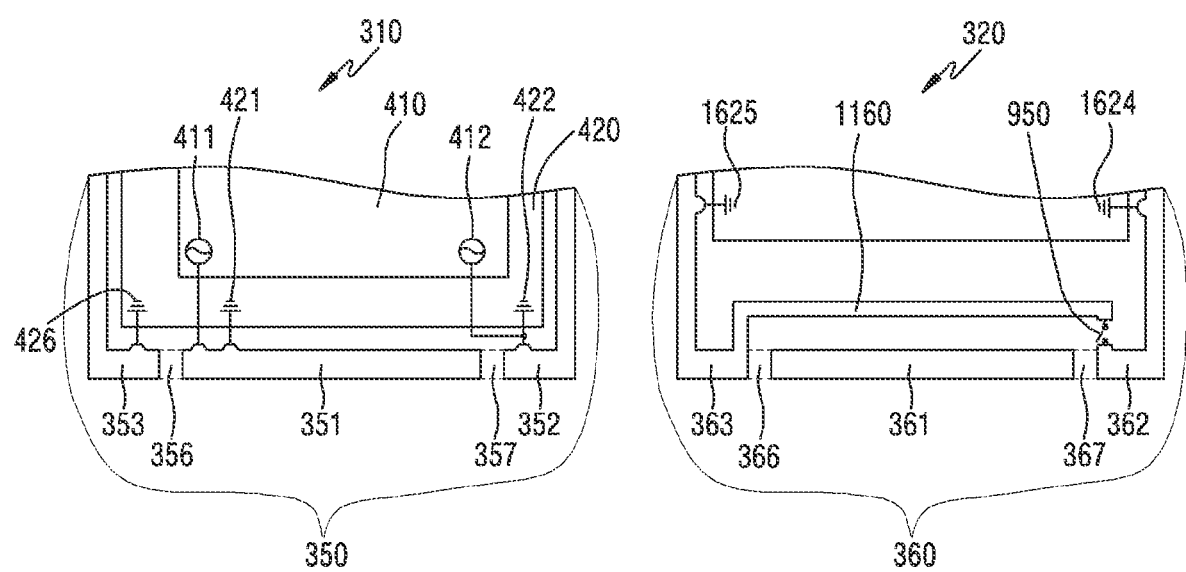

For another example, in FIG. 16F, the fifth conductive segment 362 of the second conductive member 360 may be selectively connected with a stub pattern 1160 by the switching circuit 950. In this case, the stub pattern 1160 may be connected with the switching circuit and thus may be extended towards one side of the second housing 320 (e.g., a direction of the sixth conductive segment 363) along a lower end of the second conductive member 360, and may be connected again at one point of the sixth conductive segment 363 abutting against the third non-conductive slit 366.

Figure 16G:
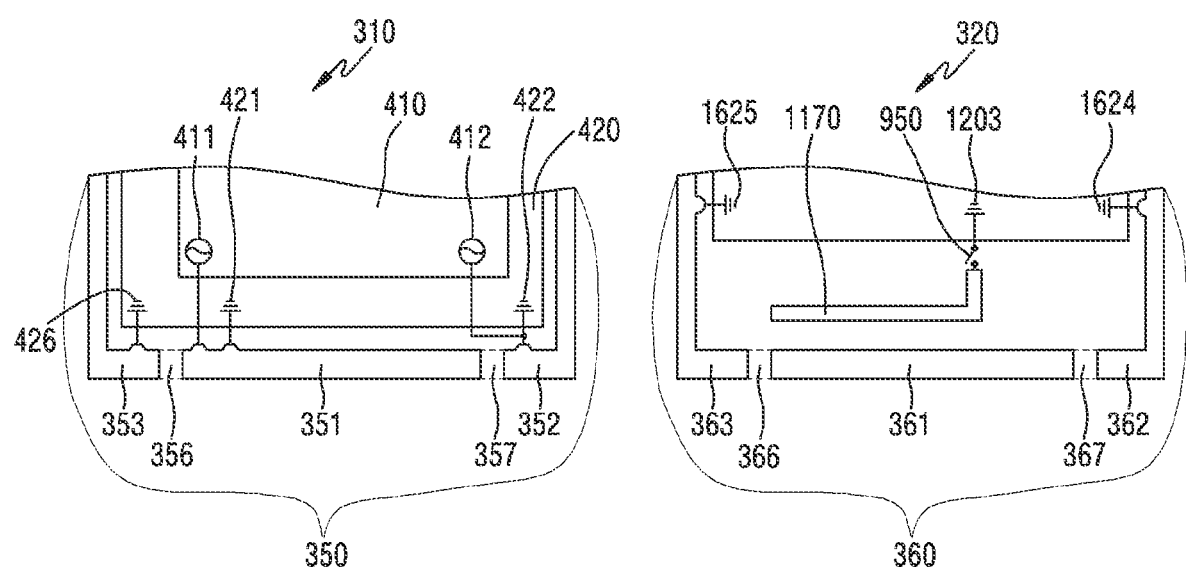
Figure 17A:
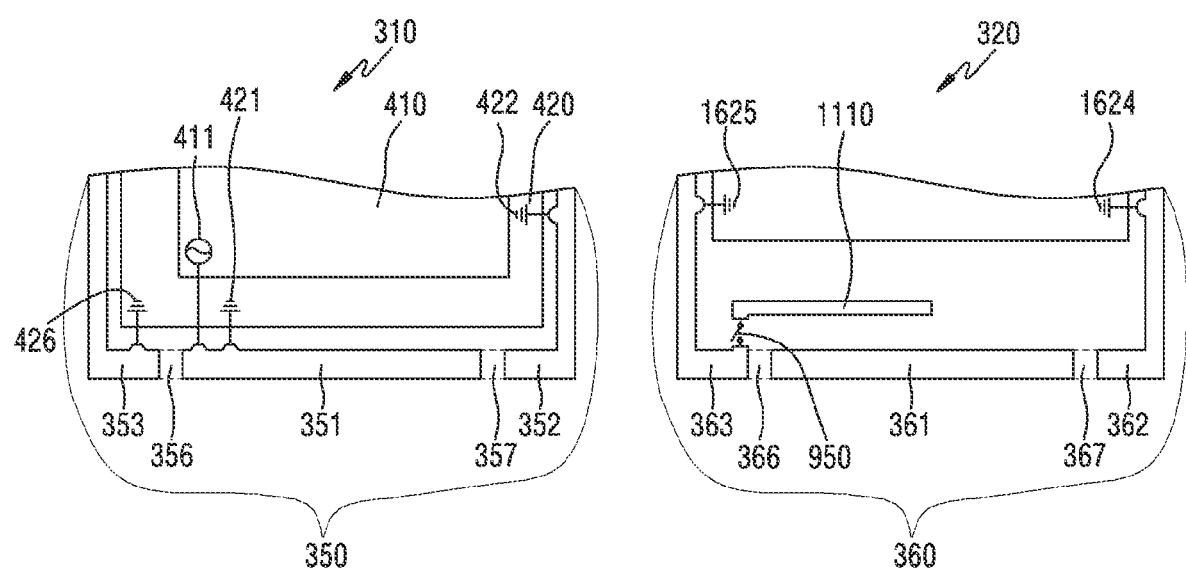
FIG. 17A to FIG. 17G illustrate an electronic device including an antenna having a single feeding portion including a stub pattern connected with a switching circuit according to an embodiment of the present disclosure.
Figure 17B:
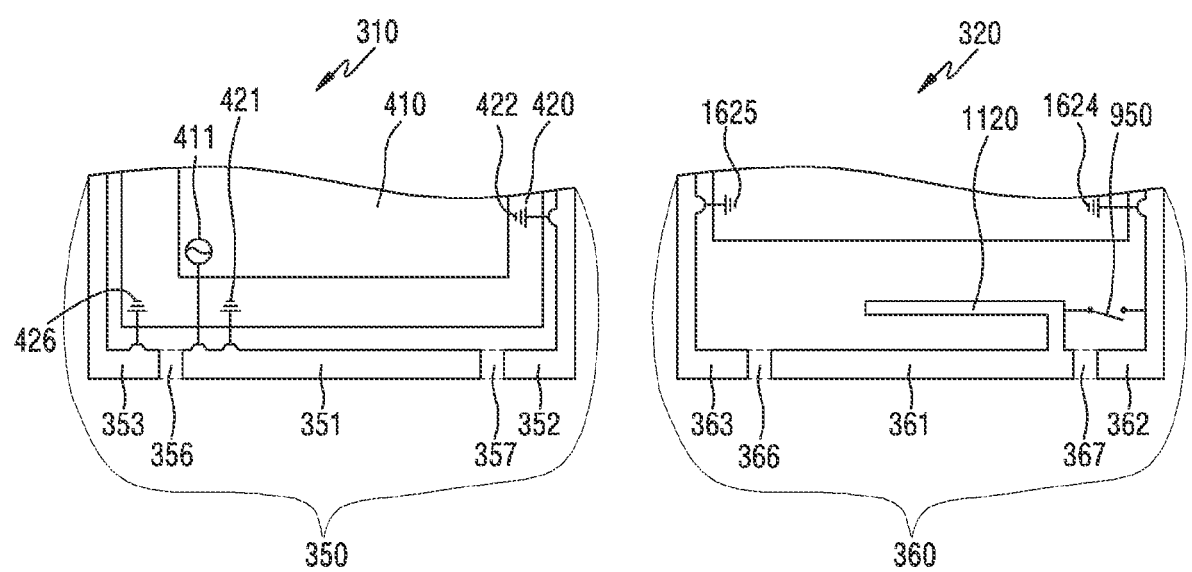
Figure 17C:
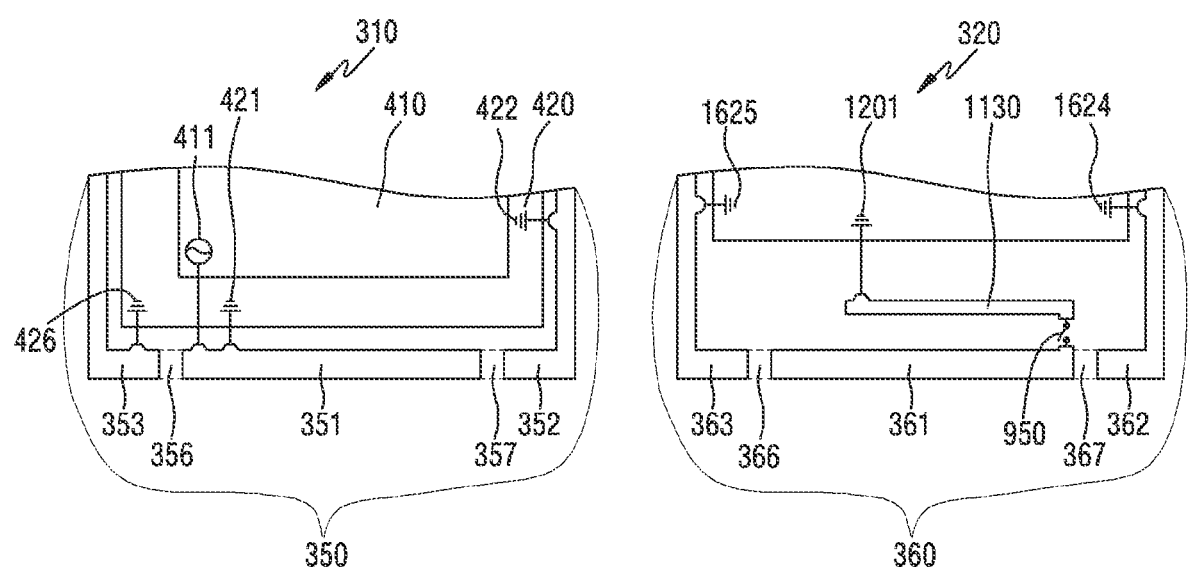
Figure 17D:
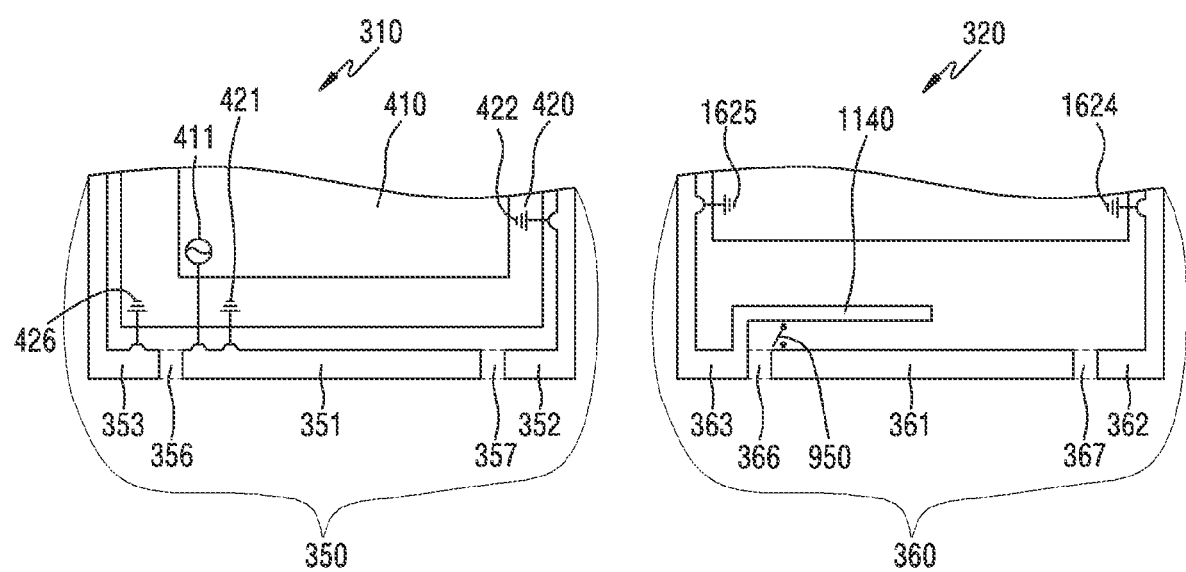
Figure 17E:
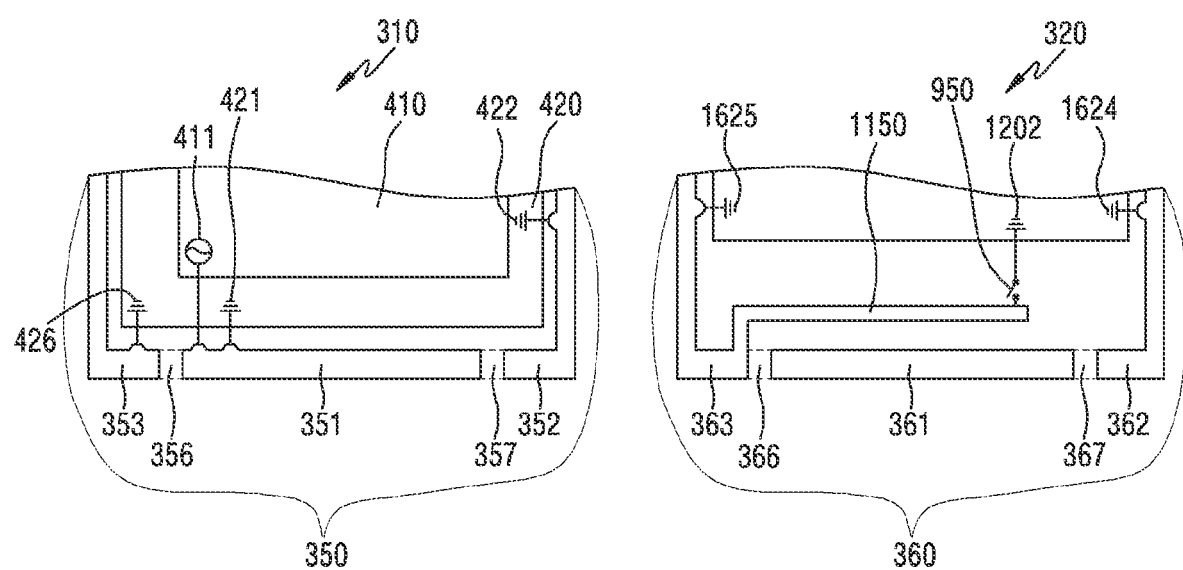
Figure 17F:
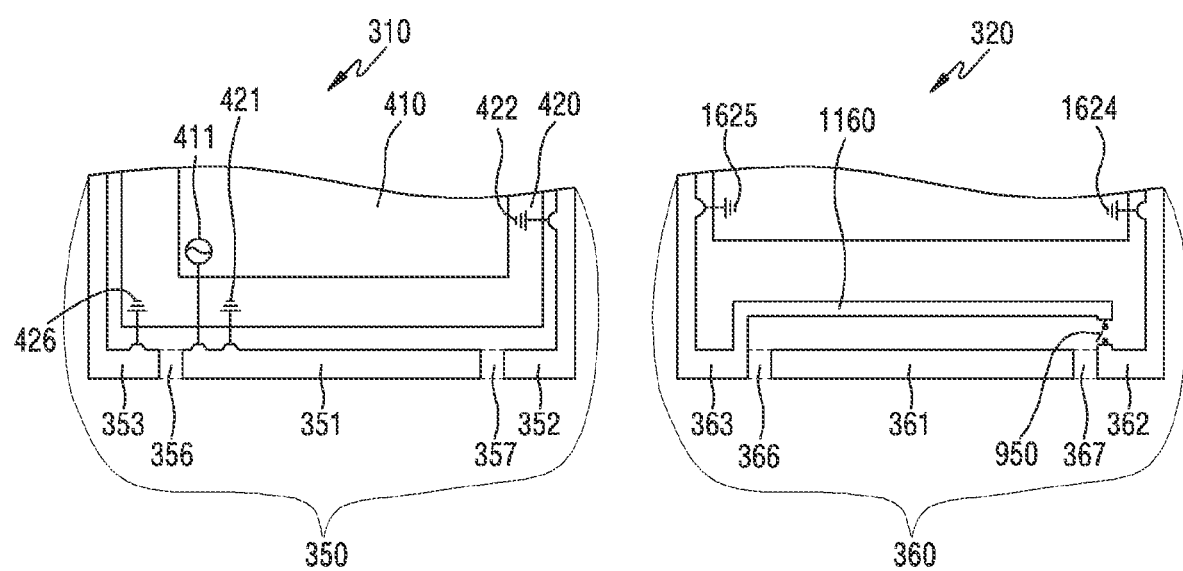
Figure 17G:
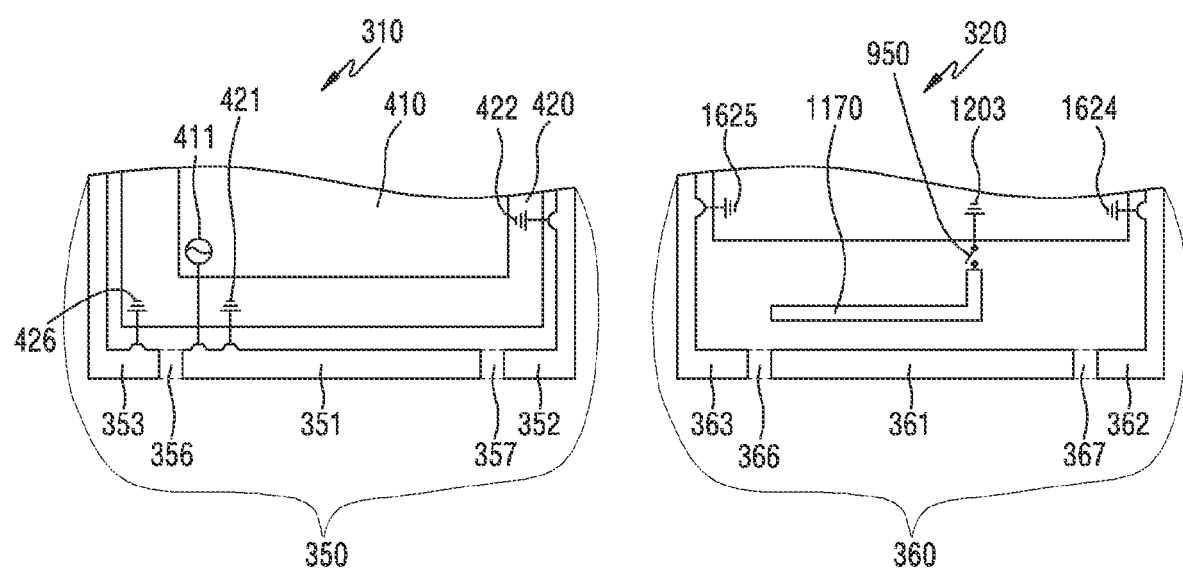

For another example, in FIG. 16G, a stub pattern 1170 may be spaced apart from the second conductive segment 360 and thus may be extended to be substantially parallel along a lower end of the second conductive member 360. In addition, the extended end of the stub pattern 1170 may be selectively connected with the ground member 1203 by the switching circuit 950.

FIG. 17A to FIG. 17G illustrate an electronic device including an antenna having a single feeding portion including a stub pattern connected with a switching circuit according to an embodiment of the present disclosure.

In FIG. 17A to FIG. 17G, at least one of the plurality of conductive segments 351, 352, and 353 of the first conductive member 350 of the first housing 310 may be supplied with power from at least one feeding portion. For example, among the plurality of conductive segments 351, 352, and 353, the first conductive segment 351 may be supplied with power from the first feeding portion 411. In this case, the first feeding portion 411 may be electrically connected to one point of the first conductive segment 351 abutting against the first non-conductive slit 356. Alternatively, at least one of the plurality of conductive segments 351, 352, and 353 of the first conductive member 350 of the first housing 310 may be electrically connected with at least one ground member.

According to various embodiments, since an electronic device including an antenna using the first conductive member 350 of FIG. 17A to FIG. 17G is at least similar or identical to an electronic device including an antenna using the first conductive member 350 of the first housing 310 of FIG. 7A to FIG. 7C, detailed descriptions thereof will be omitted.

In FIG. 17A to FIG. 17G, at least one of the plurality of conductive segments 361, 362, and 363 of the second conductive member 360 of the second housing 320 may be selectively connected with a stub pattern by a switching circuit.

According to various embodiments, since an example of preparing the stub pattern in the second housing 320 of FIG. 17A to FIG. 17G is at least similar or identical to an example of preparing the stub pattern in the second housing 320 of FIG. 16A to FIG. 16G, redundant descriptions will be omitted.

Figure 18A:
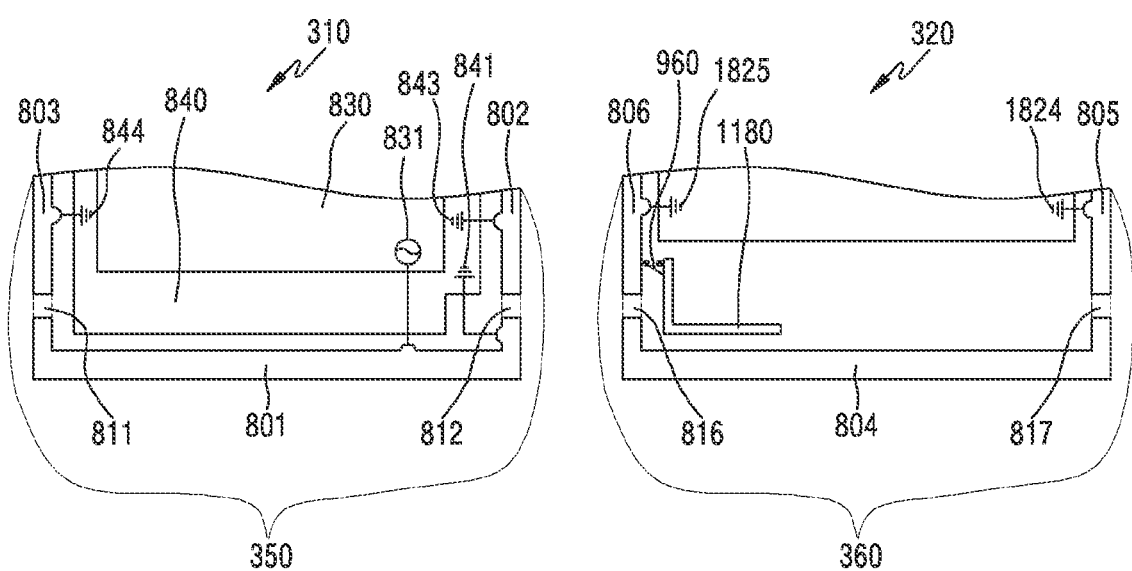
FIG. 18A and FIG. 18B illustrate an electronic device including an antenna having a single feeding portion including a stub pattern connected with a switching circuit according to another embodiment of the present disclosure.
Figure 18B:
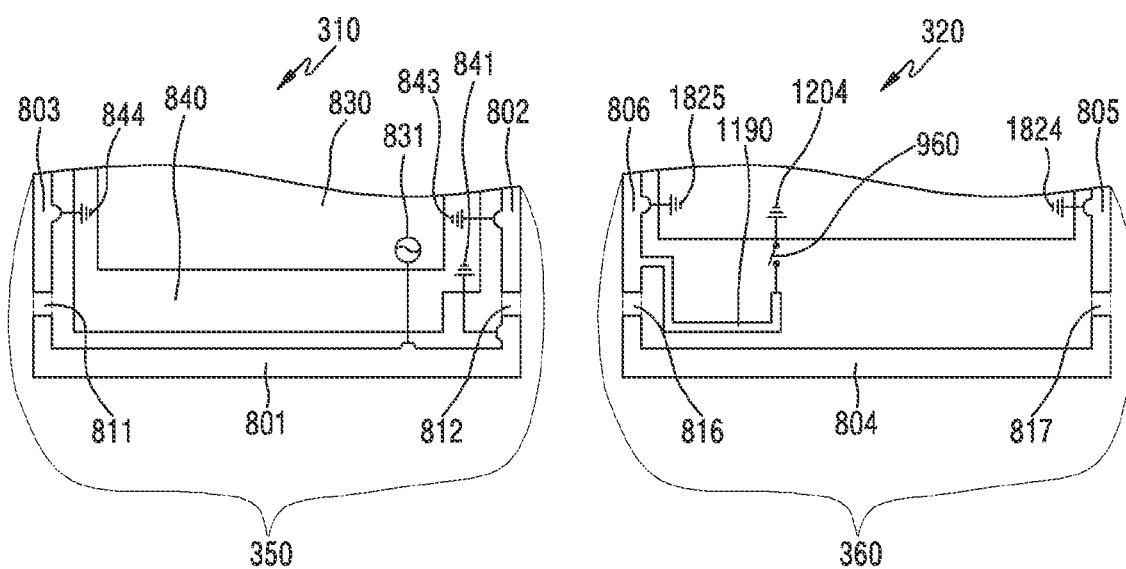

FIG. 18A and FIG. 18B illustrate an electronic device including an antenna having a single feeding portion including a stub pattern connected with a switching circuit according to another embodiment of the present disclosure.

Since the electronic device including the antenna of the first housing 310 of FIG. 18A and FIG. 18B is at least similar or identical to the aforementioned electronic device including the antenna of FIG. 8A to FIG. 8C, redundant descriptions will be omitted.

In FIG. 18A and FIG. 18B, at least part of the plurality of conductive segments 804, 805, and 806 of the second conductive member 360 of the second housing 320 may be electrically connected to the ground member. For example, the fifth conductive segment 805 of the second conductive member 360 may be electrically connected to a ground member 1824. Alternatively, the sixth conductive segment 806 of the second conductive member 360 may be electrically connected to a ground member 1825. Alternatively, the fourth conductive segment 804 of the second conductive member 360 may not be electrically connected to the ground member.

In FIG. 18A to FIG. 18B, at least one of the plurality of conductive segments 804, 805, and 806 of the second conductive member 360 of the second housing 320 may be electrically connected with the stub pattern 1180 by a switching circuit 960.

For example, in FIG. 18A, the sixth conductive segment 806 of the second conductive member 360 may be electively connected with a stub pattern 1180 by the switching circuit 960. In this case, the stub pattern 1180 may be connected to the switching circuit 960 and thus may be extended towards a lower end of the second housing 320, and may be extended again to be substantially parallel in a direction of the fifth conductive segment 805 along a lower end of the second conductive member 360.

In another example, in FIG. 18B, a stub pattern 1190 may be connected at one point of the sixth conductive segment 806 abutting against the third non-conductive slit 816 located at one side of the second housing 320, and thus may be extended again to be substantially parallel in a direction of the fifth conductive segment 362 along a lower end of the second conductive member 360, and may be extended again towards an upper end of the second housing 320. In addition, the extended end of the stub pattern 1190 may be selectively connected with a ground member 1204 by the switching circuit 960.

FIG. 19A to FIG. 19G illustrate an electronic device including an antenna having a plurality of feeding portion including a stub pattern connected with a switching circuit connected with a lumped element according to an embodiment of the present disclosure.

In FIG. 19A to FIG. 19G, at least one of the plurality of conductive segments 351, 352, and 353 of the first conductive member 350 of the first housing 310 may be supplied with power from at least one feeding portion. Alternatively, at least one of the plurality of conductive segments 351, 352, and 353 of the first conductive member 350 of the first housing 310 may be electrically connected with at least one ground member.

According to various embodiments, since an electronic device including an antenna using the first conductive member 350 of FIG. 19A to FIG. 19G is at least similar or identical to an electronic device including an antenna using the first conductive member 350 of the first housing 310 of FIG. 6A to FIG. 6C, detailed descriptions thereof will be omitted.

In FIG. 19A to FIG. 19G, at least part of the plurality of conductive segments 804, 805, and 806 of the second conductive member 360 of the second housing 320 may be electrically connected to the ground member. For example, the fifth conductive segment 805 of the second conductive member 360 may be electrically connected to a ground member 1924. Alternatively, the sixth conductive segment 806 of the second conductive member 360 may be electrically connected to a ground member 1925.

In FIG. 19A to FIG. 19G, at least one of the plurality of conductive segments 361, 362, and 363 of the second conductive member 360 of the second housing 320 may be selectively connected to a stub pattern by the switching circuit 950 connected to a lumped element 951. In this case, the switching circuit may operate in an on-state when the first housing 310 and the second housing 320 are folded, and may operate in an off-state when the first housing 310 and the second housing 320 are unfolded. Accordingly, at least one of the plurality of conductive segments 361, 362, and 363 of the second conductive member 360 may be selectively connected with the stub pattern connected to the lumped element 951.

Figure 19A:
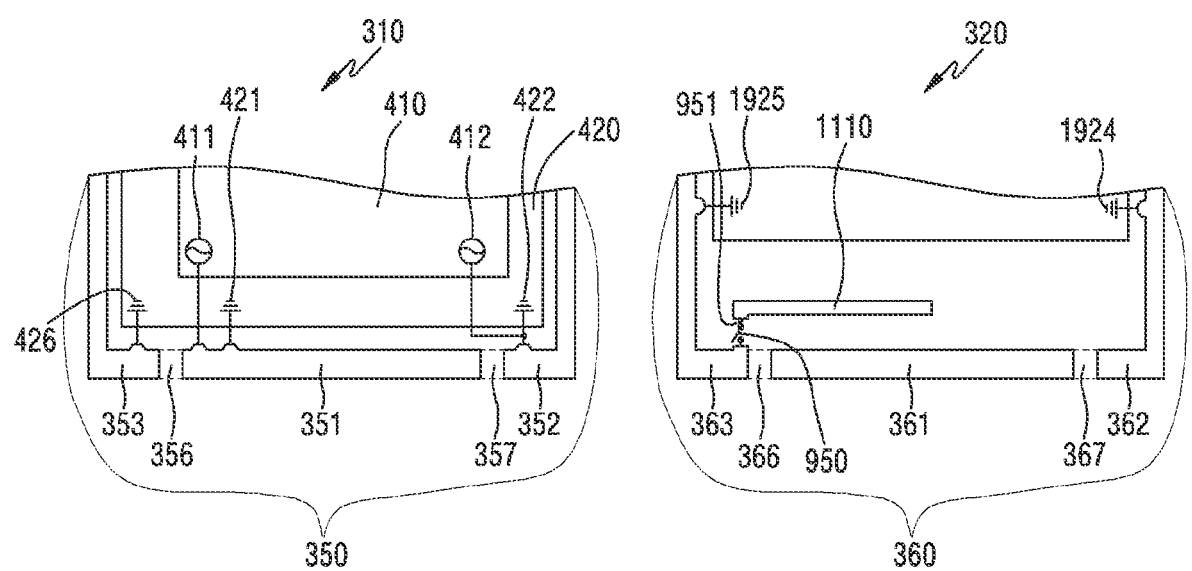
FIG. 19A to FIG. 19G illustrate an electronic device including an antenna having a plurality of feeding portion including a stub pattern connected with a switching circuit connected with a lumped element according to an embodiment of the present disclosure.

For example, in FIG. 19A, the sixth conductive segment 363 of the second conductive member 360 may be selectively connected with the stub pattern 1110 by the switching circuit 950 via the lumped element 951. In this case, the stub pattern 1110 may be connected to the switching circuit 950 and thus may be extended towards one side of the second housing 320 (e.g., a direction of the fifth conductive segment 362) along a lower end of the second conductive member 360.

Figure 19B:
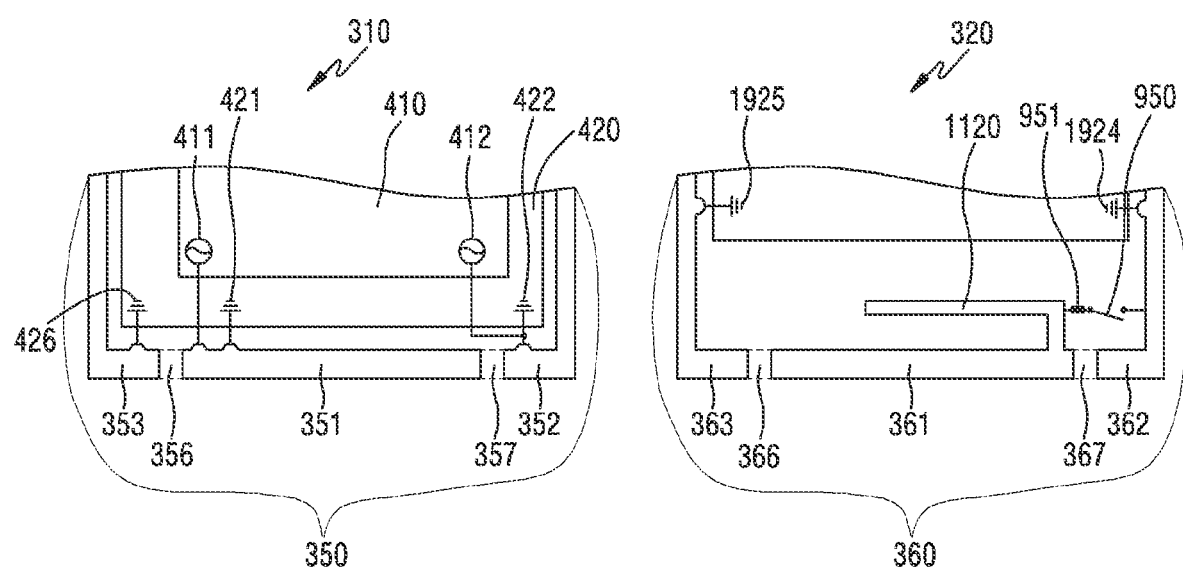

For another example, in FIG. 19B, the fifth conductive segment 362 of the second conductive member 360 may be selectively connected with the stub pattern 1120 via the lumped element 951. In this case, the stub pattern 1120 may be connected at one point of the fourth conductive segment 361 abutting against the fourth non-conductive slit 367 and thus may be extended towards one side of the second housing 320 (e.g., a direction of the sixth conductive segment 363) along a lower end of the second conductive member 360.

Figure 19C:
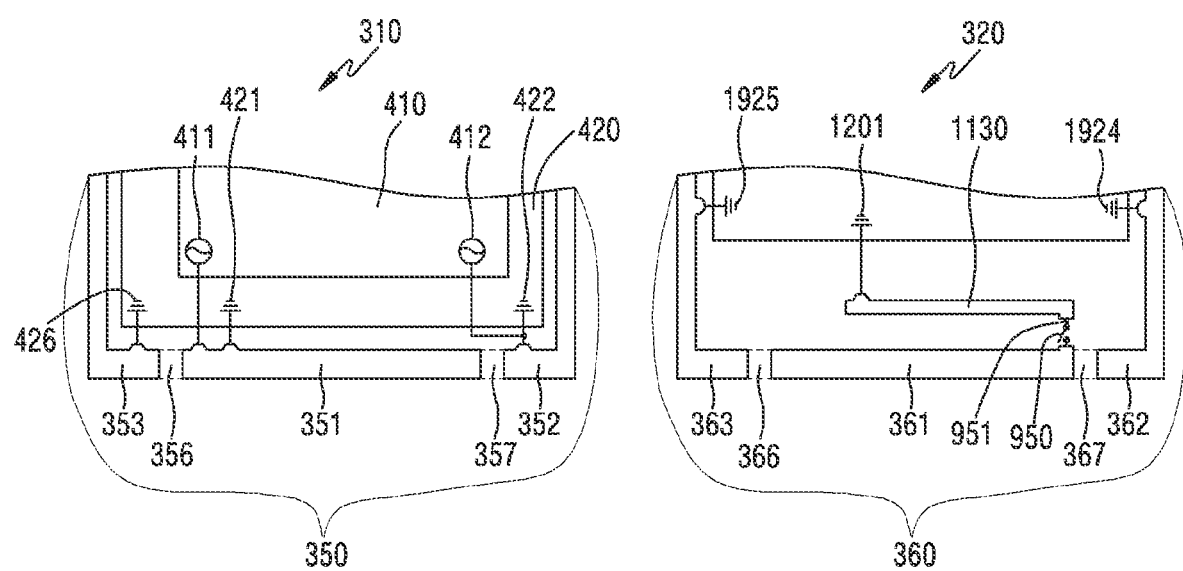

For another example, in FIG. 19C, the fourth conductive segment 361 of the second conductive member 360 may be selectively connected with a stub pattern 1130 by the switching circuit 950 via the lumped element 951. In this case, the stub pattern 1130 may be connected to the switching circuit 950 and thus may be extended towards one side of the second housing 320 (e.g., a direction of the sixth conductive segment 363) along a lower end of the second conductive member 360, and may be electrically connected again with a ground member 1201.

Figure 19D:
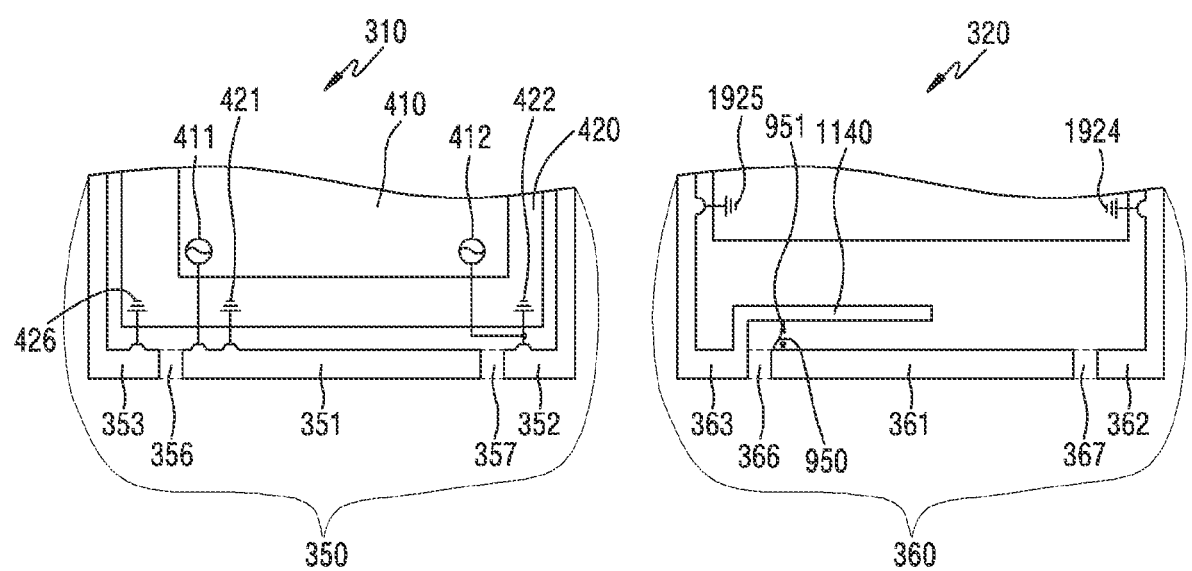

For another example, in FIG. 19D, the fourth conductive segment 361 of the second conductive member 360 may be selectively connected with the stub pattern 1140 via the lumped element 951. In this case, the stub pattern 1140 may be connected at one point of the fourth conductive segment 361 abutting against the third non-conductive slit 366 and thus may be extended towards one side of the second housing 320 (e.g., a direction of the fifth conductive segment 362) along a lower end of the second conductive member 360.

Figure 19E:
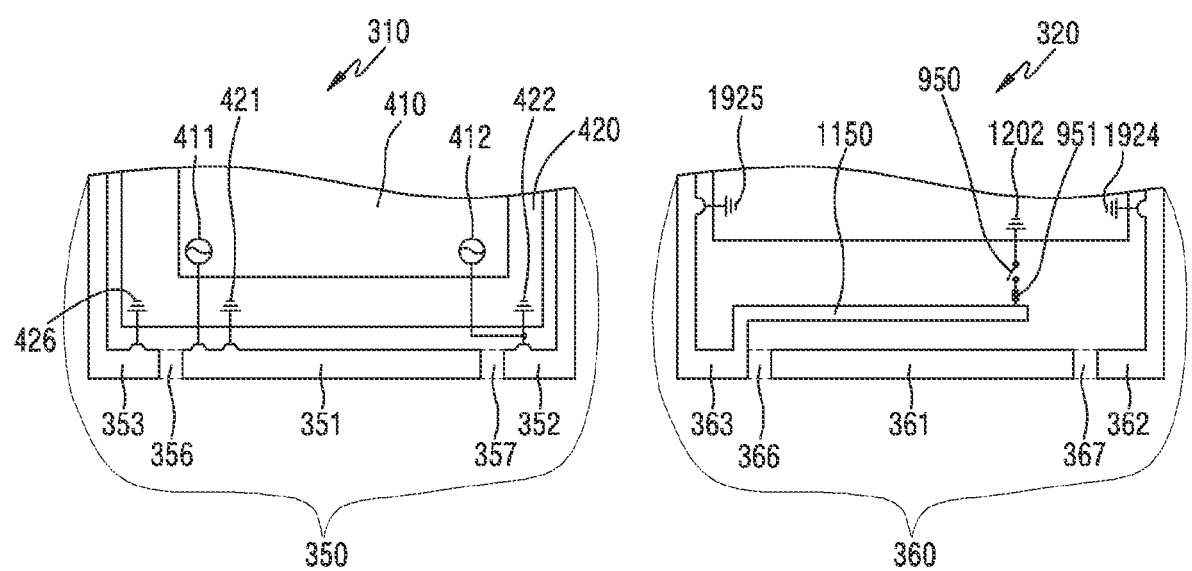

For another example, in FIG. 19E, the stub pattern 1150 may be connected at one point of the sixth conductive segment 363 abutting against the third slit 366, and thus may be extended towards one side of the second housing 320 (e.g., in a direction of the fifth conductive segment 362) along a lower end of the second conductive member 360. In addition, the extended end of the stub pattern 1150 may be selectively connected with a ground member 1202 by the switching circuit 950 via the lumped element 951.

Figure 19F:
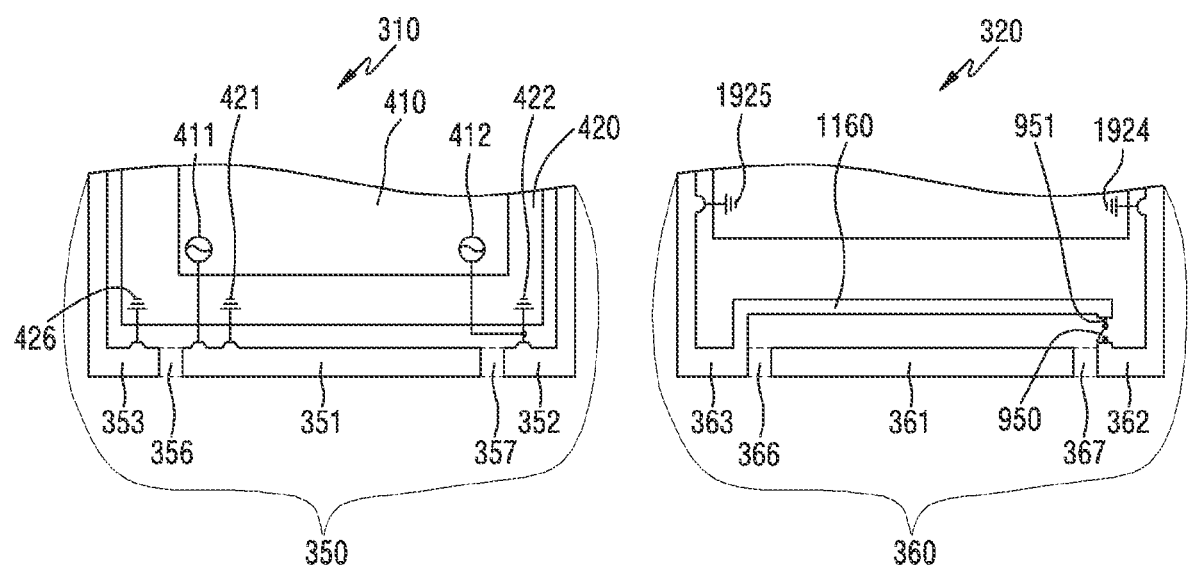

For another example, in FIG. 19F, the fifth conductive segment 362 of the second conductive member 360 may be selectively connected with the stub pattern 1160 via the lumped element 951. In this case, the stub pattern 1160 may be connected with the switching circuit and thus may be extended towards one side of the second housing 320 (e.g., a direction of the sixth conductive segment 363) along a lower end of the second conductive member 360, and may be connected again at one point of the sixth conductive segment 363 abetting against the third non-conductive slit 366.

Figure 19G:
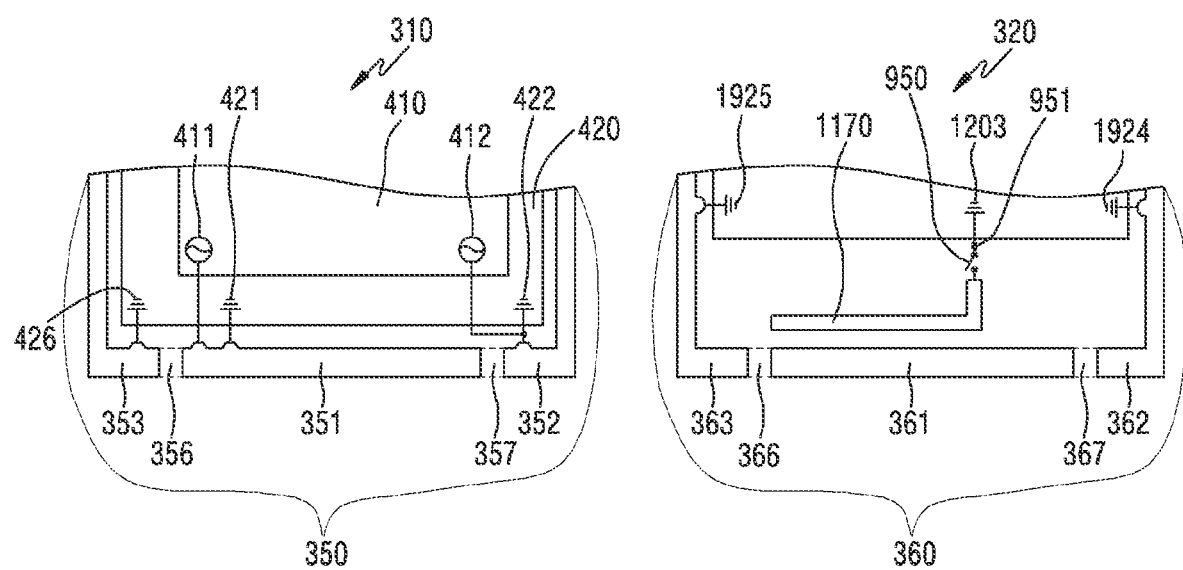
Figure 20A:
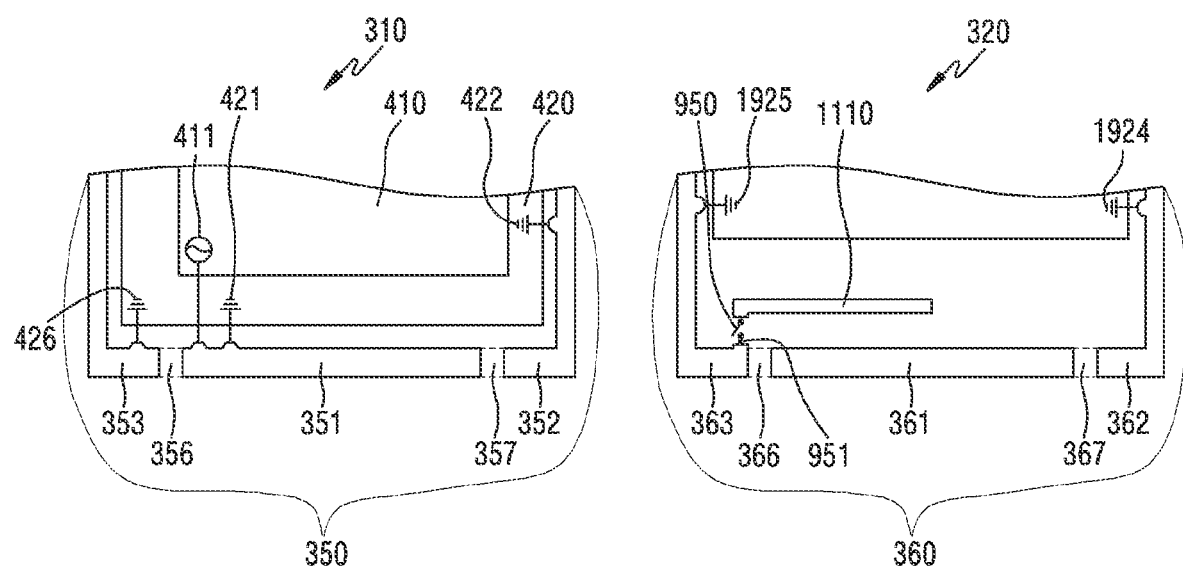
FIG. 20A to FIG. 20G illustrate an electronic device including an antenna having a single feeding portion including a stub pattern connected with a switching circuit according to an embodiment of the present disclosure.
Figure 20B:
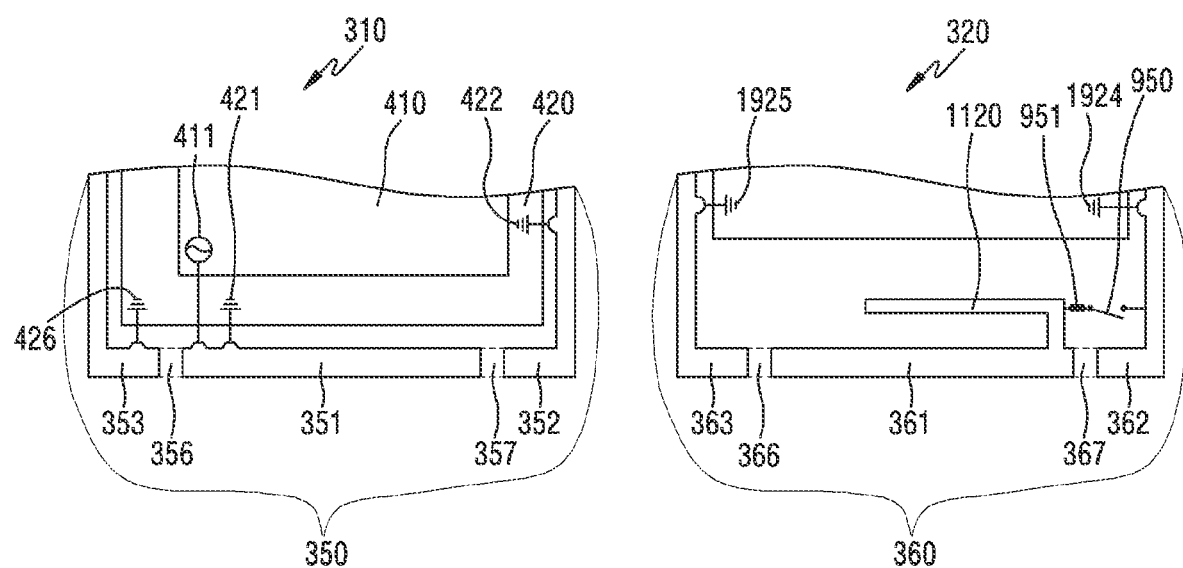
Figure 20C:
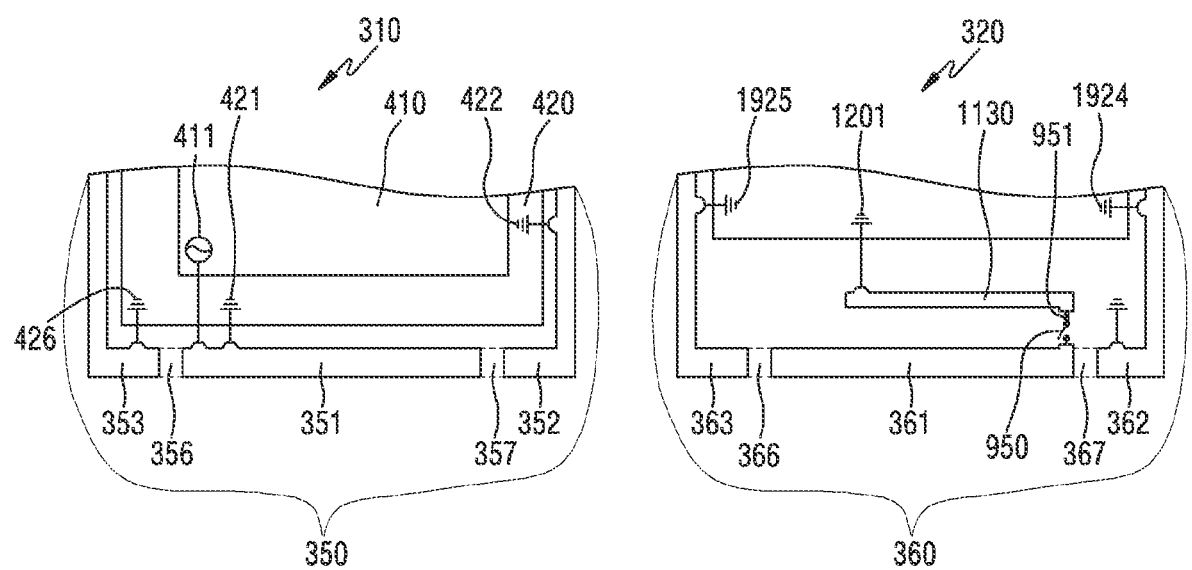
Figure 20D:
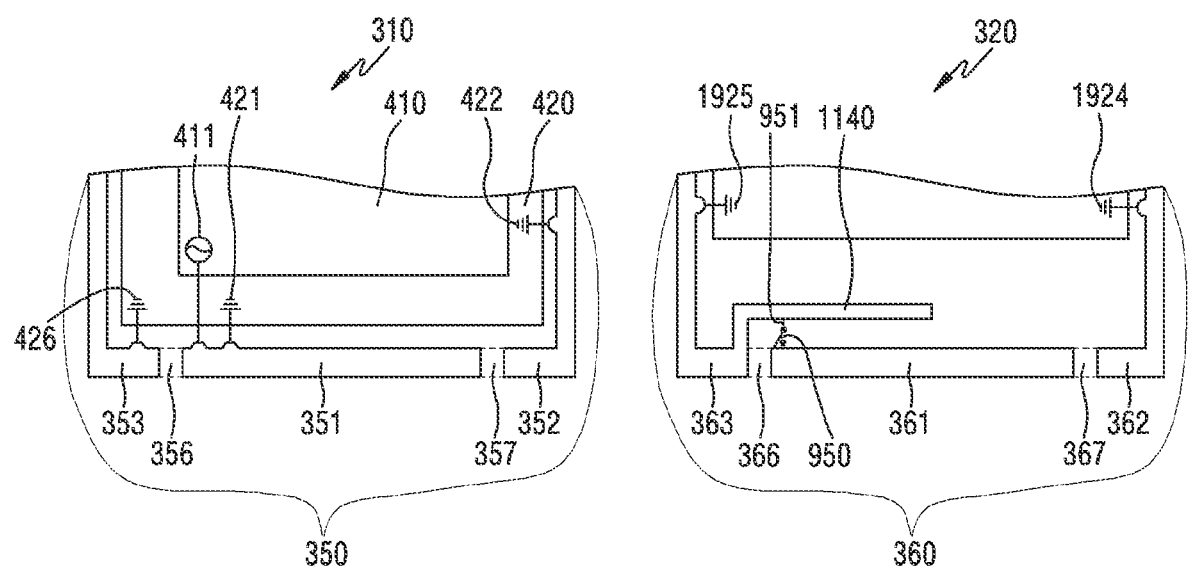
Figure 20E:
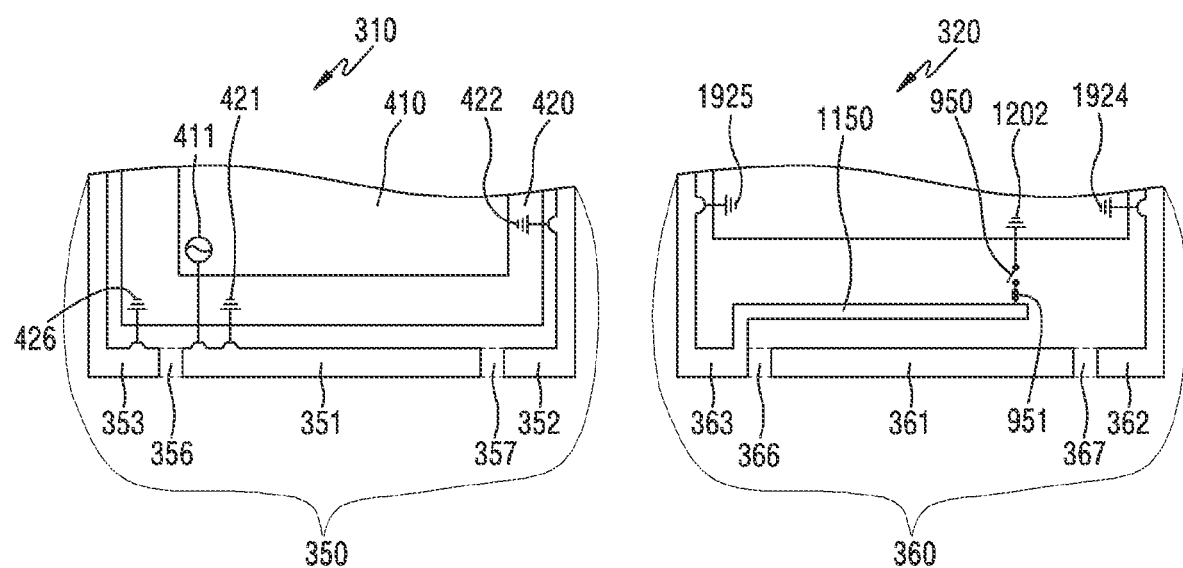
Figure 20F:
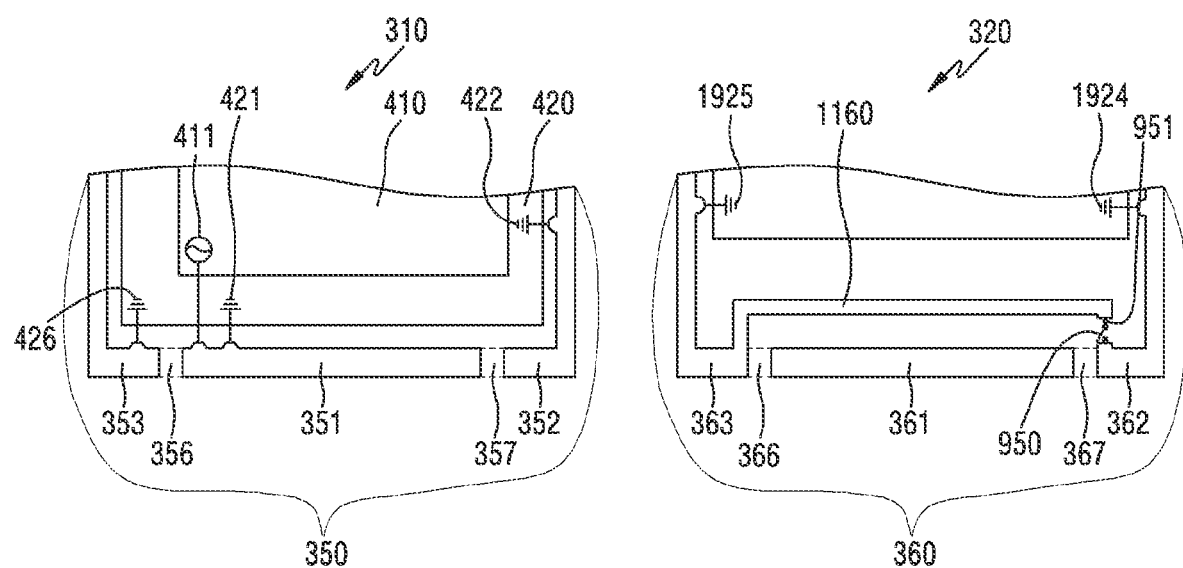
Figure 20G:
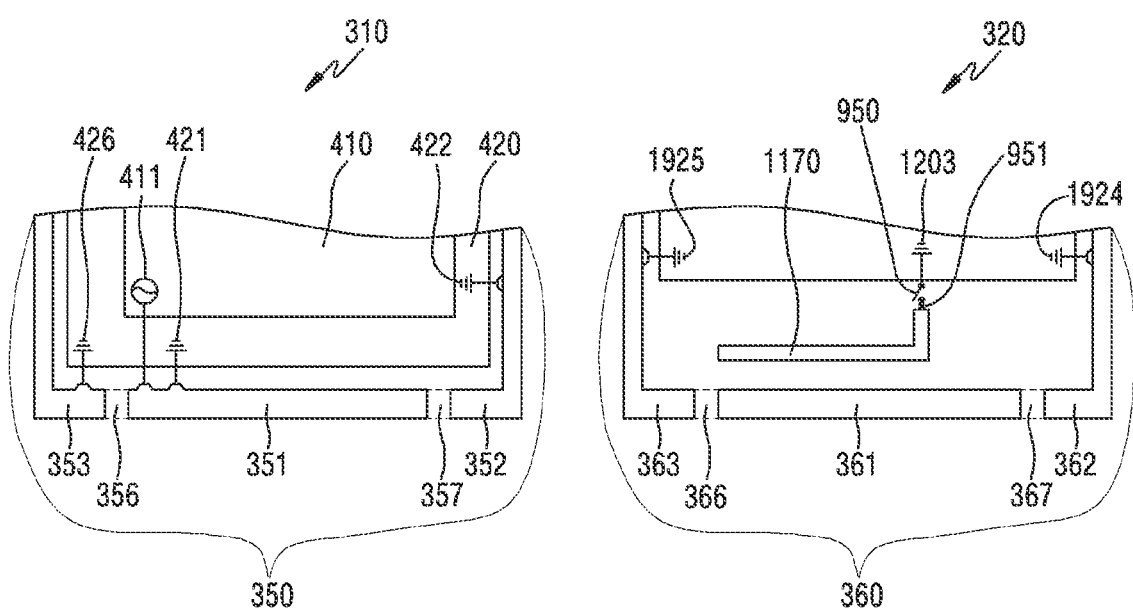

For another example, in FIG. 19G, the stub pattern 1170 may be spaced apart from the second conductive segment 360 and thus may be extended to be substantially parallel along a lower end of the second conductive member 360. In addition, the extended end of the stub pattern 1170 may be selectively connected with the ground member 1203 by the switching circuit 950 via the lumped element 951.

FIG. 20A to FIG. 20G illustrate an electronic device including an antenna having a single feeding portion including a stub pattern connected with a switching circuit according to an embodiment of the present disclosure.

In FIG. 20A to FIG. 20G, at least one of the plurality of conductive segments 351, 352, and 353 of the first conductive member 350 of the first housing 310 may be supplied with power from at least one feeding portion. For example, among the plurality of conductive segments 351, 352, and 353, the first conductive segment 351 may be supplied with power from the first feeding portion 411. According to an embodiment, the first feeding portion 411 may be electrically connected with one point of the first conductive segment 351 abutting against the first slit 356. Alternatively, at least one of the plurality of conductive segments 351, 352, and 353 of the first conductive member 350 of the first housing 310 may be electrically connected with at least one ground member.

According to various embodiments, since an electronic device including an antenna using the first conductive member 350 of FIG. 20A to FIG. 20G is at least similar or identical to an electronic device including an antenna using the first conductive member 350 of the first housing 310 of FIG. 7A to FIG. 7C, detailed descriptions thereof will be omitted.

In FIG. 20A to FIG. 20G, at least one of the plurality of conductive segments 361, 362, and 363 of the second conductive member 360 of the second housing 320 may be selectively connected with a stub pattern by a switching circuit.

According to various embodiments, since an example of preparing the stub pattern in the second housing 320 of FIG. 20A to FIG. 20G and locations of the lumped element and switching circuit are at least similar or identical to an example of preparing the stub pattern in the second housing 320 of FIG. 19A to FIG. 19G and locations of the lumped element and switching circuit, redundant descriptions will be omitted.

Figure 21A:
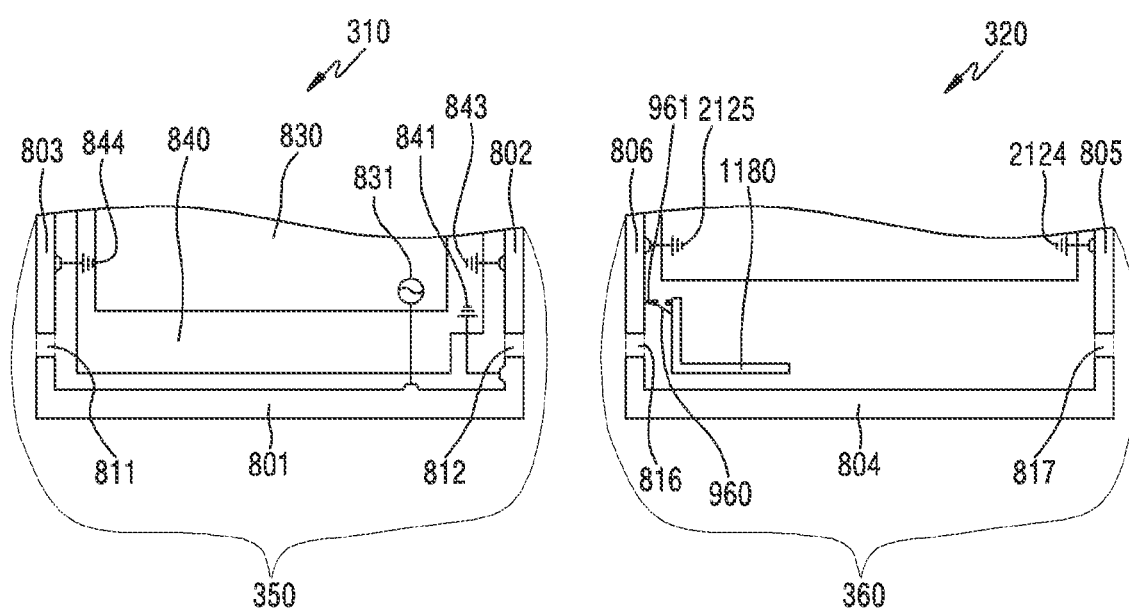
FIG. 21A and FIG. 21B illustrate an electronic device including an antenna having a single feeding portion including a stub pattern connected with a switching circuit according to another embodiment of the present disclosure.
Figure 21B:
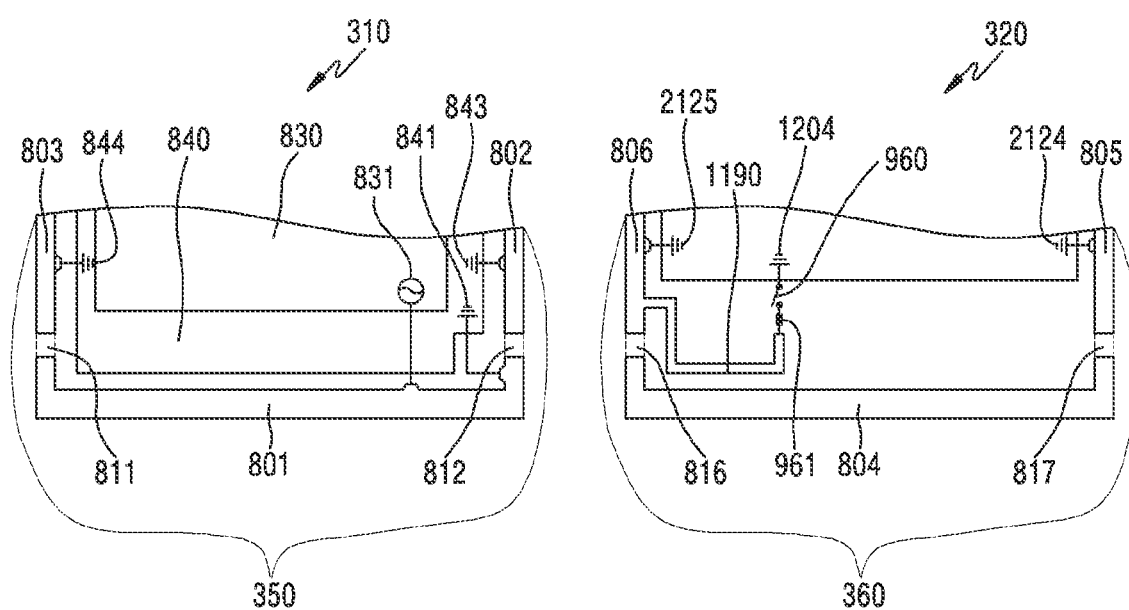

FIG. 21A and FIG. 21B illustrate an electronic device including an antenna having a single feeding portion including a stub pattern connected with a switching circuit according to another embodiment of the present disclosure.

Since the electronic device including the antenna of the first housing 310 of FIG. 21A and FIG. 21B is at least similar or identical to the aforementioned electronic device including the antenna of FIG. 8A to FIG. 8C, redundant descriptions will be omitted.

In FIG. 21A and FIG. 21B, at least part of the plurality of conductive segments 804, 805, and 806 of the second conductive member 360 of the second housing 320 may be electrically connected to the ground member. For example, the fifth conductive segment 805 of the second conductive member 360 may be electrically connected to a ground member 2124. Alternatively, the sixth conductive segment 806 of the second conductive member 360 may be electrically connected to a ground member 2125. Alternatively, the fourth conductive segment 804 of the second conductive member 360 may not be electrically connected to the ground member. For example, the fourth conductive segment 804 of the second conductive member 360 may be in an electrically floating state.

In FIG. 21A and FIG. 21B, at least one of the plurality of conductive segments 804, 805, and 806 of the second conductive member 360 of the second housing 320 may be electrically connected with the stub pattern by the switching circuit 960 connected to a lumped element 961.

For example, in FIG. 21A, the sixth conductive segment 806 of the second conductive member 360 may be electively connected with the stub pattern 1180 by the lumped circuit 961. In this case, the stub pattern 1180 may be connected to the switching circuit 960 and thus may be extended towards a lower end of the second housing 320, and may be extended again to be substantially parallel in a direction of the fifth conductive segment 805 along a lower end of the second conductive member 360.

In another example, in FIG. 21B, the stub pattern 1190 may be connected at one point of the sixth conductive segment 806 abutting against the third non-conductive slit 816 located at one side of the second housing 320, and thus may be extended again to be substantially parallel in a direction of the fifth conductive segment 362 along a lower end of the second conductive member 360, and may be extended again towards an upper end of the second housing 320. In addition, the extended end of the stub pattern 1190 may be selectively connected with the ground member 1204 by the switching circuit 960 via the lumped element 961.

Figure 22:
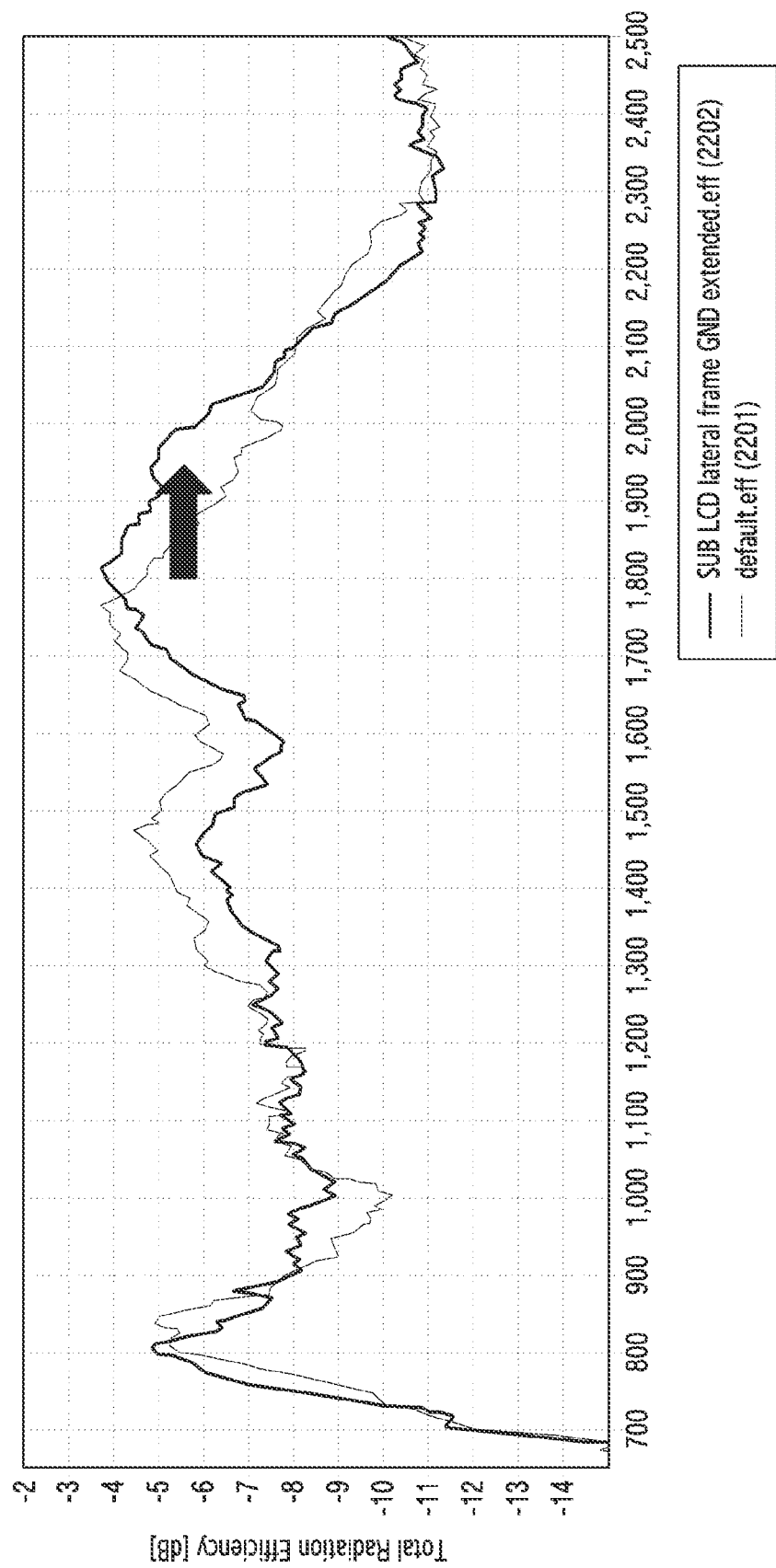
FIG. 22 is a graph illustrating a radiation efficiency of an electronic device including an antenna according to FIG. 13A to FIG. 21B described above.

FIG. 22 is a graph illustrating a radiation efficiency of an electronic device including an antenna according to FIG. 13A to FIG. 21B described above.

An x-axis of FIG. 22 represents a frequency band, and detailed descriptions thereof will be omitted since a characteristic of a frequency band of the x-axis is the same as the description of the x-axis of FIG. 12A.

In FIG. 22, a graph 2201 represents a radiation efficiency measured in the first conductive segment 351 included in the first conductive member 350 which operates as a radiator of a main antenna as shown in the embodiment of FIG. 4.

A graph 2202 represents a radiation efficiency measured in the first conductive segment 351 of the first conductive member 350 when at least one of the conductive segments 361, 362, and 363 of the second conductive member 360 is connected with the stub pattern as shown in the embodiment of FIG. 13A and FIG. 13B.

Referring to FIG. 22, when at least one of the conductive segments 361, 362, and 363 of the second conductive member 360 is connected with the stub pattern, it can be seen that a 10 resonance of a low band (about 800 MHz~900 MHz) is similar a resonance of before being connected to the stub pattern, but a parasitic resonance of a middle band (about 1600 MHz~1800 MHz) is shifted to a high band. As such, since an influence of a parasitic resonance of a middle band which is a commercial frequency band is decreased, a radiation efficiency of the electronic device including the antenna may be improved.

For example, when the first housing (e.g., the first housing 310 of FIG. 3A to FIG. 3C) and the second housing (e.g., the second housing 320 of FIG. 3A to FIG. 3C) are folded, there may be a decrease in a capacitance loading value increased depending on the abutting of the slit of the first housing and the slit of the second housing. Accordingly, the parasitic resonance which is excited under the influence of the coupling between the conductive segments is shifted to a high band, thereby improving the radiation efficiency of the electronic device including the antenna. In addition, the decrease of the capacitance loading and a frequency shift width of the parasitic resonance may vary depending on a length of the stub pattern and a progression direction thereof.

FIG. 23A to FIG. 23D illustrate an electronic device including an antenna according to various embodiments of the present disclosure.

Figure 23A:
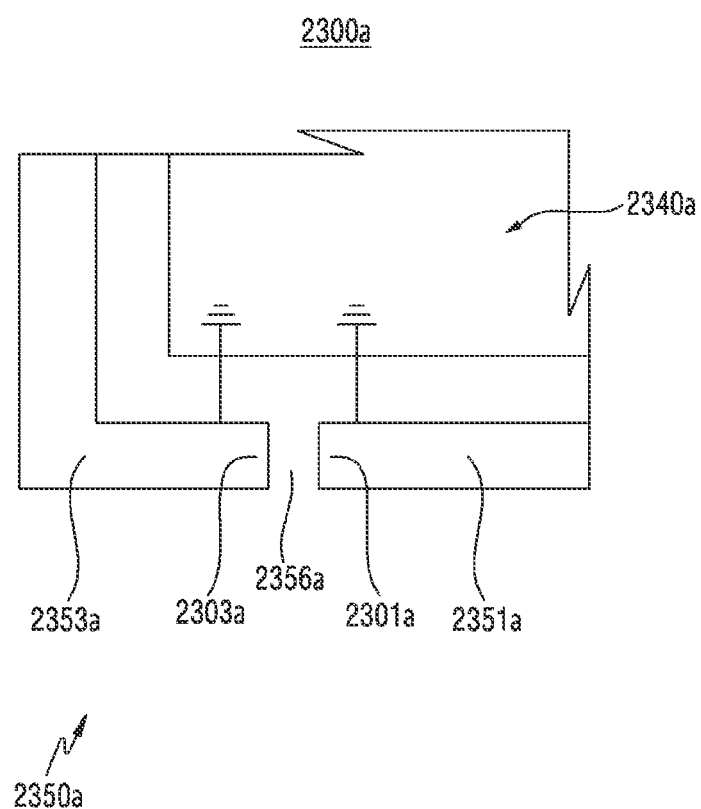
FIG. 23A to FIG. 23D illustrate an electronic device including an antenna according to various embodiments of the present disclosure.

Referring to FIG. 23A, in a plan view, the electronic device 2300a including an antenna may include a circuit board 2340a and a conductive member 2350a which surrounds at least part of the circuit board 2340a. According to an embodiment, the conductive member 2350a may include a first conductive segment 2351a and third conductive segment 2353a divided by a gap 2356a (or slit). The gap 2356a may be filled with a non-conductive material.

According to various embodiments, the first conductive segment 2351a may be at least similar or identical to the first conductive segment 351 of the first conductive member 350 of FIGS. 4, 5, 6A to 7C, 9A to 10C, 13A to 14D, 16A to 17G, or 19A to 20G. Alternatively, the third conductive segment 2353a may be at least similar or identical to the third conductive segment 353 of the first conductive member 350 of FIGS. 4, 5, 6A to 7C, 9A to 10C, 13A to 14D, 16A to 17G, or 19A to 20G.

According to various embodiments, although the electronic device (e.g., the electronic device 300 of FIG. 3A) may include a housing (e.g., the first housing 310) having a substantially rectangular shape, without being limited to the aforementioned shape, may have various shapes such as a round rectangular shape, an elliptical shape, or the like.

The electronic device 2300a including the antenna of FIG. 23A may be included in any one (e.g., a lower left corner) of four corners (e.g., an upper left corner, an upper right corner, a lower left corner, and a lower right corner in a plan view) of the housing 310.

According to an embodiment, at least one point of the conductive member 2350a may be electrically connected to a ground portion (not shown) disposed to at least some regions of the circuit board 2340a. For example, the ground portion of the circuit board 2340a may be electrically connected to one end 2303a of the third conducive segment 2353a or to a point located at the vicinity thereof. Alternatively, the ground portion of the circuit board 2340a may be electrically connected to one end 2301a of the first conductive segment 2351a or to a point located in the vicinity thereof.

According to various embodiments, although not shown, at least one point of the conductive member 2350a may be electrically connected to at least one feeding portion (not shown) of the circuit board 2340a. For example, the feeding portion of the circuit board 2340a may be electrically connected to one end 2301a of the first conductive segment 2351a or to a point located in the vicinity thereof. Alternatively, the point which is electrically connected to the feeding portion of the circuit board 2340a in the first conductive segment 2351a may be disposed between the slit 2356a and the point electrically connected to the ground portion of the circuit board 2340a.

Figure 23B:
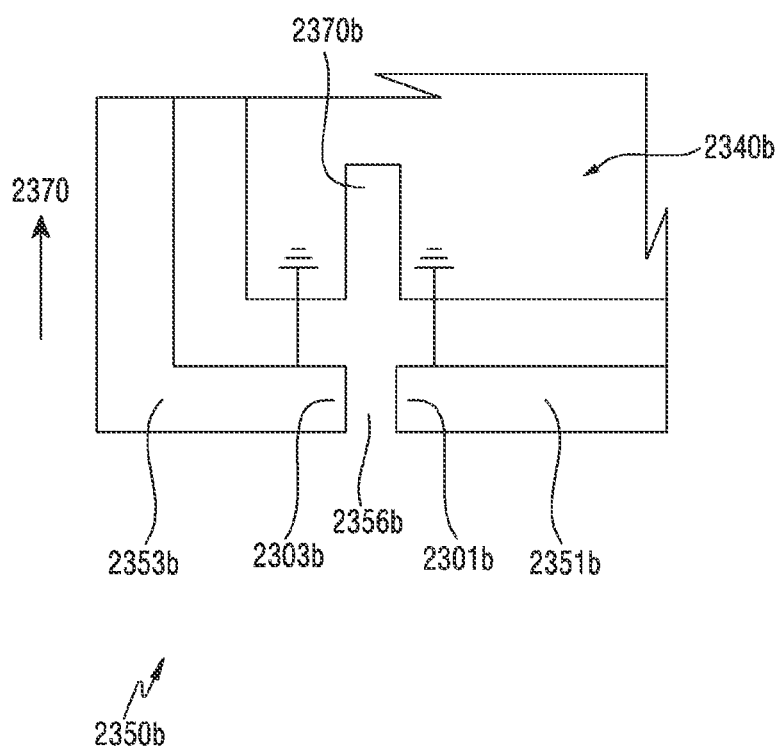

Referring to FIG. 23B, in a plan view, an electronic device 2300b including an antenna may include a circuit board 2340b and a conductive member 2350b which surrounds at least part of the circuit board 2340b. According to various embodiments, the conductive member 2350b may be at least similar or identical to the conductive member 2350a of FIG. 23A. Alternatively, according to various embodiments, the conductive member 2350b may be electrically connected to the feeding portion or ground portion of the circuit board 2340b as described above with reference to FIG. 23A.

According to an embodiment, the circuit board 2340b may include a slit 2370b disposed at a portion abutting against a slit 2356b of the conductive member 2350b. The slit 2370b is a portion not including a conductive material, and may improve a radiation performance of the electronic device 2300b including the antenna. For example, the slit 2370b of the circuit board 2340b may play a role of a frequency matching element of the electronic device 2300b including the antenna.

According to various embodiments, the slit 2370b of the circuit board 2340b may have various shapes suitable for frequency matching, and is not limited to the shape proposed in the drawing of the present specification. Alternatively, the slit 2370b of the circuit board 2340b may be disposed at a location suitable for frequency matching, and is not limited to the location proposed in the drawing of the present specification. Such a perspective may also be applied to various examples described below.

According to an embodiment, in a plan view, the slit 2370b of the circuit board 2340b may be recessed in a direction 2370 which intersects (e.g., orthogonal to) a direction in which a first conductive segment 2351b is extended.

According to various embodiments, the slit 2370b of the circuit board 2340b may be constructed in such a manner that part of a conductive material layer (e.g., a ground plane) is removed from the circuit board 2340b, or the conductive material layer is printed in a region except for the slit 2370b.

Figure 23C:
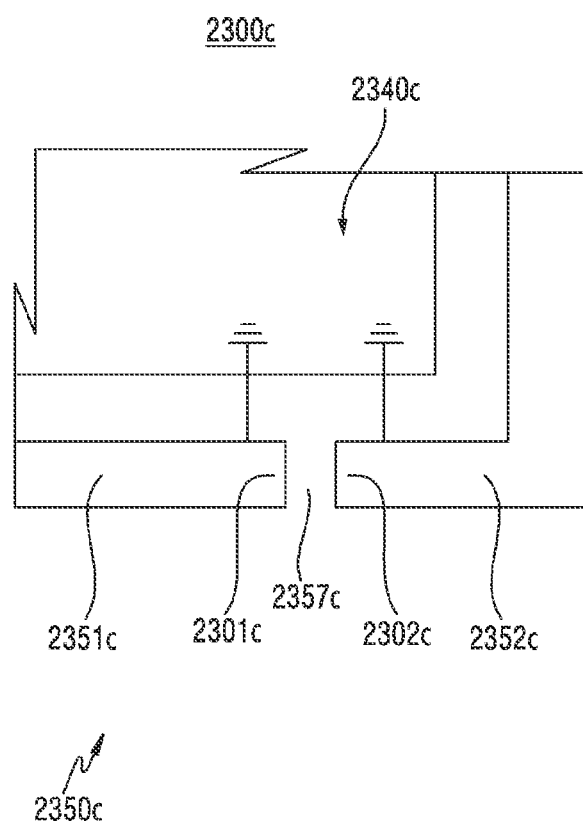

Referring to FIG. 23C, in a plan view, an electronic device 2300c including an antenna may include a circuit board 2340c and a conductive member 2350c which surrounds at least part of the circuit board 2340c. According to an embodiment, the conductive member 2350c may include a first conductive segment 2351c and third conductive segment 2353c divided by a gap 2357c (or slit). The gap 2357c may be filled with a non-conductive material.

According to various embodiments, the first conductive segment 2351c may be at least similar or identical to the first conductive segment 351 of the first conductive member 350 of FIGS. 4, 5, 6A to 7C, 9A to 10C, 13A to 14D, 16A to 17G, or 19A to 20G. Alternatively, the third conductive segment 2353c may be at least similar or identical to the third conductive segment 353 of the first conductive member 350 of FIGS. 4, 5, 6A to 7C, 9A to 10C, 13A to 14D, 16A to 17G, or 19A to 20G.

According to various embodiments, the electronic device (e.g., the electronic device 300 of FIG. 3A) may include a housing (e.g., the first housing 310) having a substantially rectangular shape. The electronic device 2300c including the antenna of FIG. 23C may be included in any one (e.g., a lower right corner) of four corners (e.g., an upper left corner, an upper right corner, a lower left corner, and a lower right corner in a plan view) of the housing 310.

According to an embodiment, at least one point of the conductive member 2350c may be electrically connected to a ground portion (not shown) of the circuit board 2340c. For example, the ground portion of the circuit board 2340c may be electrically connected to one end 2301c of the first conductive segment 2351c or to a point located at the vicinity thereof. Alternatively, the ground portion of the circuit board 2340c may be electrically connected to one end 2302c of a second conductive segment 2352c or to a point located in the vicinity thereof.

Figure 23D:
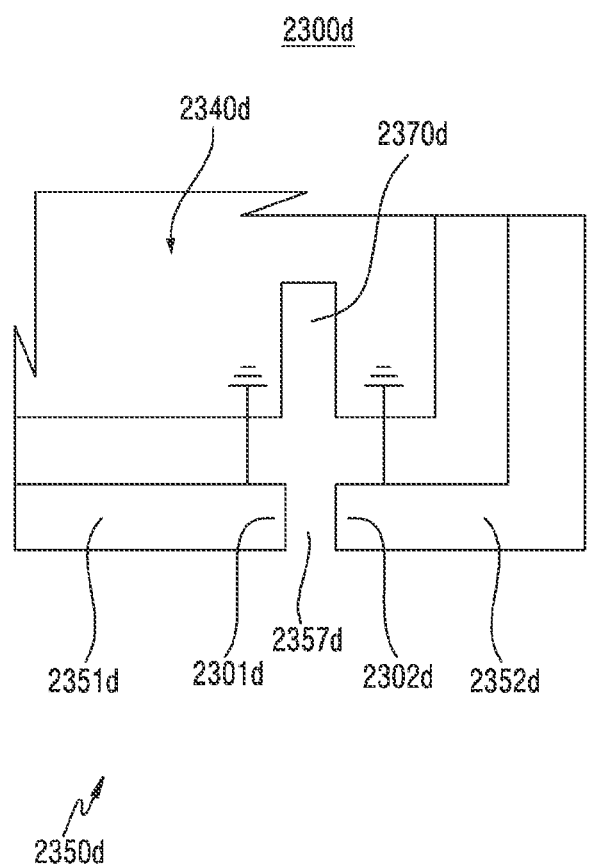

Referring to FIG. 23D, in a plan view, an electronic device 2300d including an antenna may include a circuit board 2340d and a conductive member 2350d which surrounds at least part of the circuit board 2340d. According to various embodiments, the conductive member 2350d may be at least similar or identical to the conductive member 2350c of FIG. 23C.

According to an embodiment, the circuit board 2340d may include a slit 2370d disposed at a portion abutting against a slit 2357d of the conductive member 2350d. The slit 2370d is a portion not including a conductive material, and may improve a radiation performance of the electronic device 2300b including an antenna. According to various embodiments, the slit 2370d may be at least similar or identical to the slit 2370b of FIG. 23B, and detailed descriptions thereof will be omitted.

FIG. 24A to FIG. 24D illustrate an electronic device including an antenna according to various embodiments of the present disclosure.

Figure 24A:
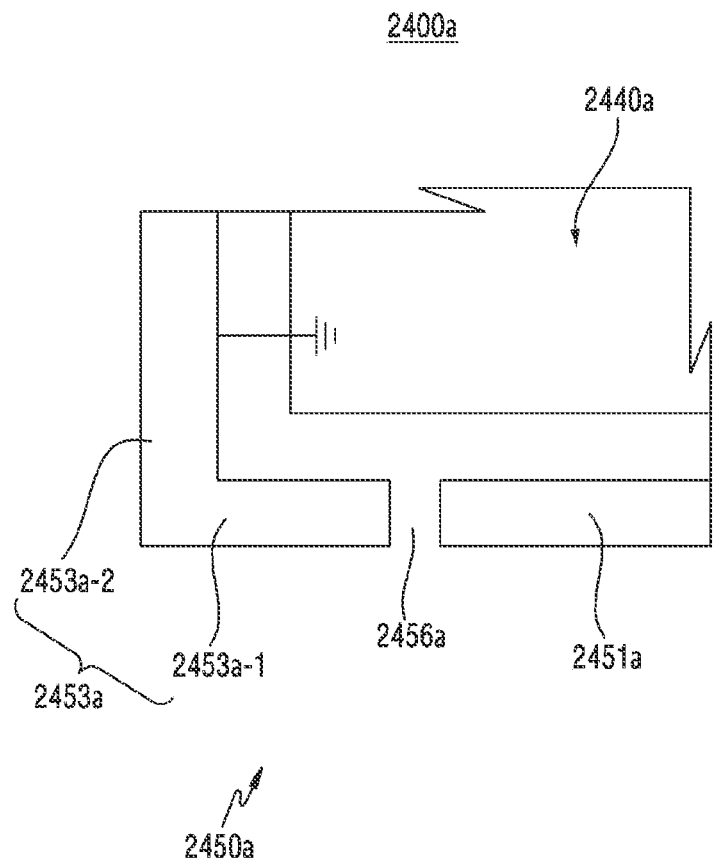
FIG. 24A to FIG. 24D illustrate an electronic device including an antenna according to various embodiments of the present disclosure.

Referring to FIG. 24A, in a plan view, an electronic device 2400a including an antenna may include a circuit board 2440a and a conductive member 2450a which surrounds at least part of the circuit board 2440a. The conductive member 2450a may include a first conductive segment 2451a and third conductive segment 2453a separated by a slit 2456a.

According to various embodiments, since the conductive member 2450a is at least similar or identical to the conductive member 2350a of FIG. 23A or the conductive member 2350b of FIG. 23B, redundant descriptions will be omitted.

According to various embodiments, the electronic device (e.g., the electronic device 300 of FIG. 3A) may include a housing (e.g., the first housing 310) having a substantially rectangular shape. The electronic device 2400a including the antenna of FIG. 24A may be included in any one (e.g., a lower left corner) of four corners e.g., an upper left corner, an upper right corner, a lower left corner, and a lower right corner in a plan view) of the housing 310.

According to an embodiment, at least one point of the conductive member 2450a may be electrically connected to a ground portion (not shown) of the circuit board 2440a. For example, the third conductive segment 2453a may include a substantially 'L' shape including a first extended portion 2325a-1 extended in a first direction from the slit 2456a and a second extended portion 2353a-2 extended in a second direction (e.g., a direction perpendicular to the first direction) from one end of the first extended portion 2353*a*-1. A ground portion of the circuit board 2440*a* may be electrically connected to a point on the second extended portion 2353*a*-2 of the third conductive segment 2453*a*.

According to various embodiments, although not shown, at least one point of the conductive member 2350*a* may be electrically connected to at least one feeding portion (not shown) of the circuit board 2440*a*. For example, the feeding portion of the circuit board 2440*a* may be electrically connected to one end 2401*a* of the first conductive segment 2451*a* or to a point located at the vicinity thereof.

Figure 24B:
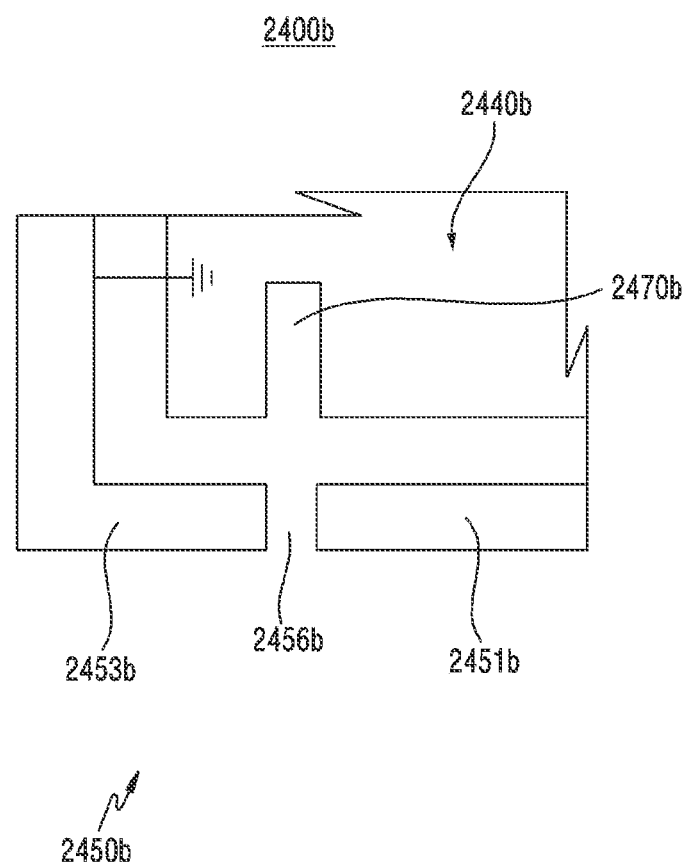

Referring to FIG. 24B, in a plan view, an electronic device 2400*b* including an antenna may include a circuit board 2440*b* and a conductive member 2450*b* which surrounds at least part of the circuit board 2440*b*. According to various embodiments, the conductive member 2450*b* may be at least similar or identical to the conductive member 2450*a* of FIG. 24A. Alternatively, according to various embodiments, the conductive member 2450*b* may be electrically connected to the feeding portion or ground portion of the circuit board 2440*b* as described above with reference to FIG. 24A.

According to an embodiment, the circuit board 2440*b* may include a slit 2470*b* disposed at a portion abutting against a slit 2456*b* of the conductive member 2450*b*. The slit 2470*b* is a portion not including a conductive material, and may improve a radiation performance of the electronic device 2400*b* including an antenna. According to various embodiments, the slit 2470*b* may be at least similar or identical to the slit 2370*b* of FIG. 23B, and detailed descriptions thereof will be omitted.

Figure 24C:
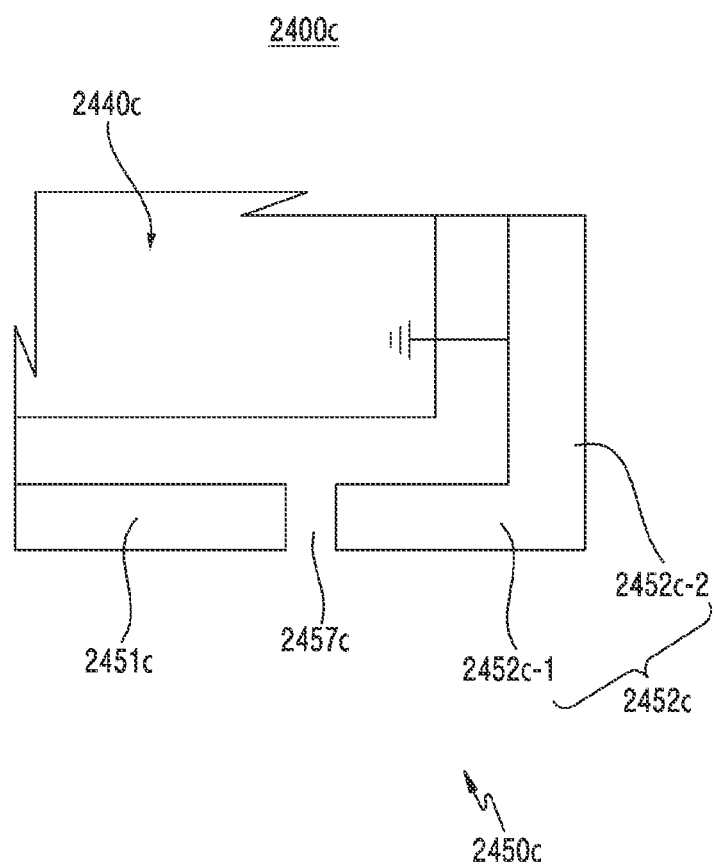

Referring to FIG. 24C, in a plan view, an electronic device 2400*c* including an antenna may include a circuit board 2440*c* and a conductive member 2450*c* which surrounds at least part of the circuit board 2440*c*. According to an embodiment, the conductive member 2450*c* may include a first conductive segment 2451*c* and second conductive segment 2452*c* divided by a gap 2457*c* (or slit).

According to various embodiments, since the conductive member 2450*c* is at least similar or identical to the conductive member 2350*c* of FIG. 23C or the conductive member 2350*d* of FIG. 23D, redundant descriptions will be omitted.

According to various embodiments, the electronic device (e.g., the electronic device 300 of FIG. 3A) may include a housing (e.g., the first housing 310) having a substantially rectangular shape. The electronic device 2400*c* including the antenna of FIG. 24C may be included in any one (e.g., a lower right corner) of four corners (e.g., an upper left corner, an upper right corner, a lower left corner, and a lower right corner in a plan view) of the housing 310.

According to an embodiment, at least one point of the conductive member 2450*c* may be electrically connected to a ground portion (not shown) of the circuit board 2440*c*. For example, the second conductive segment 2452*c* may include a substantially 'L' shape including a first extended portion 2452*c*-1 extended in a first direction from the slit 2457*c* and a second extended portion 2452*a*-2 extended in a second direction (e.g., a direction perpendicular to the first direction) from one end of the first extended portion 2452*c*-1. A ground portion of the circuit board 2440*c* may be electrically connected to a point on the second extended portion 2452*a*-2 of the second conductive segment 2452*c*.

Figure 24D:
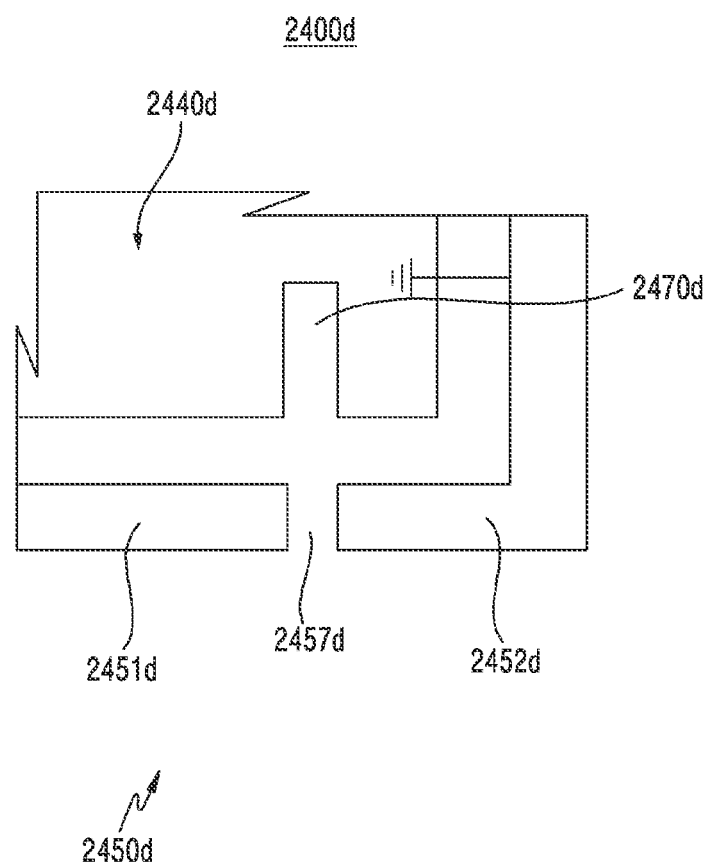

Referring to FIG. 24D, in a plan view, an electronic device 2400*d* including an antenna may include a circuit board 2440*d* and a conductive member 2450*d* which surrounds at least part of the circuit board 2440*d*. According to various embodiments, the conductive member 2450*d* may be at least similar or identical to the conductive member 2450*c* of FIG. 24C.

According to an embodiment, the circuit board 2440*d* may include a slit 2470*d* disposed at a portion abutting against a slit 2457*d* of the conductive member 2450*d*. The slit 2470*d* is a portion not including a conductive material, and may improve a radiation performance of the electronic device 2400*b* including the antenna. According to various embodiments, the slit 2470*d* may be at least similar or identical to the slit 2470*b* of FIG. 24B, and detailed descriptions thereof will be omitted.

FIG. 25A to FIG. 25H illustrate an electronic device including an antenna according to various embodiments of the present disclosure.

Figure 25A:
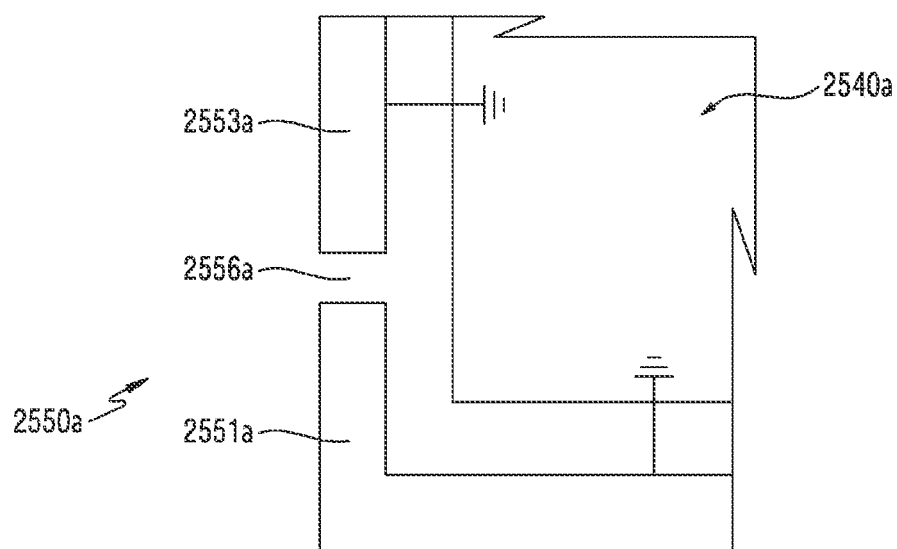
FIG. 25A to FIG. 25H illustrate an electronic device including an antenna according to various embodiments of the present disclosure.

Referring to FIG. 25A, in a plan view, an electronic device 2500*a* including an antenna may include a circuit board 2540*a* and a conductive member 2550*a* which surrounds at least part of the circuit board 2540*a*. According to an embodiment, the conductive member 2550*a* may include a first conductive segment 2551*a* and third conductive segment 2553*a* divided by a gap 2556*a* (or slit). The gap 2556*a* may be filled with a non-conductive material.

According to various embodiments, the first conductive segment 2551*a* may be at least similar or identical to the first conductive segment 801 of the first conductive member 350 of FIGS. 8A to 8C, FIGS. 11A to 11C, FIGS. 15A and 15B, FIGS. 18A and 18B, or FIGS. 21A and 21B. Alternatively, the third conductive segment 2553*a* may be at least similar or identical to the third conductive segment 803 of the first conductive member 350 of FIGS. 8A to 8C, FIGS. 11A to 11C, FIGS. 15A and 15B, FIGS. 18A and 18B, or FIGS. 21A and 21B.

According to an embodiment, at least one point of the conductive member 2550*a* may be electrically connected to a ground portion (not shown) of the circuit board 2540*a*. For example, the ground portion of the circuit board 2540*a* may be electrically connected to a point on the first conductive segment 2551*a*. Alternatively, the ground portion of the circuit board 2540*a* may be electrically connected to a point on the third conductive segment 2553*a*.

According to various embodiments, although not shown, at least one point of the conductive member 2550*a* may be electrically connected to at least one feeding portion (not shown) of the circuit board 2540*a*. For example, the feeding portion of the circuit board 2540*a* may be electrically connected to a point on the first conductive segment 2551*a*.

Figure 25B:
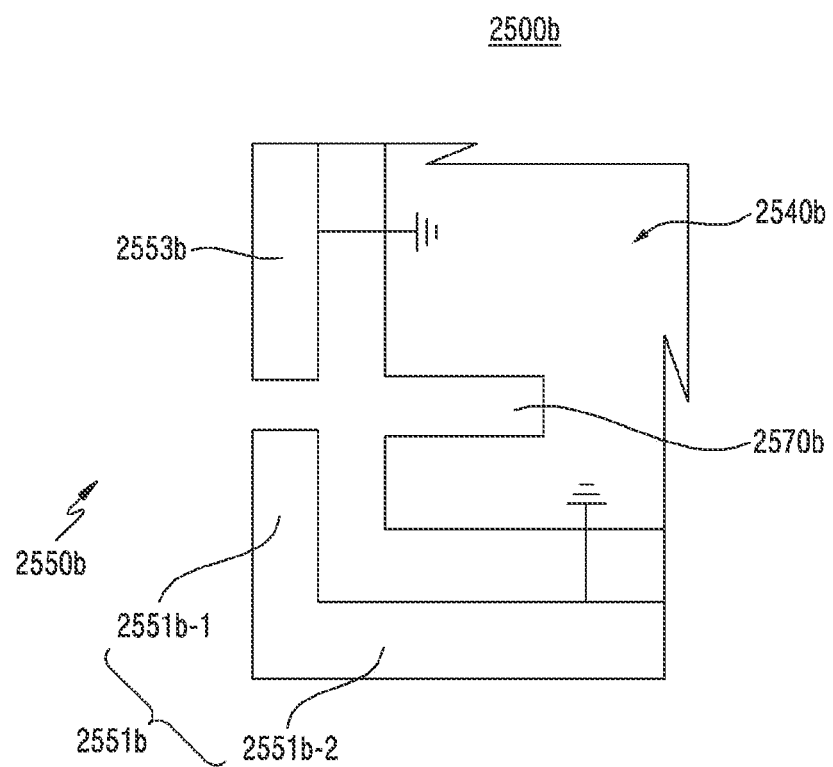

Referring to FIG. 25B, in a plan view, an electronic device 2500*b* including an antenna may include a circuit board 2540*b* and a conductive member 2550*b* which surrounds at least part of the circuit board 2540*b*. According to various embodiments, the conductive member 2550*b* may be at least similar or identical to the conductive member 2550*a* of FIG. 25A. Alternatively, according to various embodiments, the conductive member 2550*b* may be electrically connected to the feeding portion or ground portion of the circuit board 2540*b*, as described above with reference to FIG. 25A.

According to an embodiment, the circuit board 2540*b* may include a slit 2570*b* disposed at a portion abutting against a slit 2556*b* of a conductive member 2550*b*. The slit 2570*b* is a portion not including a conductive material, and may improve a radiation performance of the electronic device 2500*b* including the antenna.

According to various embodiments, the first conductive segment 2551*b* may include a substantially 'L' shape including a first extended portion 2551*b*-1 extended in a first direction from the slit 2556*b* and a second extended portion 2551b-2 extended in a second direction (e.g., a direction perpendicular to the first direction) from one end of the first extended portion 2551b-1. In a plan view, the slit 2570b of the circuit board 2540b may be recessed in a direction in which the second extended portion 255b-2 of the first conductive segment 2551b is substantially extended. According to various embodiments, the slit 2570b of the circuit board 2540b may be constructed in such a manner that part of a conductive material layer (e.g., a ground plane) is removed from the circuit board 2540b, or the conductive material layer is printed in a region except for the slit 2570b.

Figure 25C:
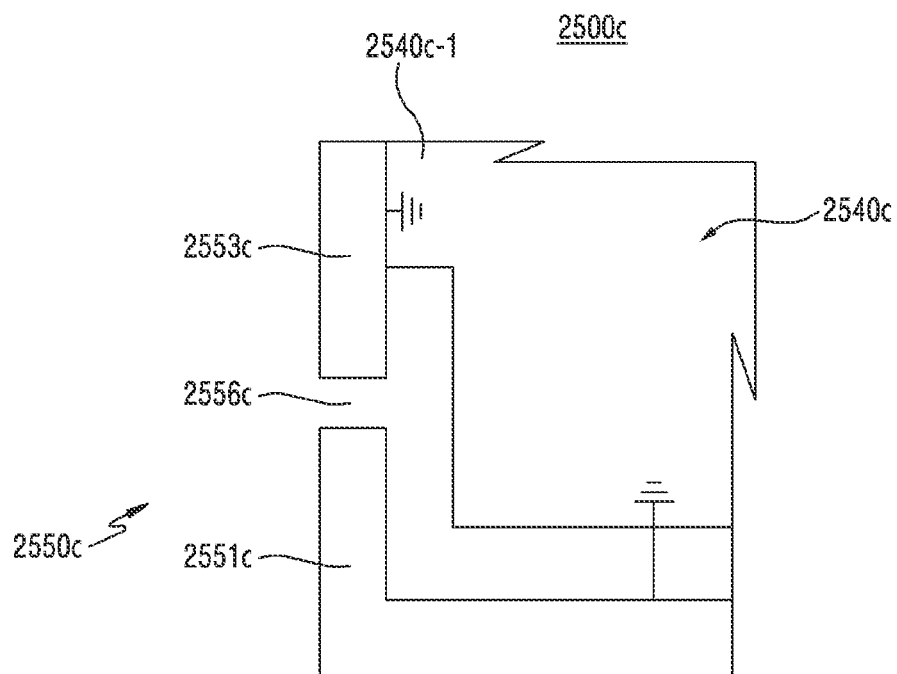

Referring to FIG. 25C, in a plan view, an electronic device 2500c including an antenna may include a circuit board 2540c and a conductive member 2550c which surrounds at least part of the circuit board 2540c. According to various embodiments, the conductive member 2550c may be at least similar or identical to the conductive member 2550a of FIG. 25A.

According to an embodiment, the conductive member 2550c may be electrically connected to a ground portion of the circuit board 2540c. For example, the ground portion of the circuit board 2540c may be electrically connected to a point on the first conductive segment 2551c of the conductive member 2550c.

According to various embodiments, the circuit board 2540c may include an extended portion 2540c-1 extended to abut against the conductive member 2550c. The extended portion 2540c-1 may be part of the ground portion, or may be a portion electrically connected to the ground portion. For example, the circuit board 2540c may include an extended portion 2540c-1 extended to abut against the third conductive member 2553c. The extended portion 2540c-1 may be physically in contact with the third conductive member 2553c. Alternatively, since the extended portion 2540c-1 abuts against the third conductive member 2553c, a connection may be easily established by using an electrical connecting means (e.g., a metallic bolt fastening or soldering) between the extended portion 2540c-1 and the third conductive member 2553c.

Figure 25D:
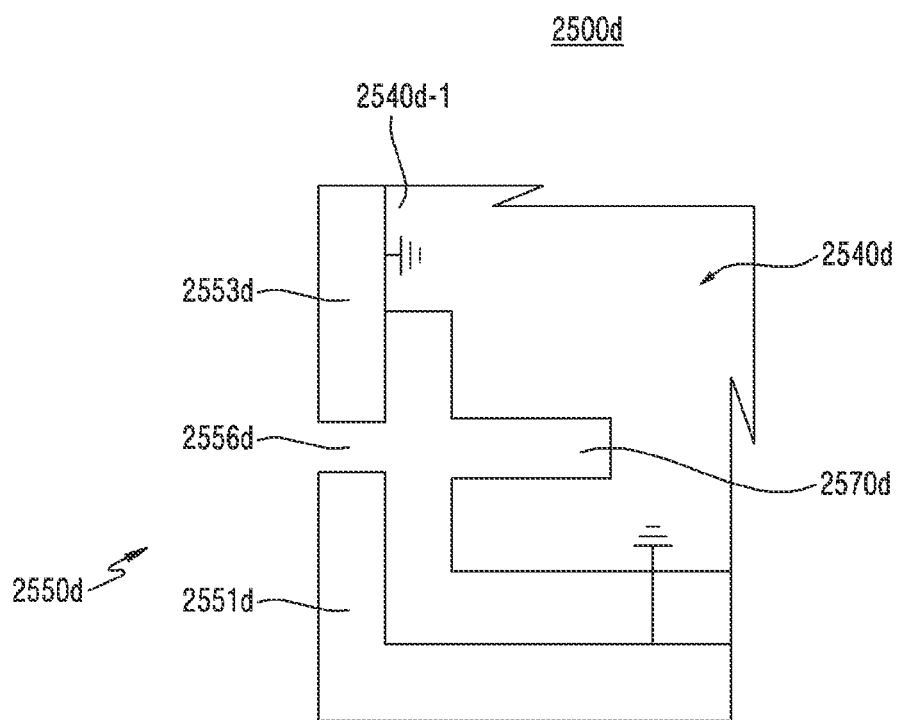

Referring to FIG. 25D, in a plan view, an electronic device 2500d including an antenna may include a circuit board 2540d and a conductive member 2550d which surrounds at least part of the circuit board 2540d. According to various embodiments, the conductive member 2550d may be at least similar or identical to the conductive member 2550c of FIG. 25C.

According to various embodiments, the circuit board 2540d may be at least similar or identical to the circuit board 2540c of FIG. 25C. An electrical connection between the circuit board 2540d and the conductive member 2550d may be at least similar or identical to the aforementioned electrical connection between the circuit board 2540c and the conductive member 2550c of FIG. 25C.

According to an embodiment, the circuit board 2540d may include a slit 2570d disposed at a portion abutting against a slit 2556d of a conductive member 2550d. The slit 2570d is a portion not including a conductive material, and may improve a radiation performance of the electronic device 2500d including an antenna. According to various embodiments, the slit 2570d may be at least similar or identical to the slit 2570b of FIG. 25B.

According to various embodiments, the electronic device (e.g., the electronic device 300 of FIG. 3A) may include a housing (e.g., the first housing 310) having a substantially rectangular shape. The electronic devices 2500a, 2500b, 2500c, or 2500d including the antennas of FIG. 25A to FIG. 25D may be included in any one (e.g., a lower right corner) of four corners (e.g., an upper left corner, an upper right corner, a lower left corner, and a lower right corner in a plan view) of the housing 310.

Figure 25E:
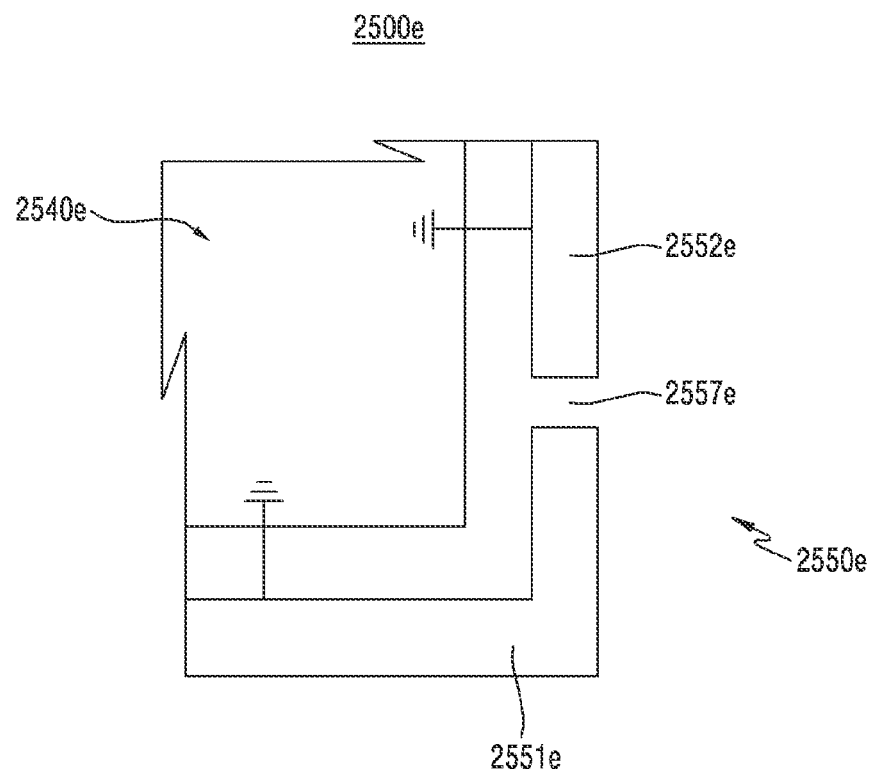

Referring to FIG. 25E, in a plan view, an electronic device 2500e including an antenna may include a circuit board 2540e and a conductive member 2550e which surrounds at least part of the circuit board 2540e. According to an embodiment, the conductive member 2550e may include a first conductive segment 2551c and third conductive segment 2553c divided by a gap 2557e (or slit). The gap 2557e may be filled with a non-conductive material.

According to various embodiments, the first conductive segment 2551e may be at least similar or identical to the first conductive segment 801 of the first conductive member 350 of FIGS. 8A to 8C, 11A to 11C, FIGS. 15A and 15B, FIGS. 18A and 18B, or FIGS. 21A and 21B. Alternatively, the second conductive segment 2552e may be at least similar or identical to the third conductive segment 803 of the first conductive member 350 of FIGS. 8A to 8C, FIGS. 11A to 11C, FIGS. 15A and 15B, FIGS. 18A and 18B, or FIGS. 21A and 21B.

According to an embodiment, at least one point of the conductive member 2550e may be electrically connected to a ground portion (not shown) of the circuit board 2540e. For example, the ground portion of the circuit board 2540e may be electrically connected to a point on the first conductive segment 2551e. Alternatively, the ground portion of the circuit board 2540e may be electrically connected to a point on the second conductive segment 2652e.

According to various embodiments, although not shown, at least one point of the conductive member 2550e may be electrically connected to at least one feeding portion (not shown) of the circuit board 2540e. For example, the feeding portion of the circuit board 2540e may be electrically connected to a point on the first conductive segment 2551a.

Figure 25F:
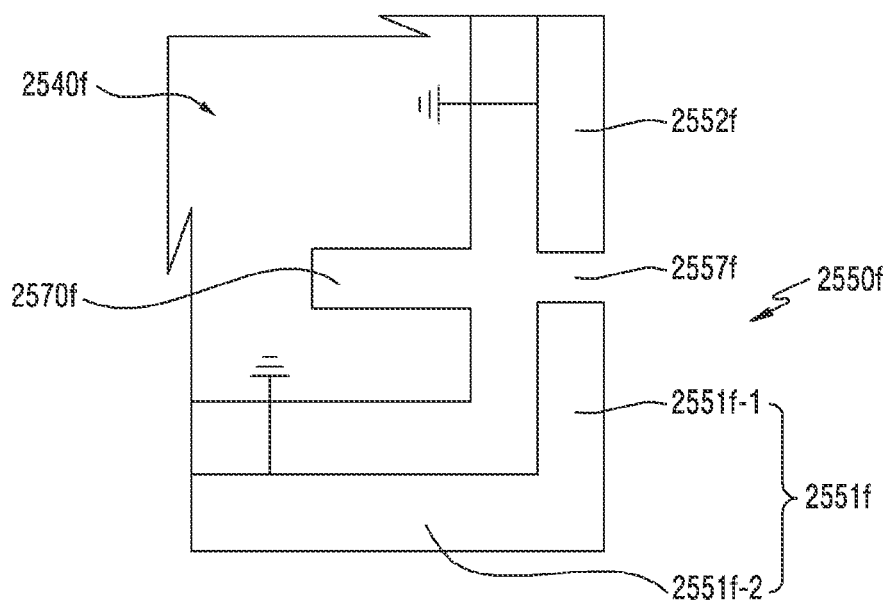

Referring to FIG. 25F, in a plan view, an electronic device 2500f including an antenna may include a circuit board 2540f and a conductive member 2550f which surrounds at least part of the circuit board 2540f. According to various embodiments, the conductive member 2550f may be at least similar or identical to the conductive member 2550e of FIG. 25E. Alternatively, according to various embodiments, the conductive member 2550e may be electrically connected to the feeding portion or ground portion of the circuit board 2540e as described above with reference to FIG. 25E.

According to an embodiment, the circuit board 2540f may include a slit 2570f disposed at a portion abutting against a slit 2557f of a conductive member 2550f. The slit 2570f is a portion not including a conductive material, and may improve a radiation performance of the electronic device 2500f including an antenna.

According to various embodiments, the first conductive segment 2551f may include a substantially 'L' shape including a first extended portion 2551f-1 extended in a first direction from the slit 2556b and a second extended portion 2551f-2 extended in a second direction (e.g., a direction perpendicular to the first direction) from one end of the first extended portion 2551f-1. In a plan view, the slit 2570b of the circuit board 2540b may be recessed in a direction in which the second extended portion 255b-2 of the first conductive segment 2551f is substantially extended. According to various embodiments, the slit 2570b of the circuit board 2540b may be constructed in such a manner that part of a conductive material layer (e.g., a ground plane) is removed from the circuit board 2540b, or the conductive material layer is printed in a region except for the slit 2570b.

Figure 25G:
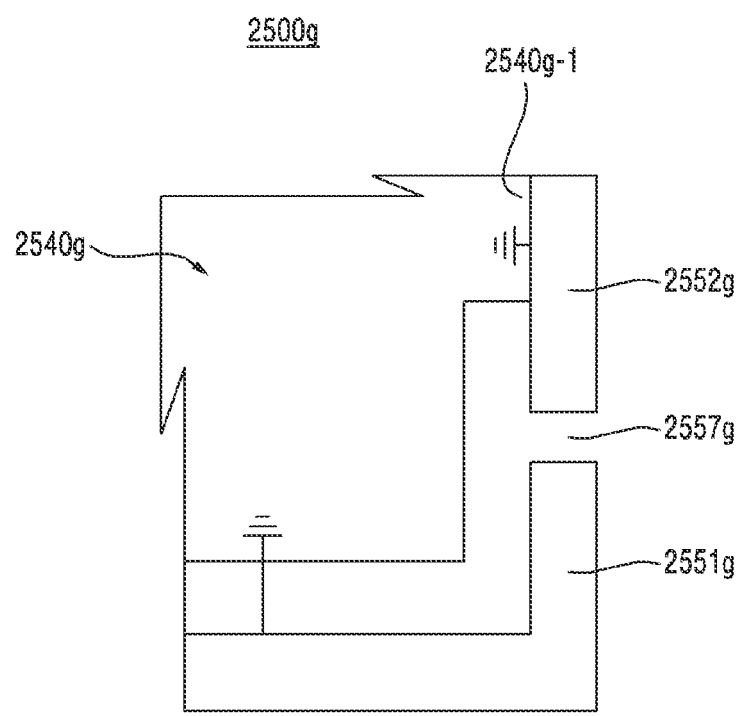

Referring to FIG. 25G, in a plan view, an electronic device 2500g including an antenna may include a circuit board 2540g and a conductive member 2550g which surrounds at least part of the circuit board 2540g. According to various embodiments, the conductive member 2550g may be at least similar or identical to the conductive member 2550e of FIG. 25E.

According to an embodiment, the conductive member 2550g may be electrically connected to a ground portion of the circuit board 2540g. For example, the ground portion of the circuit board 2540g may be electrically connected to a point on the first conductive segment 2551g of the conductive member 2550g.

According to various embodiments, the circuit board 2540g may include an extended portion 2540g-1 extended to abut against the conductive member 2550g. The extended portion 2540g-1 may be part of the ground portion, or may be a portion electrically connected to the ground portion. For example, the circuit board 2540g may include an extended portion 2540g-1 extended to abut against the second conductive member 2552g. The extended portion 2540g-1 may be physically in contact with the second conductive member 2552g. Alternatively, since the extended portion 2540g-1 abuts against the second conductive member 2552g, a connection may be easily established by using an electrical connecting means (e.g., a metallic bolt fastening or soldering) between the extended portion 2540g-1 and the second conductive member 2552g.

Figure 25H:
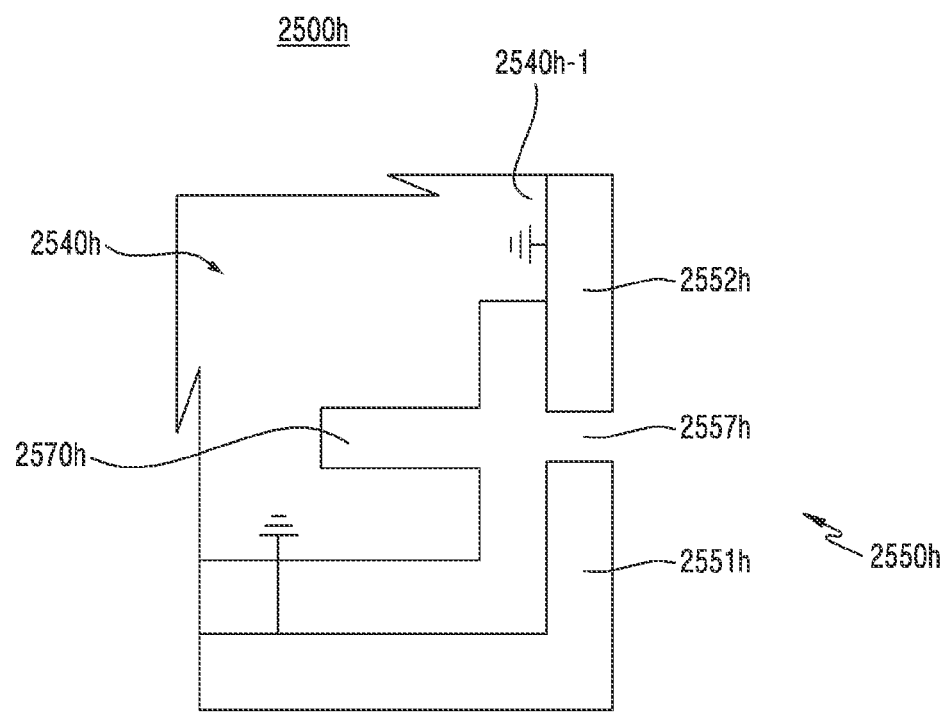

Referring to FIG. 25H, in a plan view, an electronic device 2500h including an antenna may include a circuit board 2540h and a conductive member 2550h which surrounds at least part of the circuit board 2540h. According to various embodiments, the conductive member 2550h may be at least similar or identical to the conductive member 2550g of FIG. 25G.

According to various embodiments, the circuit board 2540h may be at least similar or identical to the circuit board 2540g of FIG. 25G. An electrical connection between the circuit board 2540h and the conductive member 2550h may be at least similar or identical to the aforementioned electrical connection between the circuit board 2540g and the conductive member 2550g of FIG. 25G.

According to an embodiment, the circuit board 2540h may include a slit 2570h disposed at a portion abutting against a slit 2557h of the conductive member 2550h. The slit 2570h is a portion not including a conductive material, and may improve a radiation performance of the electronic device 2500h including an antenna. According to various embodiments, the slit 2570h may be at least similar or identical to the slit 2570f of FIG. 25F.

According to various embodiments, the electronic device (e.g., the electronic device 300 of FIG. 3A) may include a housing (e.g., the first housing 310) having a substantially rectangular shape. The electronic devices 2500e, 2500f, 2500g, or 2500h including the antennas of FIG. 25E to FIG. 25H may be included in any one (e.g., a lower right corner) of four corners (e.g., an upper left corner, an upper right corner, a lower left corner, and a lower right corner in a plan view) of the housing 310.

FIG. 26A to FIG. 26H illustrate an electronic device including an antenna according to various embodiments of the present disclosure.

Figure 26A:
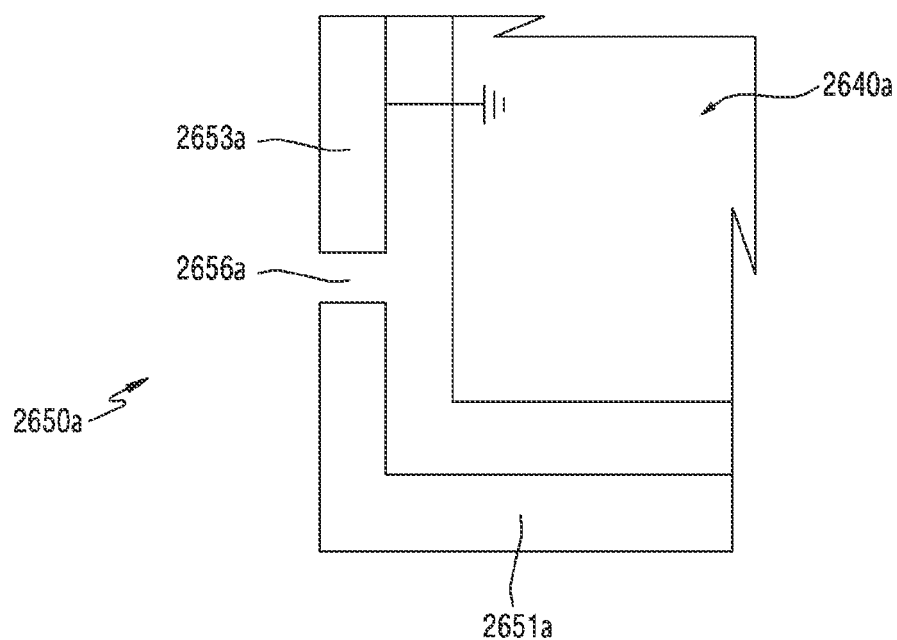
FIG. 26A to FIG. 26H illustrate an electronic device including an antenna according to various embodiments of the present disclosure.

Referring to FIG. 26A, in a plan view, an electronic device 2600a including an antenna may include a circuit board 2640a and a conductive member 2650a which surrounds at least part of the circuit board 2640a. According to an embodiment, the conductive member 2650a may include a first conductive segment 2651a and third conductive segment 2653a divided by a gap 2656a (or slit). The gap 2656a may be filled with a non-conductive material.

According to various embodiments, the first conductive segment 2651.a may be at least similar or identical to the first conductive segment 801 of the first conductive member 350 of FIGS. 8A to 8C, FIGS. 11A to 11C, FIGS. 15A and 15B, FIGS. 18A and 18B, or FIGS. 21A and 21B. Alternatively, the third conductive segment 2653a may be at least similar or identical to the third conductive segment 803 of the first conductive member 350 of FIGS. 8A to 8C, FIGS. 11A to 11C, FIGS. 15A and 15B, FIGS. 18A and 18B, or FIGS. 21A and 21B.

According to an embodiment, at least one point of the conductive member 2650a may be electrically connected to a ground portion (not shown) of the circuit board 2540a. For example, the ground portion of the circuit board 2640a may be electrically connected to a point on the third conductive segment 2653a.

According to various embodiments, although not shown, at least one point of the conductive member 2650a may be electrically connected to at least one feeding portion (not shown) of the circuit board 2640a. For example, the feeding portion of the circuit board 2640a may be electrically connected to a point on the first conductive segment 2651a.

Figure 26B:
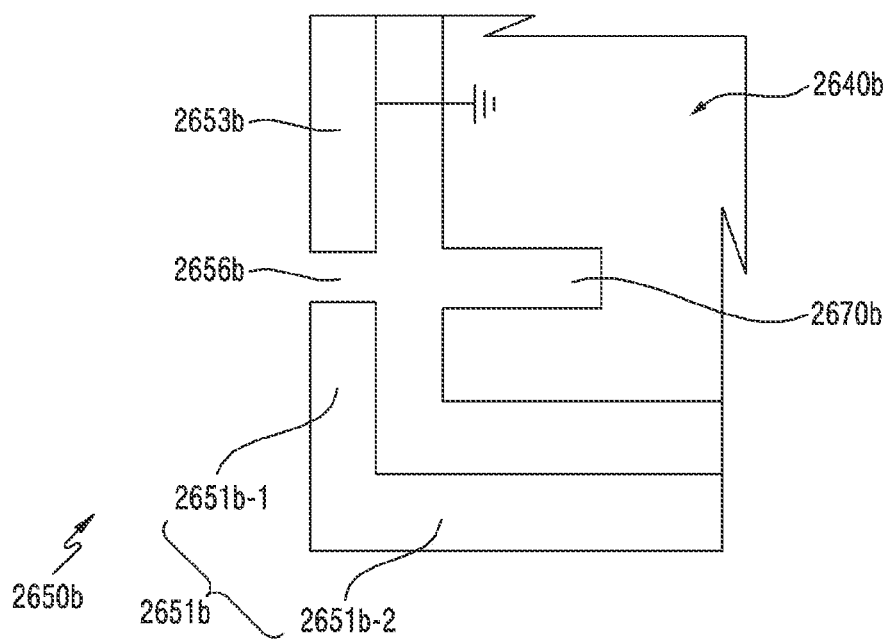

Referring to FIG. 26B, in a plan view, an electronic device 2600b including an antenna may include a circuit board 2640b and a conductive member 2650b which surrounds at least part of the circuit board 2640b. According to various embodiments, the conductive member 2650b may be at least similar or identical to the conductive member 2650a of FIG. 26A. Alternatively, according to various embodiments, the conductive member 2650b may be electrically connected to the feeding portion or ground portion of the circuit board 2640b as described above with reference to FIG. 26A.

According to an embodiment, the circuit board 2640b may include a slit 2670b disposed at a portion abutting against a slit 2657d of the conductive member 2650b. The slit 2670b is a portion not including a conductive material, and may improve a radiation performance of the electronic device 2600b including an antenna.

According to various embodiments, the first conductive segment 2651b may include a substantially 'L' shape including a first extended portion 2651b-1 extended in a first direction from the slit 2656b and a second extended portion 2651b-2 extended in a second direction (e.g., a direction perpendicular to the first direction) from one end of the first extended portion 2651b-1. In a plan view, the slit 2670b of the circuit board 2640b may be recessed in a direction in which the second extended portion 265b-2 of the first conductive segment 2651b is substantially extended. According to various embodiments, the slit 2670b of the circuit board 2640b may be constructed in such a manner that part of a conductive material layer (e.g., a ground plane) is removed from the circuit board 2640b, or the conductive material layer is printed in a region except for the slit 2670b.

Figure 26C:
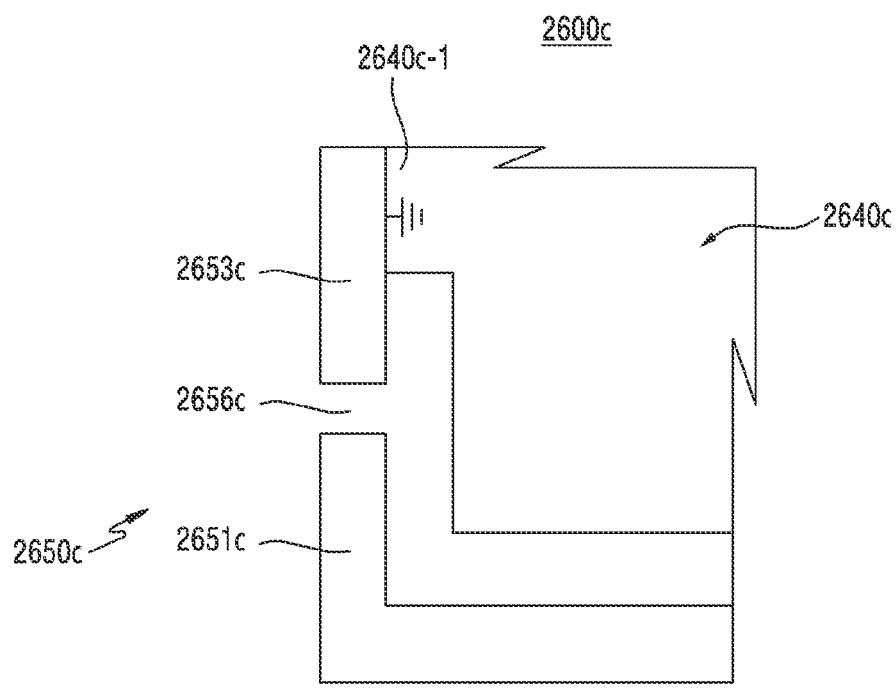

Referring to FIG. 26C, in a plan view, an electronic device 2600c including an antenna may include a circuit board 2640c and a conductive member 2650c which surrounds at least part of the circuit board 2640c. According to various embodiments, the conductive member 2650c may be at least similar or identical to the conductive member 2650a of FIG. 26A.

According to an embodiment, the conductive member 2650c may be electrically connected to a ground portion of the circuit board 2640c. For example, the ground portion of the circuit board 2640c may be electrically connected to a point on the third conductive segment 2653c of the conductive member 2650c.

According to various embodiments, the circuit board 2640c may include an extended portion 2640c-1 extended to abut against the conductive member 2650c. The extended portion 2640c-1 may be part of the ground portion, or may be a portion electrically connected to the ground portion. For example, the circuit board 2640c may include an extended portion 2640c-1 extended to abut against the third conductive member 2653c. The extended portion 2640c-1 may be physically in contact with the third conductive member 2653c. Alternatively, since the extended portion 2640c-1 abuts against the third conductive member 2653c, a connection may be easily established by using an electrical connecting means (e.g., a metallic bolt fastening or soldering) between the extended portion 2640c-1 and the third conductive member 2653c.

Figure 26D:
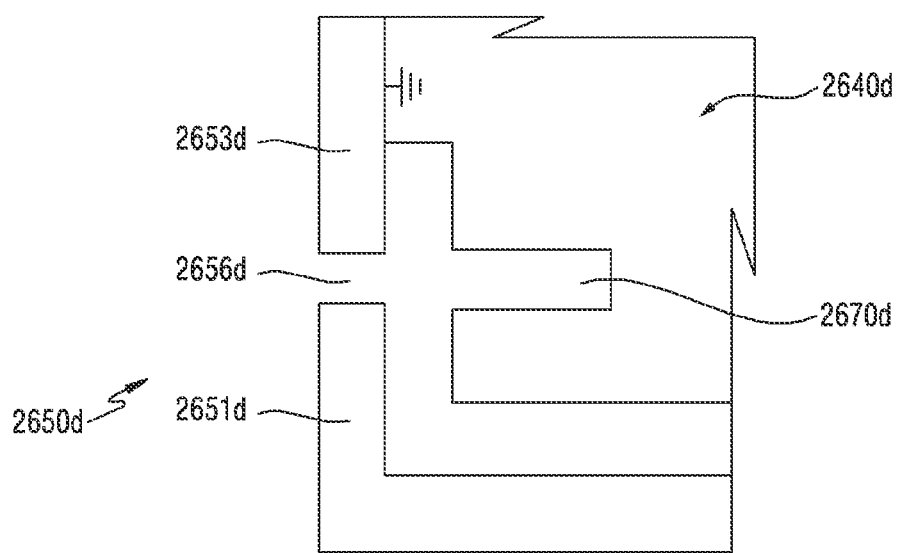

Referring to FIG. 26D, in a plan view, an electronic device 2600d including an antenna may include a circuit board 2640d and a conductive member 2650d which surrounds at least part of the circuit board 2640d. According to various embodiments, the conductive member 2650d may be at least similar or identical to the conductive member 2650c of FIG. 26C.

According to various embodiments, the circuit board 2640d may be at least similar or identical to the circuit board 2640c of FIG. 26C. An electrical connection between the circuit board 2640d and the conductive member 2650d may be at least similar or identical to the aforementioned electrical connection between the circuit board 2640c and the conductive member 2650c of FIG. 26C.

According to an embodiment, the circuit board 2640d may include a slit 2670d disposed at a portion abutting against a slit 2656d of a conductive member 2650d. The slit 2670d is a portion not including a conductive material, and may improve a radiation performance of the electronic device 2600d including an antenna. According to various embodiments, the slit 2670d may be at least similar or identical to the slit 2670b of FIG. 26B.

According to various embodiments, the electronic device (e.g., the electronic device 300 of FIG. 3A) may include a housing (e.g., the first housing 310) having a substantially rectangular shape. The electronic devices 2600a, 2600b, 2600c, or 2600d including the antennas of FIG. 26A to FIG. 26D may be included in any one (e.g., a lower right corner) of four corners (e.g., an upper left corner, an upper right corner, a lower left corner, and a lower right corner in a plan view) of the housing 310.

Figure 26E:
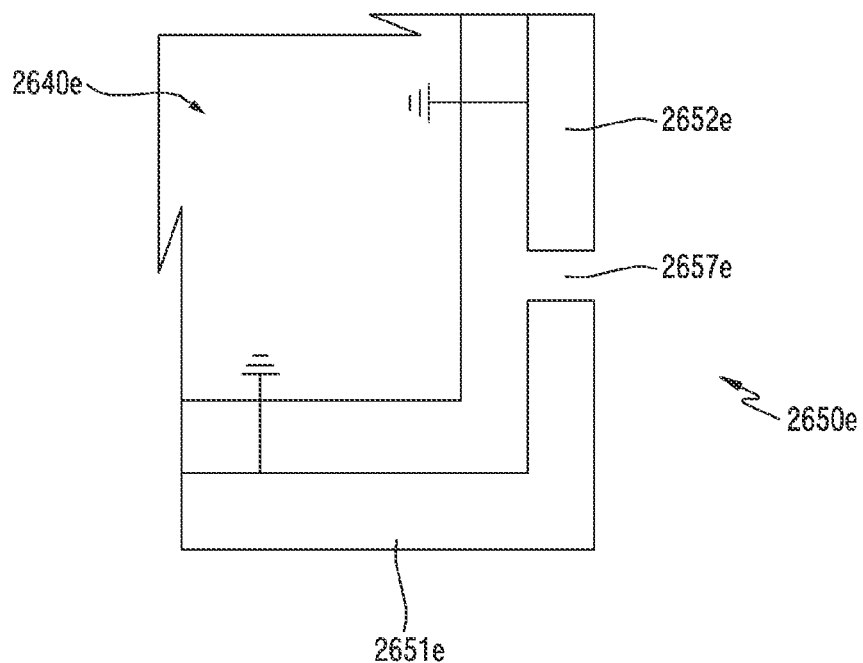

Referring to FIG. 26E, in a plan view, an electronic device 2600e including an antenna may include a circuit board 2640e and a conductive member 2650e which surrounds at least part of the circuit board 2640e. According to an embodiment, the conductive member 2650e may include a first conductive segment 2651c and third conductive segment 2653c divided by a gap 2657e (or slit). The gap 2657e may be filled with a non-conductive material.

According to various embodiments, the first conductive segment 2651e may be at least similar or identical to the first conductive segment 801 of the first conductive member 350 of FIGS. 8A to 8C, FIGS. 11E to 11C, FIGS. 15A and 15B, FIGS. 18A and 18B, or FIGS. 21E and 21B. Alternatively, the second conductive segment 2652e may be at least similar or identical to the second conductive segment 802 of the first conductive member 350 of FIGS. 8A to 8C, FIGS. 11E to 11C, FIGS. 15A and 15B, FIGS. 18A and 18B, or FIGS. 21E and 21B.

According to an embodiment, at least one point of the conductive member 2650e may be electrically connected to a ground portion (not shown) of the circuit board 2640e. For example, the ground portion of the circuit board 2640e may be electrically connected to a point on the second conductive segment 2552e.

According to various embodiments, although not shown, at least one point of the conductive member 2650e may be electrically connected to at least one feeding portion (not shown) of the circuit board 2640e. For example, the feeding portion of the circuit board 2640e may be electrically connected to a point on the first conductive segment 2651e.

Figure 26F:
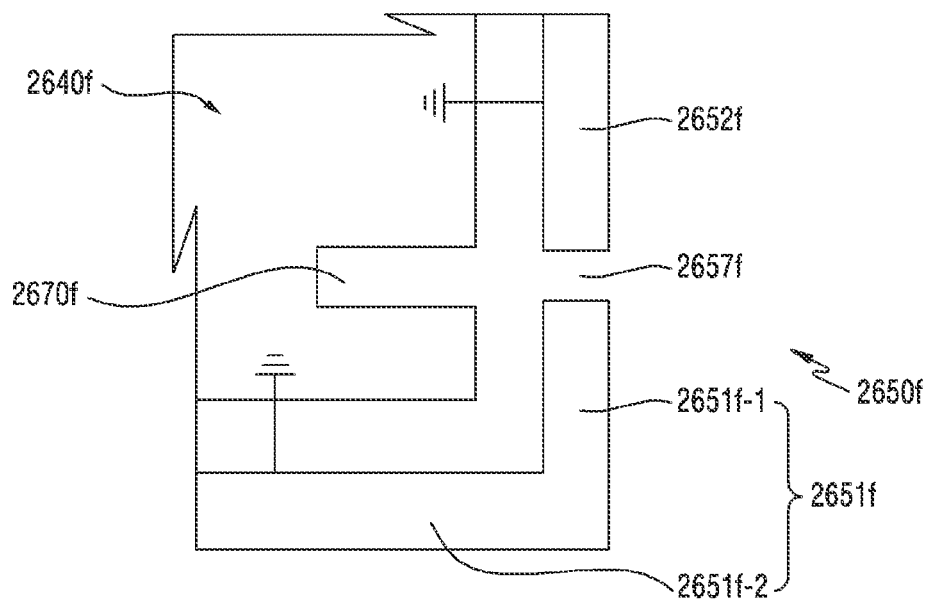

Referring to FIG. 26F, in a plan view, an electronic device 2600f including an antenna may include a circuit board 2640f and a conductive member 2650f which surrounds at least part of the circuit board 2640f. According to various embodiments, the conductive member 2650f may be at least similar or identical to the conductive member 2650e of FIG. 26E. Alternatively, according to various embodiments, the conductive member 2650e may be electrically connected to the feeding portion or ground portion of the circuit board 2640e as described above with reference to FIG. 26E.

According to an embodiment, the circuit board 2640f may include a slit 2670f disposed at a portion abutting against a slit 2656d of a conductive member 2650f. The slit 2670f is a portion not including a conductive material, and may improve a radiation performance of the electronic device 2600f including an antenna.

According to various embodiments, the first conductive segment 2651f may include a substantially 'L' shape including a first extended portion 2651f-1 extended in a first direction from the slit 2656b and a second extended portion 2651f-2 extended in a second direction (e.g., a direction perpendicular to the first direction) from one end of the first extended portion 2651f-1. In a plan view, the slit 2670b of the circuit board 2640b may be recessed in a direction in which the second extended portion 265b-2 of the first conductive segment 2651f is substantially extended. According to various embodiments, the slit 2670b of the circuit board 2640b may be constructed in such a manner that part of a conductive material layer (e.g., a ground plane) is removed from the circuit board 2640b, or the conductive material layer is printed in a region except for the slit 2670b.

Figure 26G:
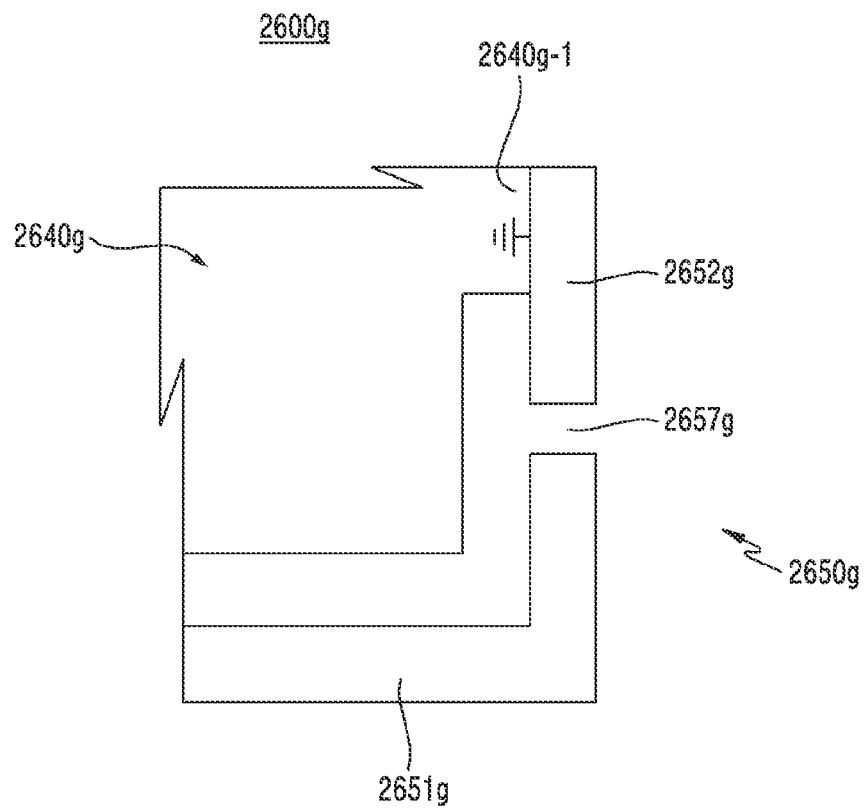

Referring to FIG. 26G, in a plan view, an electronic device 2600g including an antenna may include a circuit board 2640g and a conductive member 2650g which surrounds at least part of the circuit board 2640g. According to various embodiments, the conductive member 2650g may be at least similar or identical to the conductive member 2650e of FIG. 26E.

According to an embodiment, the conductive member 2650g may be electrically connected to a ground portion of the circuit board 2640g. For example, the ground portion of the circuit board 2640g may be electrically connected to a point on the second conductive segment 2652g of the conductive member 2650g.

According to various embodiments, the circuit board 2640g may include an extended portion 2640g-1 extended to abut against the conductive member 2650g. The extended portion 2640g-1 may be part of the ground portion, or may be a portion electrically connected to the ground portion. For example, the circuit board 2640g may include an extended portion 2640g-1 extended to abut against the second conductive member 2652g. The extended portion 2640g-1 may be physically in contact with the second conductive member 2652g. Alternatively, since the extended portion 2640g-1 abuts against the second conductive member 2652g, a connection may be easily established by using an electrical connecting means (e.g., a metallic bolt fastening or soldering) between the extended portion 2640g-1 and the second conductive member 2652g.

Figure 26H:
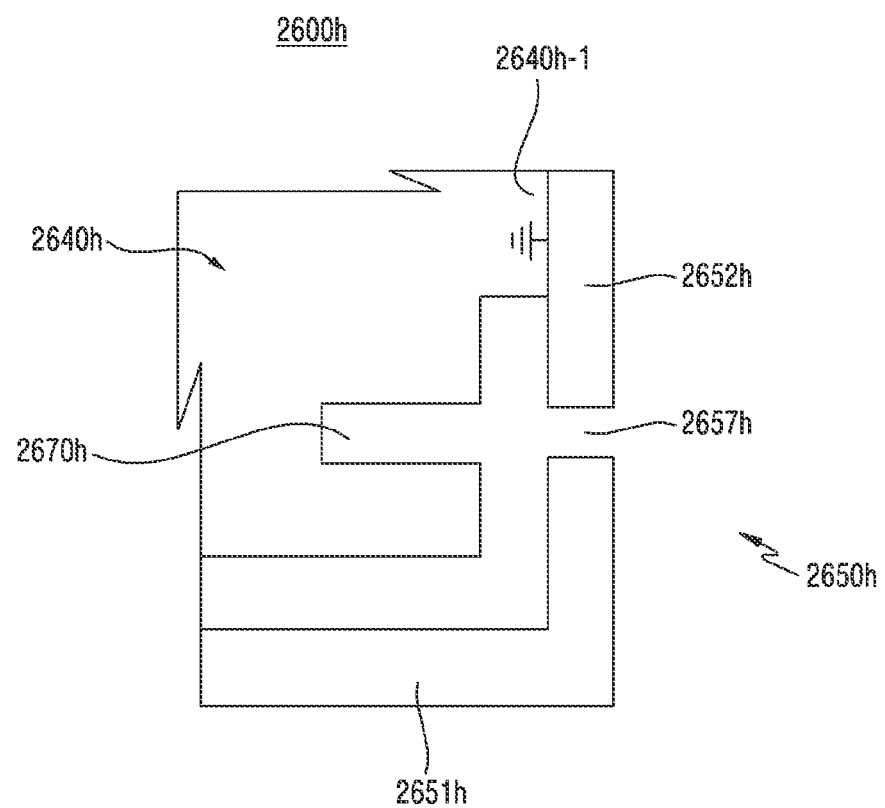

Referring to FIG. 26H, in a plan view, an electronic device 2600h including an antenna may include a circuit board 2640h and a conductive member 2650h which surrounds at least part of the circuit board 2640h. According to various embodiments, the conductive member 2650h may be at least similar or identical to the conductive member 2650g of FIG. 26G.

According to various embodiments, the circuit board 2640h may be at least similar or identical to the circuit board 2640g of FIG. 26G. An electrical connection between the circuit board 2640h and the conductive member 2650h may be at least similar or identical to the aforementioned electrical connection between the circuit board 2640g and the conductive member 2650g of FIG. 26G.

According to an embodiment, the circuit board 2640h may include a slit 2670h disposed at a portion abutting against a slit 2657h of a conductive member 2650h. The slit 2670h is a portion not including a conductive material, and may improve a radiation performance of the electronic device 2600h including an antenna. According to various embodiments, the slit 2670h may be at least similar or identical to the slit 2670f of FIG. 26F.

According to various embodiments, the electronic device (e.g., the electronic device 300 of FIG. 3A) may include a housing (e.g., the first housing 310) having a substantially rectangular shape. The electronic devices 2600e, 2600f, 2600g, or 2600h including the antennas of FIG. 26E to FIG. 26H may be included in any one (e.g., a lower right corner) of four corners (e.g., an upper left corner, an upper right corner, a lower left corner, and a lower right corner in a plan view) of the housing 310.

(4) Various examples of an electronic device

Figure 27A:
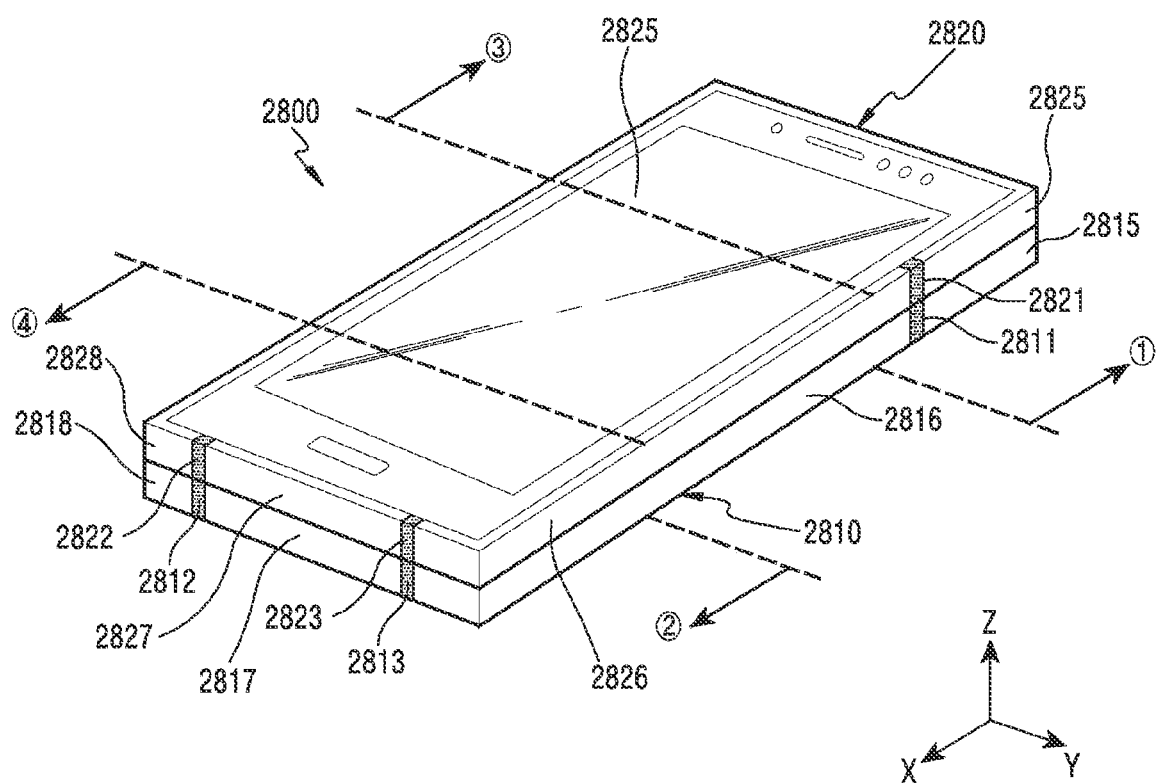
FIG. 27A to FIG. 27C illustrate a slide-type electronic device according to various embodiments of the present disclosure.
Figure 27B:
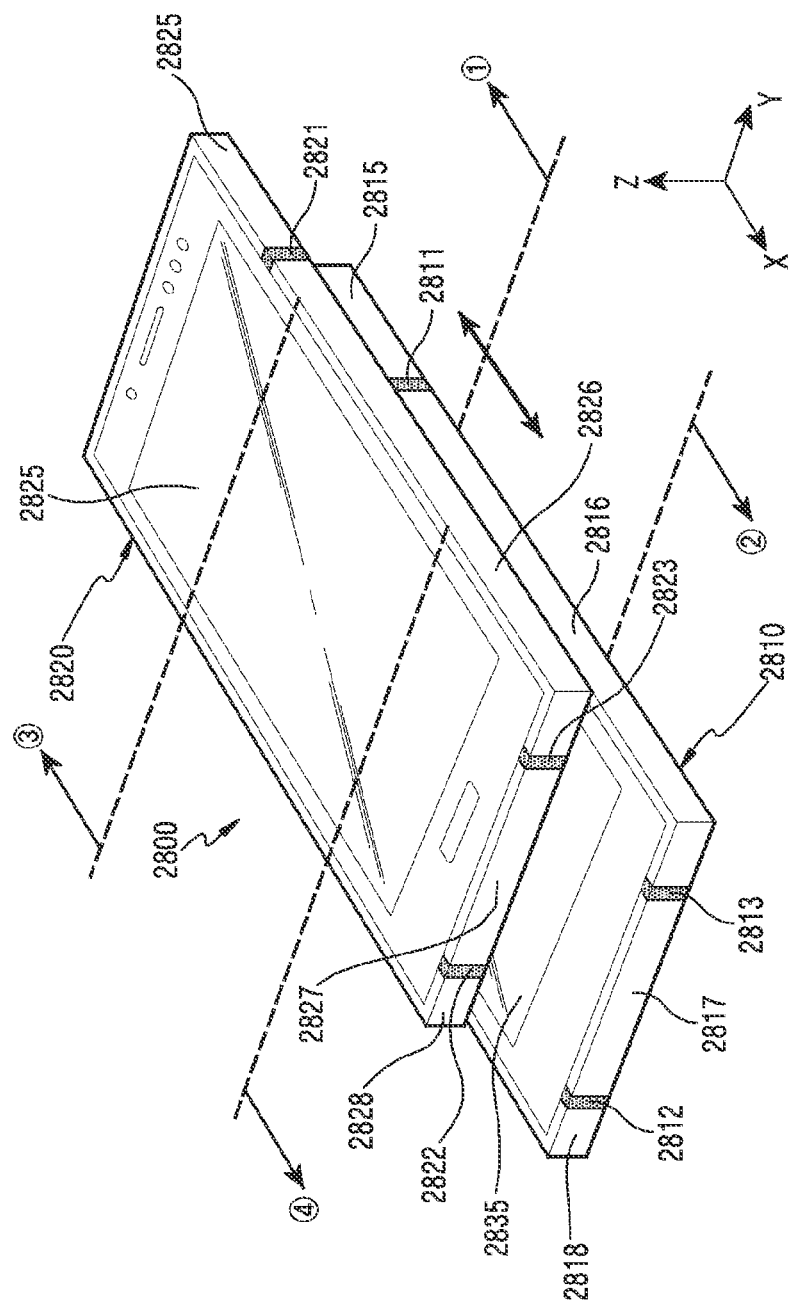
Figure 27C:
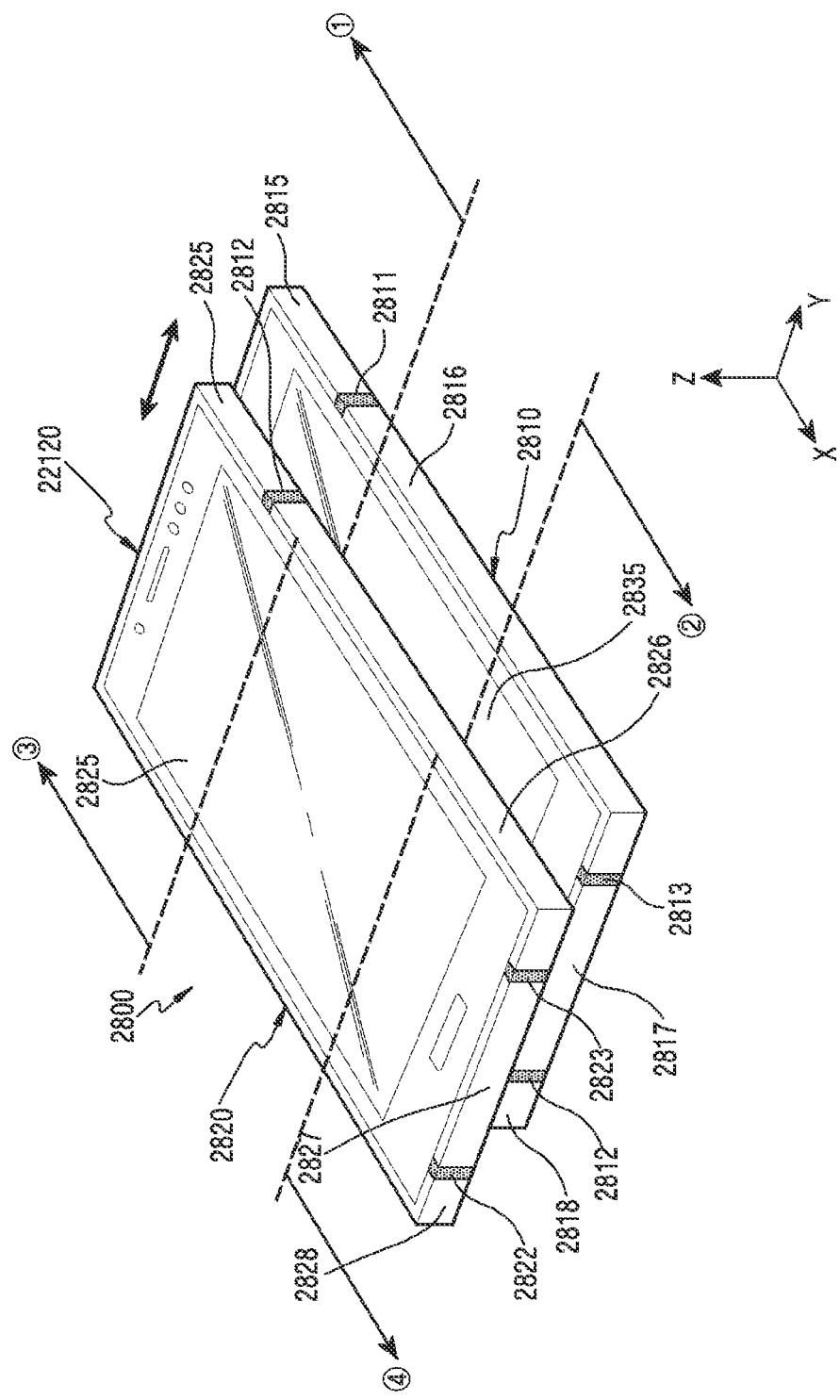

FIG. 27A to FIG. 27C illustrate a slide-type electronic device according to various embodiments of the present disclosure.

Referring to FIG. 27A to FIG. 27C, an electronic device 2800 may include a first housing 2810 and a second housing 2820 disposed to overlap with the first housing 2810.

According to an embodiment, the second housing 2820 may operate in a sliding manner in the first housing 2810. According to an embodiment, the second housing 2820 may include a first display 2825 in a front side thereof. According to an embodiment, when the second housing 2820 is open from the first housing 2810 in a sliding manner, the first housing 2810 may include a second display 2835 which is at least partially exposed.

According to an embodiment, as shown in FIG. 27B, the second housing 2820 may slide along the first housing 2810, and may move in an X-axis direction.

According to another embodiment, as shown in FIG. 27C, the second using 2820 may slide along the first housing 2810, and may move in a Y-axis direction.

According to various embodiments, a plurality of conductive segments 2815, 2816, 2817, and 2818 and a plurality of non-conductive segments 2811, 2812, and 2813 may be disposed along a boundary of the first housing 2810. In addition, a plurality of conductive segments 2825, 2826, 2827, and 2828 and a plurality of non-conductive segments 2821, 2822, and 2823 may be disposed along a boundary of the second housing 2820.

According to an embodiment, when the first housing 2810 and the second housing 2820 overlap with each other, at least one non-conductive slit of the first housing 2810 and a non-conductive slit of the second housing 2820 may be disposed at locations facing each other.

According to an embodiment, the aforementioned electronic device including the antenna of the present disclosure may be disposed to the first housing 2810 and the second housing 2820. According to various embodiments, the electronic device including the antenna of the first housing 2810 of FIG. 27A to FIG. 27C may include at least part of the aforementioned electronic device including the antenna of the first housing 310 of FIG. 3A to FIG. 21B. Alternatively, the electronic device including the antenna of the second housing 2820 of FIG. 27A to FIG. 27C may include at least part of the aforementioned electronic device including the antenna of the second housing 320 of FIG. 3A to FIG. 21B.

For example, in FIG. 27A to FIG. 27C, at least one of the plurality of conductive segments 2825, 2826, 2827, and 2828 of the second housing 2820 may be connected with the ground member.

According to various embodiments, at least one of the plurality of conductive segments 2825, 2826, 2827, and 2828 of the second housing 2820 may be selectively connected with the ground member via the switching circuit. In this case, when the first housing 2810 and the second housing 2820 are disposed to overlap with each other, the switching circuit may be in an on-state, and when the second housing 2820 is open in a sliding manner from the first housing 2810, the switching circuit may be in an off-state.

According to various embodiments, at least one of the plurality of conductive segments 2875, 2876, 7877, and 7828 of the second housing 2820 may be electrically connected with the ground member by the switching circuit via the lumped element.

According to various embodiments, at least one of the plurality of conductive segments 2825, 2826, 2827, and 2828 of the second housing 2820 may be connected with the stub pattern. In this case, the stub pattern may be connected directly with the ground member, or may be connected with the ground member via the lumped element. Alternatively, the stub pattern may be connected with the ground member selectively by the switching circuit, or may be connected with the ground member selectively by the switching circuit via the lumped element.

In various embodiments, an upper portion ① or lower portion ② of the first housing 2810 of the device 2800 or an upper portion ③ or lower portion ④ of the second housing 2820 of FIG. 27A to FIG. 27C may include at least part of at least one of electronic devices including antennas proposed in FIG. 4, FIG. 5, FIGS. 6A to 6C, FIGS. 7A to 7C, FIGS. 8A to 8C, FIGS. 9A to 9C, FIGS. 10A to 10C, FIGS. 11A to 11C, FIGS. 13A to 13D, FIGS. 14A to 14D, FIGS. 15A and 15B, FIGS. 16A to 16G, FIGS. 17A to 17G, FIGS. 18A and 18B, FIGS. 19A to 19G, FIGS. 20A to 20G, FIGS. 21A and 21B, FIGS. 23A to 23D, FIGS. 24A to 24D, FIGS. 25A to 25H, or FIGS. 26A to 26H.

Figure 28A:
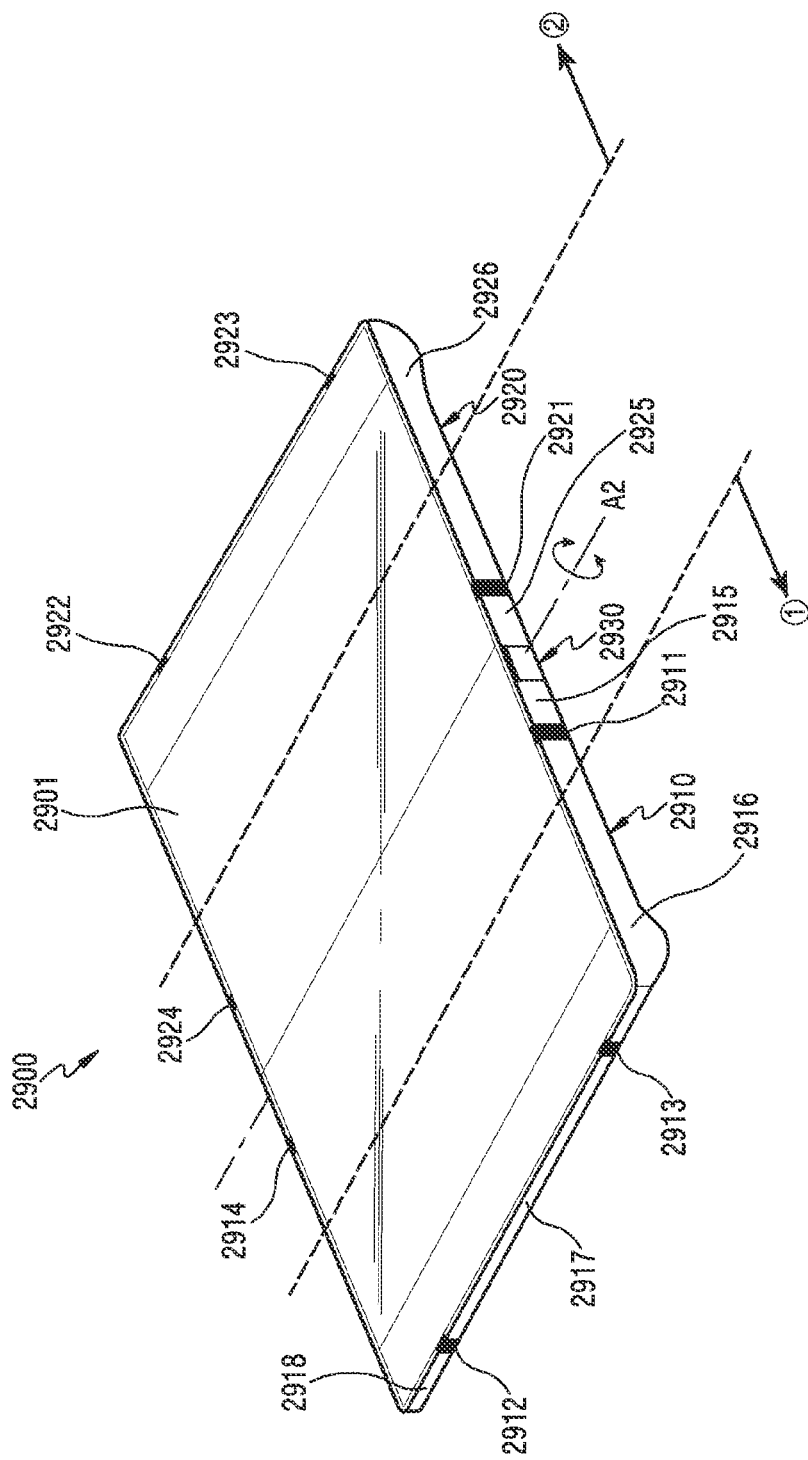
FIG. 28A and FIG. 28B illustrate a foldable-type electronic device including a flexible display according to various embodiments of the present disclosure.
Figure 28B:
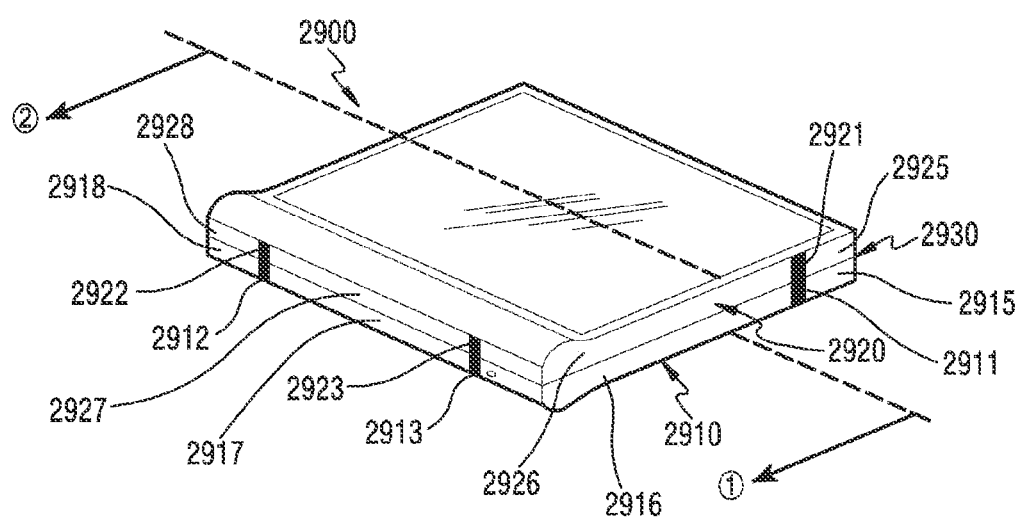

FIG. 28A and FIG. 28B illustrate a foldable-type electronic device including a flexible display according to various embodiments of the present disclosure.

Referring to FIG. 28A and FIG. 28B, an electronic device 2900 may include a first housing 2910 and a second housing 2920 which may overlap with the first housing 2910.

According to an embodiment, the second housing 2920 may operate in a foldable manner in the first housing 2910. According to an embodiment, the first housing 2910 and the second housing 2920 may be folded to face each other, and a flexible display 2901 may be disposed to a side at which the first housing 2910 and the second housing 2920 face each other. According to an embodiment, the flexible display 2901 may include both the first housing 2910 and the second housing 2920, and may be disposed seamlessly. According to an embodiment, the second housing 2920 may operate to overlap with the first housing 2910 by rotating about a rotation axis A2 by means of a connecting device 2930.

According to an embodiment, a plurality of conductive segments 2915, 2916, 2917, and 2918 and a plurality of non-conductive segments 2911, 2912, 2913, and 2914 may be disposed along a boundary of the first housing 2910. In addition, a plurality of conductive segments 2925, 2926, 2927, and 292.8 and a plurality of non-conductive segments 2921, 2922, 2923, and 2924 may be disposed along a boundary of the second housing 2920.

According to an embodiment, when the first housing 2910 and the second housing 2920 overlap with each other, at least one non-conductive slit of the first housing 2910 and a non-conductive slit of the second housing 2920 may be disposed at locations facing each other.

According to an embodiment, the aforementioned electronic device including the antenna of the present disclosure may be disposed to the first housing 2910 and the second housing 2920.

For example, the electronic device including the antenna of the first housing 2910 of FIG. 28A and FIG. 28B may include at least part of the aforementioned electronic device including the antenna of the first housing 310 of FIG. 3A to FIG. 21B. Alternatively, the electronic device including the antenna of the second housing 2920 of FIG. 28A and FIG. 28B may include at least part of the aforementioned electronic device including the antenna of the second housing 320 of FIG. 3A to FIG. 21B.

For example, in FIG. 28A and FIG. 28B, at least one of the plurality of conductive segments 2925, 2926, 2927, and 2928 of the second housing 2920 may be connected with the ground member.

According to various embodiments, at least one of the plurality of conductive segments 2925, 2926, 2927, and 2928 of the second housing 2920 may be selectively connected with the ground member via the switching circuit. In this case, when the first housing 2910 and the second housing 2920 are disposed to overlap with each other, the switching circuit may be in an on-state, and when the second housing 2920 is unfolded to be open from the first housing 2910, the switching circuit may be in an off-state.

According to various embodiments, at least one of the plurality of conductive segments 2925, 2926, 2927, and 2928 of the second housing 2920 may be selectively connected with the ground member by the switching circuit including the lumped element on an electrical path.

According to various embodiments, at least one of the plurality of conductive segments 2925, 2926, 2927, and 2928 of the second housing 2920 may be connected with the stub pattern. In this case, the stub pattern may be connected directly with the ground member, or may be connected with the ground member via the lumped element. Alternatively, the stub pattern may be connected with the ground member selectively by the switching circuit, or may be connected with the ground member selectively by the switching circuit via the lumped element.

In various embodiments, an upper portion ① (e.g., one portion of the first housing 2910) or lower portion ② (e.g., one portion of the second housing 2920) disposed at both sides of the electronic device 2900 of FIG. 28A and FIG. 28B may include at least part of at least one of electronic devices including antennas proposed in FIG. 4, FIG. 5, FIGS. 6A to 6C, FIGS. 7A to 7C, FIGS. 8A to 8C, FIGS. 9A to 9C, FIGS. 10A to 10C, FIGS. 11A to 11C, FIGS. 13A to 13D, FIGS. 14A to 14D, FIGS. 15A and 15B, FIGS. 16A to 16G, FIGS. 17A to 17G, FIGS. 18A and 18B, FIGS. 19A to 19G, FIGS. 20A to 20G, FIGS. 21A and 21B, FIGS. 23A to 23D, FIGS. 24A to 24D, FIGS. 25A to 25H, or FIGS. 26A to 26H.

Figure 29A:
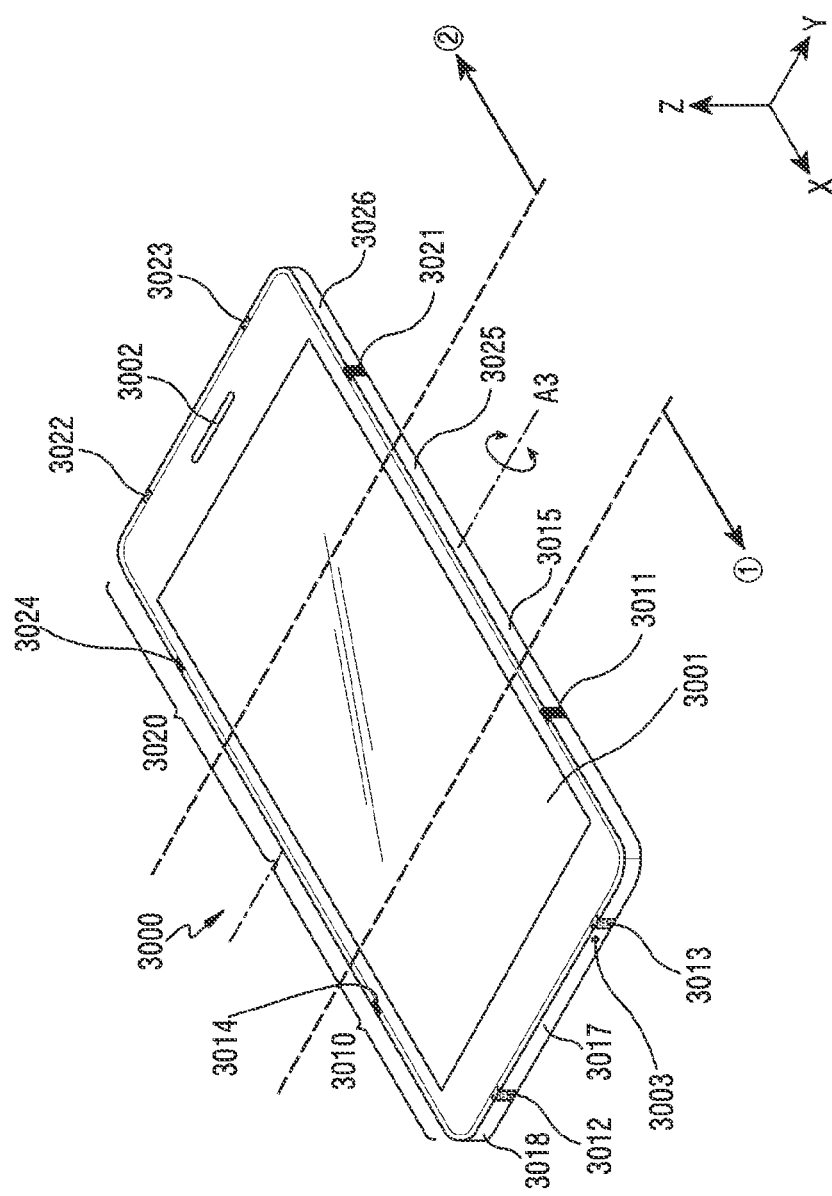
FIG. 29A to FIG. 29C illustrate a bendable-type electronic device including a flexible display according to various embodiments of the present disclosure.
Figure 29B:
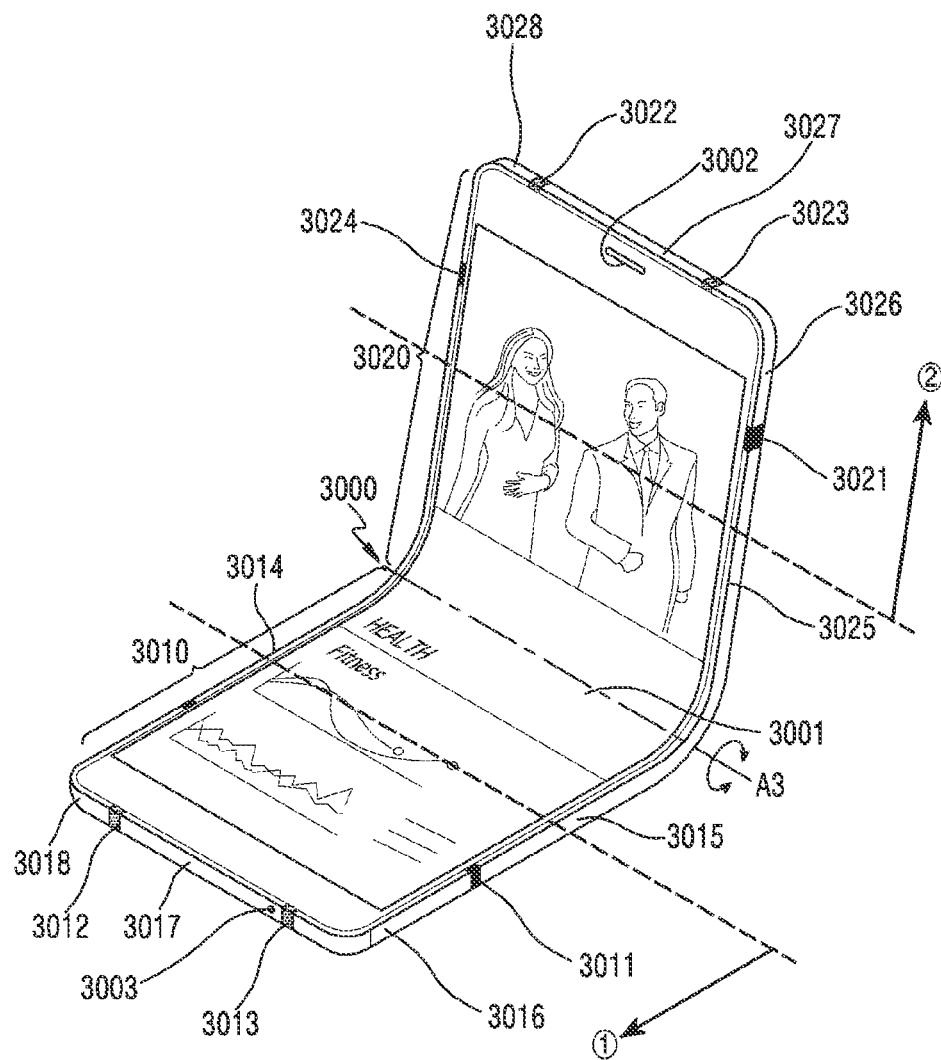
Figure 29C:
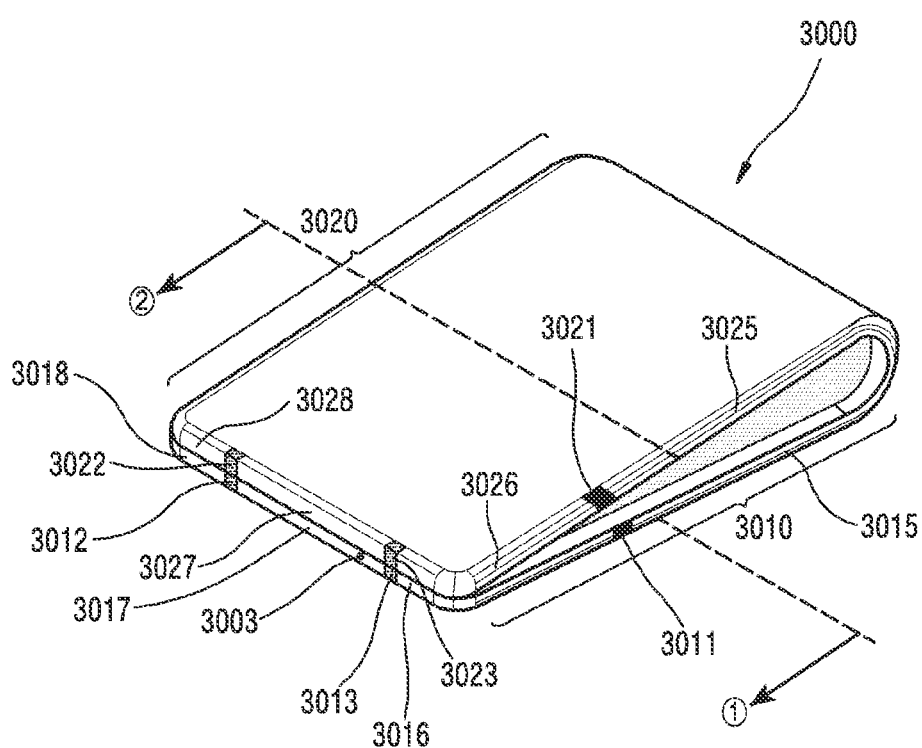

FIG. 29A to FIG. 29C illustrate a bendable-type electronic device including a flexible display according to various embodiments of the present disclosure.

Referring to FIG. 29A to FIG. 29C, an electronic device 3000 may include a single or whole housing.

According to an embodiment, the electronic device 3000 may be a communication electronic device including a speaker device 3002 and a microphone device 3003.

According to an embodiment, the electronic device 3000 may be bent about an axis A3, which is a substantially central portion, as a rotational axis. When it is bent, the electronic device 3000 may be divided into a first housing 3010 and a second housing 3020 with respect to the axis A3.

According to an embodiment, the first housing 3010 and the second housing 3020 may be bent to face each other.

According to an embodiment, the electronic device 3000 may include one flexible display 3001 disposed to both of the first housing 3010 and the second housing 3020.

According to an embodiment, the second housing 3020 may change to overlap with the first housing 3010 by rotating about the rotational axis A3 without an additional connecting device.

According to an embodiment, a plurality of conductive segments 3015, 3016, 3017, and 3018 and a plurality of non-conductive segments 3011, 3012, 3013, and 3014 may be disposed along a boundary of the first housing 3010. In addition, a plurality of conductive segments 3025, 3026, 3027, and 3028 and a plurality of non-conductive segments 3021, 3022, 3023, and 3024 may be disposed along a boundary of the second housing 3020.

According to an embodiment, when the first housing 3010 and the second housing 3020 overlap with each other, at least one non-conductive slit of the first housing 3010 and a non-conductive slit of the second housing 3020 may be disposed at locations facing each other.

According to an embodiment, the aforementioned electronic device including the antenna of the present disclosure may be disposed to the first housing 3010 and the second housing 3020.

For example, the electronic device including the antenna of the first housing 3010 of FIG. 29A to FIG. 29C may include at least part of the aforementioned electronic device including the antenna of the first housing 310 of FIG. 3A to FIG. 21B. Alternatively, the electronic device including the antenna of the second housing 3020 of FIG. 29A to FIG. 29C may include at least part of the aforementioned electronic device including the antenna of the second housing 320 of FIG. 3A to FIG. 21B.

For example, in FIG. 29A to FIG. 29C, at least one of the plurality of conductive segments 3025, 3026, 3027, and 3028 of the second housing 3020 may be connected with the ground member.

According to various embodiments, at least one of the plurality of conductive segments 3025, 3026, 3027, and 3028 of the second housing 3020 may be selectively connected with the ground member via the switching circuit. In this case, when the first housing 3010 and the second housing 3020 are disposed to overlap with each other, the switching circuit may be in an on-state, and when the second housing 3020 is unfolded to be open from the first housing 3010, the switching circuit may be in an off-state.

According to various embodiments, at least one of the plurality of conductive segments 3025, 3026, 3027, and 3028 of the second housing 3020 may be electrically connected with the ground member by the switching circuit via the lumped element.

According to various embodiments, at least one of the plurality of conductive segments 3025, 3026, 3027, and 3028 of the second housing 3020 may be connected with the stub pattern. In this case, the stub pattern may be connected directly with the ground member, or may be connected with the ground member via the lumped element. Alternatively, the stub pattern may be connected with the ground member selectively by the switching circuit, or may be connected with the ground member selectively by the switching circuit via the lumped element.

In various embodiments, an upper portion ① (e.g., one portion of the first housing 3010) or lower portion ② (e.g., one portion of the second housing 3020) disposed at both sides of the electronic device 3000 of FIG. 29A to FIG. 29C may include at least part of at least one of electronic devices including antennas proposed in FIG. 4, FIG. 5, FIGS. 6A to 6C, FIGS. 7A to 7C, FIGS. 8A to 8C, FIGS. 9A to 9C, FIGS. 10A to 10C, FIGS. 11A to 11C, FIGS. 13A to 13D, FIGS. 14A to 14D, FIGS. 15A and 15B, FIGS. 16A to 16G, FIGS. 17A to 17G, FIGS. 18A and 18B, FIGS. 19A to 19G, FIGS. 20A to 20G, FIGS. 21A and 21B, FIGS. 23A to 23D, FIGS. 24A to 24D, FIGS. 25A to 25H, or FIGS. 26A to 26H.

Figure 30A:
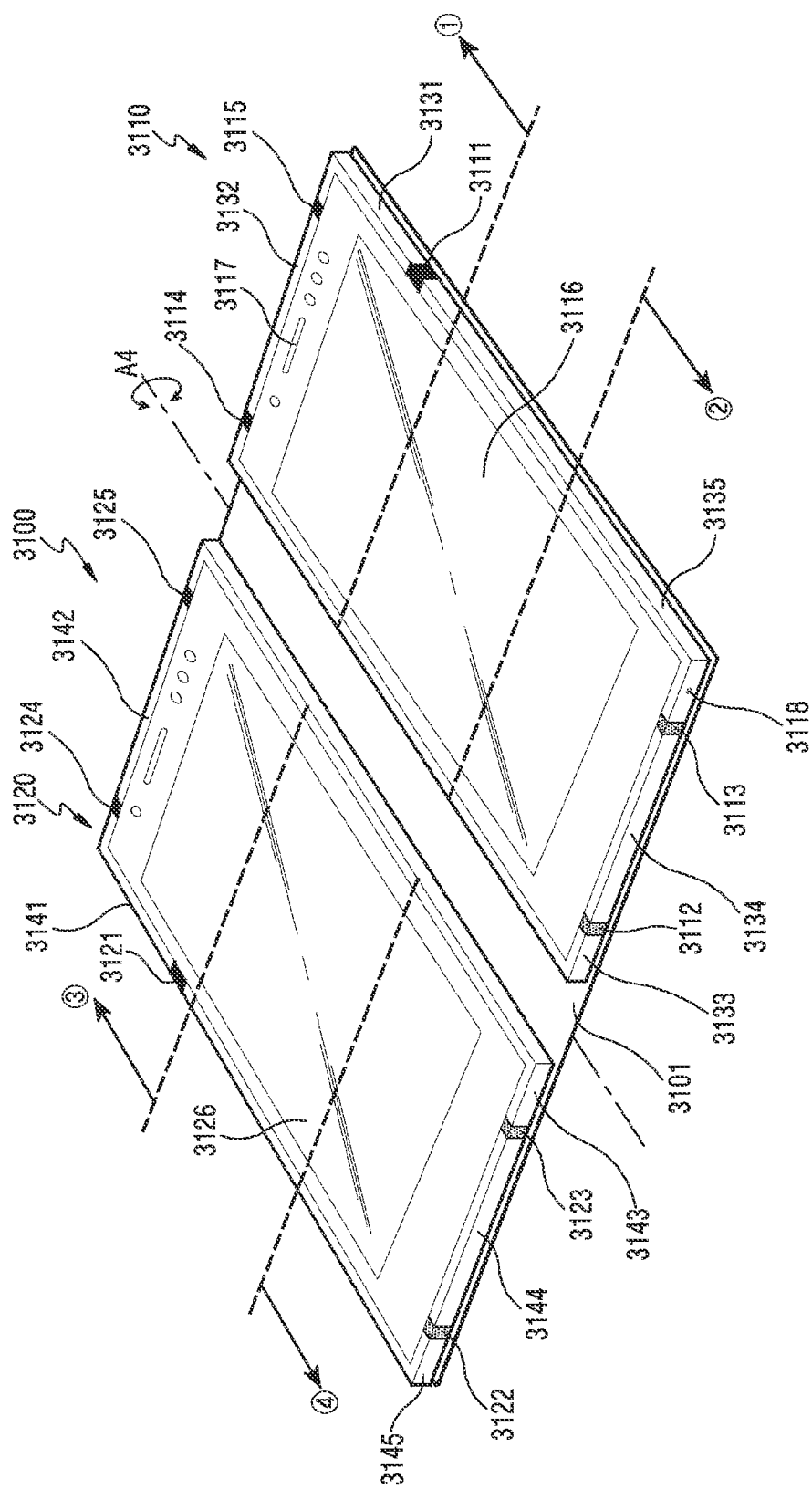
FIG. 30A and FIG. 30B illustrate a foldable-type electronic device according to various embodiments of the present disclosure.
Figure 30B:
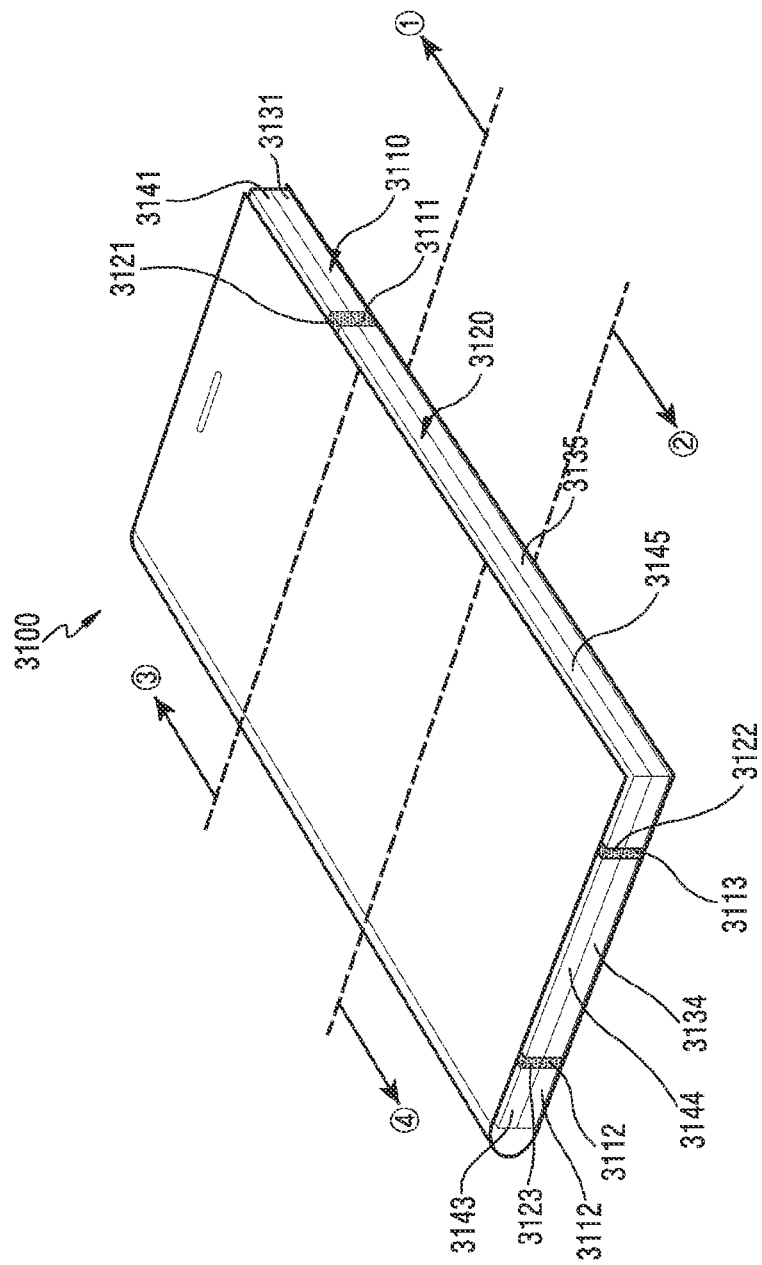

FIG. 30A and FIG. 30B illustrate a foldable-type electronic device according to various embodiments of the present disclosure.

Referring to FIG. 30A and FIG. 30B, an electronic device 3100 may include a first housing 3110 and a second housing 3120 disposed to overlap with the first housing 3110.

According to an embodiment, the first housing 3110 and the second housing 3120 may be disposed to a specific connecting member 3101 of which a center is foldable about an axis A4.

According to an embodiment, the first housing 3110 may be a communication electronic device including a first display 3116, a speaker device 3117, and a microphone device 3118.

According to an embodiment, the second housing 3120 may include a second display 3126. According to an embodiment, the first housing 3110 and the second housing 3120 may be operatively connected by means of a connecting member 3101. However, without being limited thereto, the first housing 3110 and the second housing 3120 may be operatively connected by means of wireless communication (e.g., Bluetooth communication, etc.). According to an embodiment, the first housing 3110 may operate to overlap with the second housing 3120 by rotating about a rotational axis A4 by means of the connecting member 3101.

According to an embodiment, a plurality of conductive segments 3131, 3132, 3133, 3134, and 3135 and a plurality of non-conductive segments 3111, 3112, 3113, 3114, and 3115 may be disposed along a boundary of the first housing 3110. In addition, a plurality of conductive segments 3121, 3122, 3123, 3124, and 3126 and a plurality of non-conductive segments 3141, 3142, 3143, 3144, and 3145 may be disposed along a boundary of the second housing 3120.

According to an embodiment, when the first housing 3110 and the second housing 3120 overlap with each other, at least one non-conductive slit of the first housing 3110 and a non-conductive slit of the second housing 3120 may be disposed at locations facing each other.

According to an embodiment, the aforementioned electronic device including the antenna of the present disclosure may be disposed to the first housing 3110 and the second housing 3120.

For example, the electronic device including the antenna of the first housing 3110 of FIG. 30A and FIG. 30B may include at least part of the aforementioned electronic device including the antenna of the first housing 310 of FIG. 3A to FIG. 21B. Alternatively, the electronic device including the antenna of the second housing 3020 of FIG. 30A and FIG. 30B may include at least part of the aforementioned electronic device including the antenna of the second housing 320 of FIG. 3A to FIG. 21B.

For example, in FIG. 30A and FIG. 30B, at least one of the plurality of conductive segments 3121, 3122, 3123, 3124, and 3126 of the second housing 3120 may be connected with the ground member.

According to various embodiments, at least one of the plurality of conductive segments 3121, 3122, 3123, 3124, and 3126 of the second housing 3120 may be selectively connected with the ground member via the switching circuit. In this case, when the first housing 3110 and the second housing 3120 are disposed to overlap with each other, the switching circuit may be in an on-state, and when the second housing 3120 is unfolded to be open from the first housing 3110, the switching circuit may be in an off-state.

According to various embodiments, at least one of the plurality of conductive segments 3121, 3122, 3123, 3124, and 3126 of the second housing 3120 may be electrically connected with the ground member by the switching circuit via the lumped element.

According to various embodiments, at least one of the plurality of conductive segments 3121, 3122, 3123, 3124, and 3126 of the second housing 3120 may be connected with the stub pattern. In this case, the stub pattern may be connected directly with the ground member, or may be connected with the ground member via the lumped element. Alternatively, the stub pattern may be connected with the ground member selectively by the switching circuit, or may be connected with the ground member selectively by the switching circuit via the lumped element.

In various embodiments, an upper portion ① or lower portion ② of the first housing 3110 of the device 3100 or an upper portion ③ or lower portion ④ of the second housing 3120 of the electronic device 3100 of FIG. 30A and FIG. 30B may include at least part of at least one of electronic devices including antennas proposed in FIG. 4, FIG. 5, FIGS. 6A to 6C, FIGS. 7A to 7C, FIGS. 8A to 8C, FIGS. 9A to 9C, FIGS. 10A to 10C, FIGS. 11A to 11C, FIGS. 13A to 13D, FIGS. 14A to 14D, FIGS. 15A and 15B, FIGS. 16A to 16G, FIGS. 17A to 17G, FIGS. 18A and 18B, FIGS. 19A to 19G, FIGS. 20A to 20G, FIGS. 21A and 21B, FIGS. 23A to 23D, FIGS. 24A to 24D, FIGS. 25A to 25H, or FIGS. 26A to 26H.

Figure 31A:
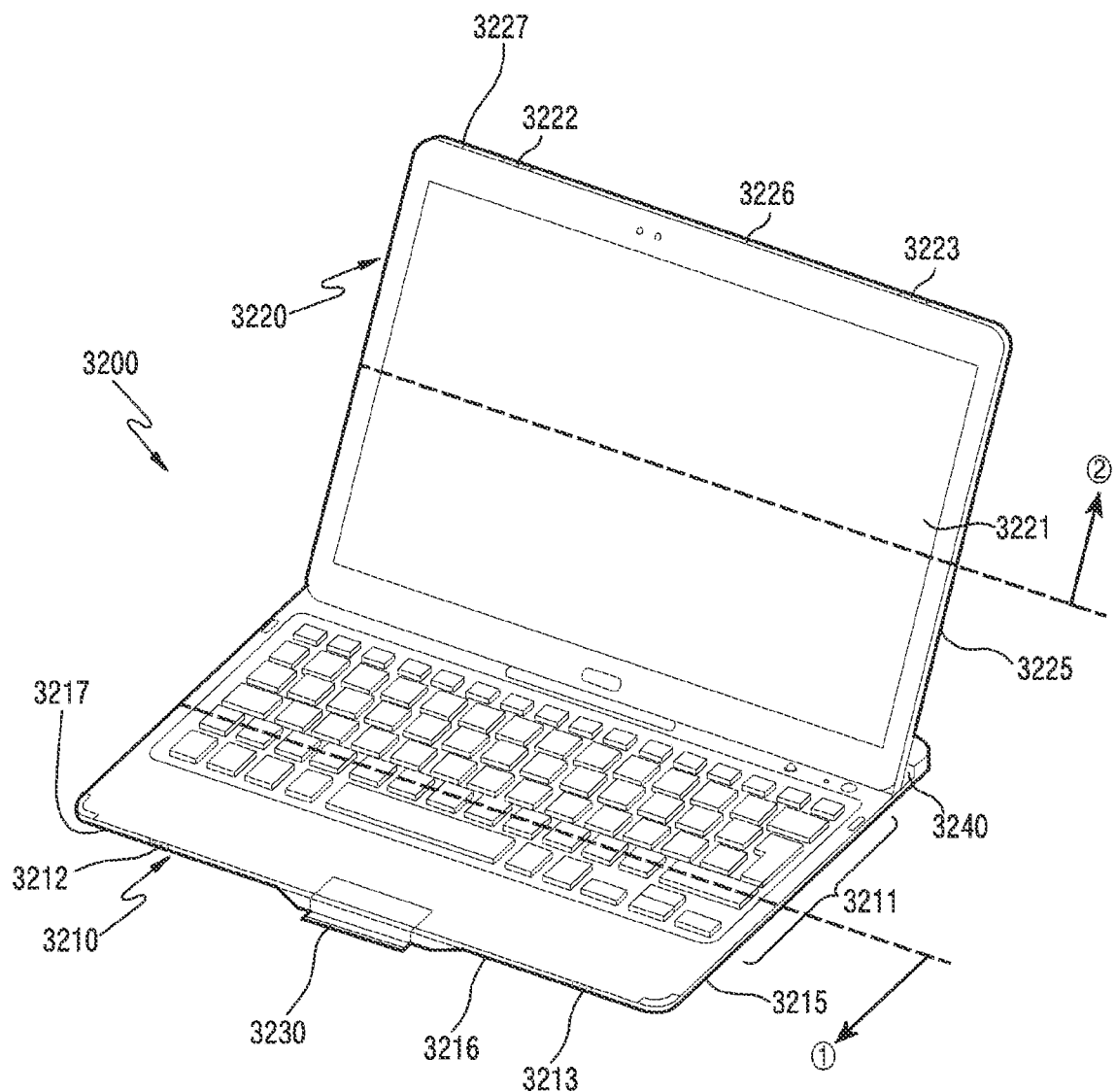
FIG. 31A and FIG. 31B illustrate a detachable-type electronic device according to various embodiments of the present disclosure.
Figure 31B:
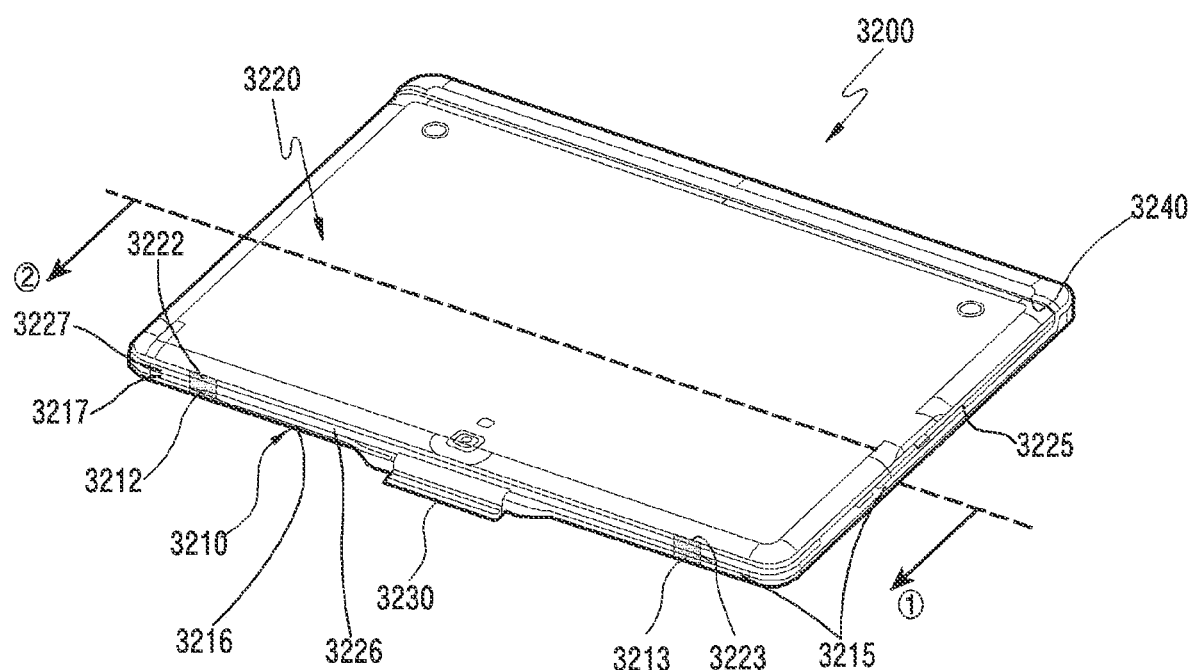

FIG. 31A and FIG. 31B illustrate a detachable-type electronic device according to various embodiments of the present disclosure.

Referring to FIG. 31A and FIG. 31B, an electronic device 3200 may include a first housing 3210 and a second housing 3220 detachably deposed to the first housing 3210.

According to an embodiment, the first housing 3210 may be a key pad 3211 including a plurality of key buttons.

According to an embodiment, the second housing 3220 may include a display 3221.

According to an embodiment, the first housing 3210 and the second housing 3220 may be operatively connected by means of wireless communication (e.g., Bluetooth communication, etc.).

According to an embodiment, when the first housing 3210 is disposed to overlap with the second housing 3220, the electronic device 3200 may be carried in such a manner that the second housing 3220 is fastened by a stopper 3240 installed at the first housing 3210 and a locking device 3230 disposed at a location facing the stopper 3240.

According to an embodiment, a plurality of conductive segments 3215, 3216, and 3217 and a plurality of non-conductive segments 3212 and 3213 may be disposed along a boundary of the first housing 3210. In addition, a plurality of conductive segments 3225, 3226, and 3227 and a plurality of non-conductive segments 3222 and 3223 may be disposed along a boundary of the second housing 3220.

According to an embodiment, when the first housing 3210 and the second housing 3220 overlap with each other, at least one non-conductive slit of the first housing 3210 and a non-conductive slit of the second housing 3220 may be disposed at locations facing each other.

According to an embodiment, the aforementioned electronic device including the antenna of the present disclosure may be disposed to the first housing 3210 and the second housing 3220.

For example, the electronic device including the antenna of the first housing 3210 of FIG. 31A and FIG. 31B may include at least part of the aforementioned electronic device including the antenna of the first housing 310 of FIG. 3A to FIG. 21B. Alternatively, the electronic device including the antenna of the second housing 3220 of FIG. 31A and FIG. 31B may include at least part of the aforementioned electronic device including the antenna of the second housing 320 of FIG. 3A to FIG. 21B.

For example, in FIG. 31A and FIG. 31B, at least one of the plurality of conductive segments 3225, 3226, and 3227 of the second housing 3220 may be connected with the ground member.

According to various embodiments, at least one of the plurality of conductive segments 3225, 3226, and 3227 of the second housing 3220 may be selectively connected with the ground member via the switching circuit. In this case, when the first housing 3110 and the second housing 3120 are disposed to overlap with each other, the switching circuit may be in an on-state, and when the second housing 3220 is unfolded or detached to be open from the first housing 3110, the switching circuit may be in an off-state.

According to various embodiments, at least one of the plurality of conductive segments 3225, 3226, and 3227 of the second housing 3220 may be electrically connected with the ground member by the switching circuit via the lumped element.

According to various embodiments, at least one of the plurality of conductive segments 3225, 3226, and 3227 of the second housing 3220 may be connected with the stub pattern. In this case, the stub pattern may be connected directly with the ground member, or may be connected with the ground member via the lumped element. Alternatively, the stub pattern may be connected with the ground member selectively by the switching circuit, or may be connected with the ground member selectively by the switching circuit via the lumped element.

In various embodiments, an upper portion ① (e.g., one portion of the first housing 3110 or lower portion ② (e.g., one portion of the second housing 3120) disposed at both sides of the electronic device 3200 of FIG. 31A and FIG. 31B may include at least part of at least one of electronic devices including antennas proposed in FIG. 4, FIG. 5, FIGS. 6A to 6C, FIGS. 7A to 7C, FIGS. 8A to 8C, FIGS. 9A to 9C, FIGS. 10A to 10C, FIGS. 11A to 11C, FIGS. 13A to 13D, FIGS. 14A to 14D, FIGS. 15A and 15B, FIGS. 16A to 16G, FIGS. 17A to 17G, FIGS. 18A and 18B, FIGS. 19A to 19G, FIGS. 20A to 20G, FIGS. 21A and 21B, FIGS. 23A to 23D, FIGS. 24A to 24D, FIGS. 25A to 25H, or FIGS. 26A to 26H.

According to an embodiment of the present disclosure, an electronic device may include a first housing including a first side facing a first direction, a second side facing a second direction opposite to the first direction, and a first lateral side surrounding at least part of a space between the first side and the second side. The electronic device may include a second housing including a third side facing a third direction, a fourth side facing a fourth direction opposite to the third direction, and a second lateral side surrounding at least part of a space between the third side and the fourth side. The electronic device may include a first display located in the first housing and exposed through the first housing. The electronic device may include a connecting member which connects the first housing and the second housing such that the first housing and the second housing are folded to face each other, wherein when the first housing and the second housing are folded, the first lateral side and the second lateral side abut against each other. The electronic device may include a first conductive member disposed to at least part of the first lateral side, wherein the first conductive member includes a first non-conductive slit and second non-conductive slit extended in the first direction or the second direction such that the first conductive member is divided into a plurality of conductive segments. The electronic device may include a second conductive member disposed to at least part of the second lateral side, wherein the second conductive member includes a third non-conductive slit and fourth non-conductive slit extended in the third direction or the fourth direction such that the second conductive member is divided into a plurality of conductive segments, and when the first housing and the second housing are folded, the first slit and the fourth slit abut against each other and the second slit and the third slit abut against each other. The electronic device may include at least one wireless communication circuit electrically connected with one of the plurality of conductive segments of the first conductive member at a first point abutting against the first slit, and electrically connected with another of the plurality of conductive segments of the first conductive member at a second point abutting against the second slit.

According to an embodiment of the present disclosure, the electronic device may further include a ground member inside the second housing. A least one of the conductive segments of the second conductive member may be electrically connected with the ground member.

According to an embodiment of the present disclosure, at least one of the conductive segments of the second conductive member may be electrically connected with the ground member at a point abutting against the third slit or the fourth slit.

According to an embodiment of the present disclosure, the second slit may be located closer to the connecting member than the first slit. The third slit may be located closer to the connecting member than the fourth slit. At least one of the conductive segments of the second conductive member may be electrically connected with the ground member at a point abutting against the fourth slit.

According to an embodiment of the present disclosure, the electronic device may further include a switching circuit configured to electrically connect at least one of the plurality of conductive segments of the second conductive member with the ground member.

According to an embodiment of the present disclosure, the switching circuit may operate in an on-state to electrically connect the at least one conductive segment with the ground member when the first housing and the second housing are folded. Alternatively, the switching circuit may operate in on off-state to cut off the connection between the at least one conductive segment and the ground member when the first housing and the second housing are unfolded.

According to an embodiment of the present disclosure, the switching circuit may electrically connect one of the plurality of conductive segments with the ground member when the first housing and the second housing are folded. Alternatively, the switching circuit may electrically connect another of the plurality of conductive segments with the ground member when the first housing and the second housing are unfolded.

According to an embodiment of the present disclosure, the switching circuit may electrically connect at least one of the plurality of conductive segment of the second conductive member with the ground member via an inductor.

According to an embodiment of the present disclosure, the switching circuit may operate in an on-state to electrically connect the at least one conductive segment with the ground member via the inductor when the first housing and the second housing are folded. Alternatively, the switching circuit may operate in on off-state to cut off the connection between the at least one conductive segment and the ground member when the first housing and the second housing are unfolded.

According to an embodiment of the present disclosure, the switching circuit may electrically connect one of the plurality of conductive segments with the ground member via the inductor when the first housing and the second housing are folded. Alternatively, the switching circuit may electrically connect another of the plurality of conductive segments with the ground member via the inductor when the first housing and the second housing are unfolded.

According to an embodiment of the present disclosure, the electronic device may further include a stub pattern connected with at least one of the conductive segments of the second conductive member.

According to an embodiment of the present disclosure, the stub pattern may be connected at a point abutting against the third slit or the fourth slit and thus is extended towards one side of the second housing.

According to an embodiment of the present disclosure, the stub pattern may be electrically connected with the ground member.

According to an embodiment of the present disclosure, the electronic device may further include a switching circuit configured to connect at least one of the plurality of conductive segments of the second conductive member with the stub pattern.

According to an embodiment of the present disclosure, the switching circuit may electrically connect at least one of the plurality of conductive segments of the second conductive member with the stub pattern via an inductor.

According to an embodiment of the present disclosure, the first housing and the second housing may be connected in any one of a foldable type, a slide type, a bendable type, and a detachable type.

According to another embodiment of the present disclosure, an electronic device may include a first housing including a first side facing a first direction, a second side facing a second direction opposite to the first direction, and a first lateral side surrounding at least part of a space between the first side and the second side. The electronic device may include a second housing including a third side facing a third direction, a fourth side facing a fourth direction opposite to the third direction, and a second lateral side surrounding at least part of a space between the third side and the fourth side. The electronic device may include a connecting member which connects the first housing and the second housing such that the first housing and the second housing are folded to face each other. The electronic device may include a first conductive member including a first non-conductive slit and second non-conductive slit disposed to at least part of the first lateral side and a plurality of conductive segments divided by the slits. The electronic device may include a second conductive member including a third non-conductive slit and fourth non-conductive slit disposed to at least part of the first lateral side and a plurality of conductive segments divided by the slits. The electronic device may include at least one wireless communication circuit electrically connected with at least one of the plurality of conductive segments of the first conductive member. The electronic device may include a switching circuit configured to selectively connect at least one of the conductive segments of the second conductive member with the ground member.

According to another embodiment of the present disclosure, the switching circuit may electrically connect at least one of the plurality of conductive segment of the second conductive member with the ground member via an inductor.

According to another embodiment of the present disclosure, an electronic device may include a first housing including a first side facing a first direction, a second side facing a second direction opposite to the first direction, and a first lateral side surrounding at least part of a space between the first side and the second side. The electronic device may include a second housing including a third side facing a third direction, a fourth side facing a fourth direction opposite to the third direction, and a second lateral side surrounding at least part of a space between the third side and the fourth side. The electronic device may include a connecting member which connects the first housing and the second housing such that the first housing and the second housing are folded to face each other. The electronic device may include a first conductive member including a first non-conductive slit and second non-conductive slit disposed to at least part of the first lateral side and a plurality of conductive segments divided by the slits. The electronic device may include a second conductive member including a third non-conductive slit and fourth non-conductive slit disposed to at least part of the first lateral side and a plurality of conductive segments divided by the slits. The electronic device may include at least one wireless communication circuit electrically connected with at least one of the plurality of conductive segments of the first conductive member. The electronic device may include a stub pattern connected with at least one of the conductive segments of the second conductive member.

According to another embodiment of the present disclosure, the electronic device may further include a switching circuit configured to selectively connect the stub pattern with the ground member or another of the plurality of conductive segments of the second conductive member.

Various exemplary embodiments of the present disclosure disclosed in the specification and the drawing are merely a specific example presented for clarity and are not intended to limit the scope of the present disclosure. Therefore, in addition to the embodiments disclosed herein, various changes in forms and details made without departing from the technical concept of the present disclosure will be construed as being included in the scope of the present disclosure.

What is claimed is:

1. An electronic device comprising:
a first housing including a first side facing a first direction, a second side facing a second direction opposite to the first direction, and a first lateral side surrounding at least part of a space between the first side and the second side;
a second housing including a third side facing a third direction, a fourth side facing a fourth direction opposite to the third direction, and a second lateral side surrounding at least part of a space between the third side and the fourth side;
a flexible display including a first display portion and a second display portion, the first display portion located in the first housing and exposed through the first housing, the second display portion located in the second housing and exposed through the second housing;
a first conductive member disposed to at least part of the first lateral side;
a second conductive member disposed to at least part of the second lateral side;
a connecting member which connects the first housing and the second housing such that the first housing and the second housing are folded to face each other, wherein when the first housing and the second housing are folded, the first lateral side including at least part of the first conductive member disposed thereon and the second lateral side including at least part of the second conductive member disposed thereon abut against each other;
at least one wireless communication circuit electrically connected with one of a plurality of conductive segments of the first conductive member; and
at least one switching circuit, the at least one switching circuit configured to electrically connect at least one of a plurality of conductive segments of the second conductive member with a ground member,
wherein the at least one switching circuit electrically connects one of the plurality of conductive segments of the second conductive member with the ground member when the first housing and the second housing are folded.

2. The electronic device of claim 1, wherein the at least one wireless communication circuit is electrically connected with another of the plurality of conductive segments of the first conductive member.

3. The electronic device of claim 1, wherein the ground member is inside the second housing, and
wherein the at least one of plurality of the conductive segments of the second conductive member is electrically connected with the ground member at a point abutting against at least one second non-conductive slit.

4. The electronic device of claim 3, wherein the at least one switching circuit operates in an on-state when the first housing and the second housing are folded, and operates in on off-state to cut off the connection between the at least one of the plurality of conductive segments of the second conductive member and the ground member when the first housing and the second housing are unfolded.

5. The electronic device of claim 3, wherein the at least one switching circuit electrically connects another of the plurality of conductive segments of the second conductive member with the ground member when the first housing and the second housing are unfolded.

6. The electronic device of claim 5, wherein the at least one switching circuit electrically connects one of the plurality of conductive segments of the second conductive member with the ground member via the inductor when the first housing and the second housing are folded, and electrically connects another of the plurality of conductive segments of the second conductive member with the ground member via the inductor when the first housing and the second housing are unfolded.

7. The electronic device of claim 3, wherein the at least one switching circuit electrically connects the at least one of the plurality of conductive segments of the second conductive member with the ground member via an inductor.

8. The electronic device of claim 7, wherein the at least one switching circuit operates in an on-state to electrically connect the at least one of the plurality of conductive segments of the second conductive member with the ground member via the inductor when the first housing and the second housing are folded, and operates in on off-state to cut off the connection between the at least one of the plurality of conductive segments of the second conductive member and the ground member when the first housing and the second housing are unfolded.

9. The electronic device of claim 1, wherein the first conductive member includes at least one first non-conductive slit extended in the first direction or the second direction such that the first conductive member is divided into a plurality of conductive segments.

10. The electronic device of claim 9, wherein the second conductive member includes at least one second non-non-conductive slit extended in the third direction or the fourth direction such that the second conductive member is divided into a plurality of conductive segments, and when the first housing and the second housing are folded, the at least one first non-conductive slit and the at least one second non-conductive slit abut against each other.

11. The electronic device of claim 1, wherein the first housing and the second housing are connected in any one of a foldable type, a slide type, a bendable type, and a detachable type.

12. The electronic device of claim 1, wherein the at least one wireless communication circuit electrically connected with the one of the plurality of conductive segments of the first conductive member at a first point abutting against a first slit of at least one first non-conductive slits, and electrically connected with the another of the plurality of conductive segments of the first conductive member at a second point abutting against a second slit of the at least one first non-conductive slits.

13. The electronic device of claim 12, wherein, when the first housing and the second housing are folded, the first slit and a third slit of at least one second non-conductive slit abut against each other and the second slit and a fourth slit of the at least one second non-conductive slit abut against each other, and
wherein the second slit is located closer to the connecting member than the first slit.

14. The electronic device of claim 1, further comprising a processor, wherein the processor is configured to control, using the at least one switching circuit, electrical connections between the at least one of the plurality of conductive segments of the second conductive member and the ground member.

* * * * *